(12) United States Patent
Fukuyama et al.

(10) Patent No.: US 6,989,618 B2
(45) Date of Patent: Jan. 24, 2006

(54) ROLLING BEARING WITH BUILT-IN MOTOR

(75) Inventors: Hiromasa Fukuyama, Kanagawa (JP); Hideo Okano, Kanagawa (JP); Yoshio Shoda, Kanagawa (JP); Ikunori Sakatani, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/124,328

(22) Filed: Apr. 18, 2002

(65) Prior Publication Data

US 2002/0153785 A1    Oct. 24, 2002

(30) Foreign Application Priority Data

| Apr. 18, 2001 | (JP) | ............... P. 2001-119244 |
| Apr. 24, 2001 | (JP) | ............... P. 2001-126111 |
| Jul. 5, 2001 | (JP) | ............... 2001-204909 |
| Oct. 26, 2001 | (JP) | ............... 2001-329879 |
| Oct. 26, 2001 | (JP) | ............... 2001-329880 |

(51) Int. Cl.
*H02K 5/16* (2006.01)

(52) U.S. Cl. ............ 310/90; 310/67 R; 384/446

(58) Field of Classification Search ............ 310/90, 310/67 R, 68 B, 268, 67 A, 75 C; 384/445, 384/446, 490, 615; 475/196; 180/65.1–65.8; 369/269

See application file for complete search history.

(56) References Cited

U.S. PATENT DOCUMENTS

| 2,535,453 A | * | 12/1950 | Rabi ............... 310/75 R |
| 3,431,525 A | * | 3/1969 | Buntschuh et al. ........ 336/123 |
| 4,408,239 A | * | 10/1983 | Ushiro ............... 360/271.1 |
| 4,431,931 A | * | 2/1984 | Perrier et al. ............... 310/61 |
| 4,603,359 A | * | 7/1986 | Narasawa et al. ........... 360/84 |
| 4,686,400 A | * | 8/1987 | Fujisaki et al. ........ 310/67 R |

(Continued)

FOREIGN PATENT DOCUMENTS

JP     62-68455     4/1987

(Continued)

*Primary Examiner*—Dang Le
(74) *Attorney, Agent, or Firm*—Sughrue Mion, PLLC

(57) ABSTRACT

The rolling bearing with a built-in motor includes a bearing part including an inner ring, an outer ring and a plurality of rolling elements, and a motor part including a stator and a rotor for driving and rotating the inner and outer rings of the bearing part with respect to each other. In the rolling bearing, the bearing part includes a first bearing ring having a cylindrical-shaped inner fixing portion formed in one end face of the inner ring so as to be coaxial therewith, and a second bearing ring having a cylindrical-shaped outer fixing portion formed in one end face of the outer ring so as to be coaxial therewith. When viewed in the radial direction of the rolling bearing, the stator and rotor are interposed between the inner fixing portion of the first bearing ring and the outer fixing portion of the second bearing ring.

39 Claims, 34 Drawing Sheets

U.S. PATENT DOCUMENTS

| | | | | |
|---|---|---|---|---|
| 4,688,951 A | * | 8/1987 | Guers | 384/446 |
| 4,701,651 A | * | 10/1987 | Tanaka | 310/90 |
| 4,928,543 A | * | 5/1990 | Johannesen et al. | 475/196 |
| 5,027,023 A | * | 6/1991 | Koivikko | 310/83 |
| 5,045,738 A | * | 9/1991 | Hishida et al. | 310/90 |
| 5,124,863 A | * | 6/1992 | Koizumi et al. | 360/99.08 |
| 5,134,331 A | * | 7/1992 | Miyaji et al. | 310/90 |
| 5,153,470 A | * | 10/1992 | Miyaji et al. | 310/67 R |
| 5,227,686 A | * | 7/1993 | Ogawa | 310/90 |
| 5,369,322 A | * | 11/1994 | Maruyama et al. | 310/39 |
| 5,440,184 A | * | 8/1995 | Samy et al. | 310/90 |
| 5,445,456 A | * | 8/1995 | Isoda et al. | 384/126 |
| 6,705,761 B1 | * | 3/2004 | Duits et al. | 384/448 |

FOREIGN PATENT DOCUMENTS

| | | |
|---|---|---|
| JP | 63-213457 | 9/1988 |
| JP | 1-144369 | 6/1989 |
| JP | 6-276717 | 9/1994 |
| JP | 9-56108 | 2/1997 |

* cited by examiner

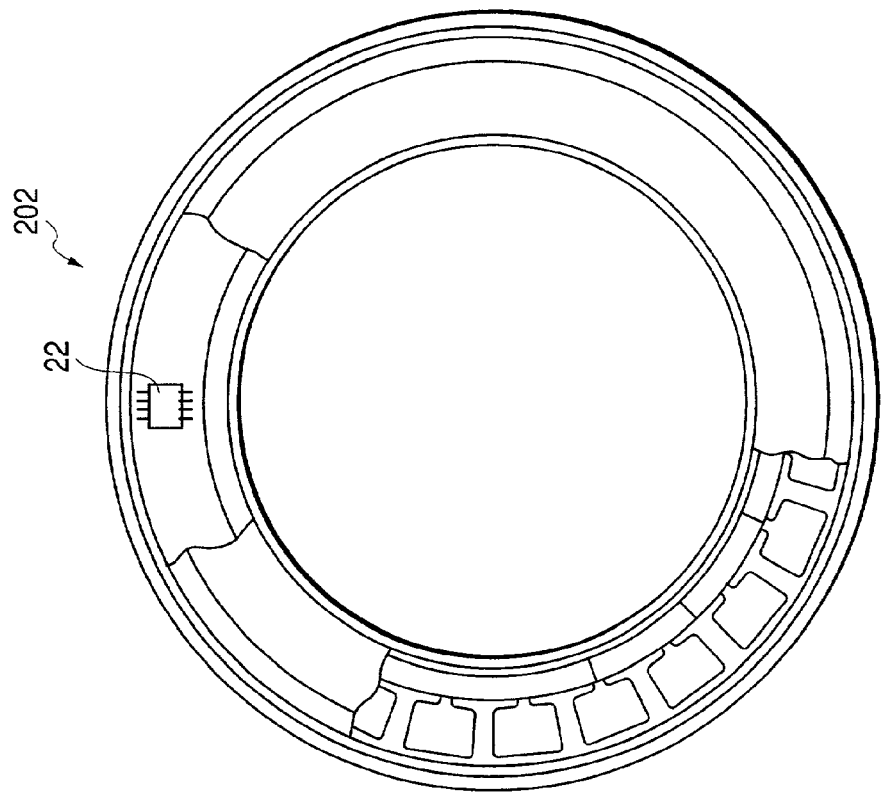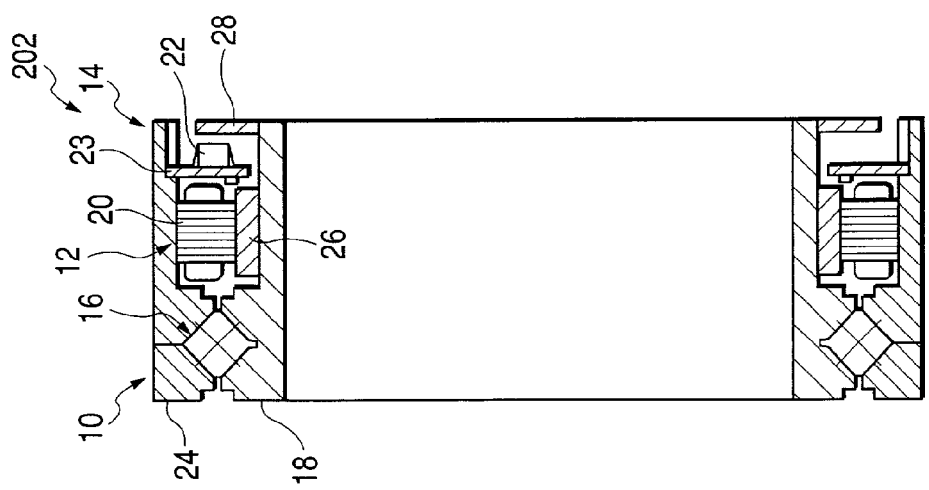

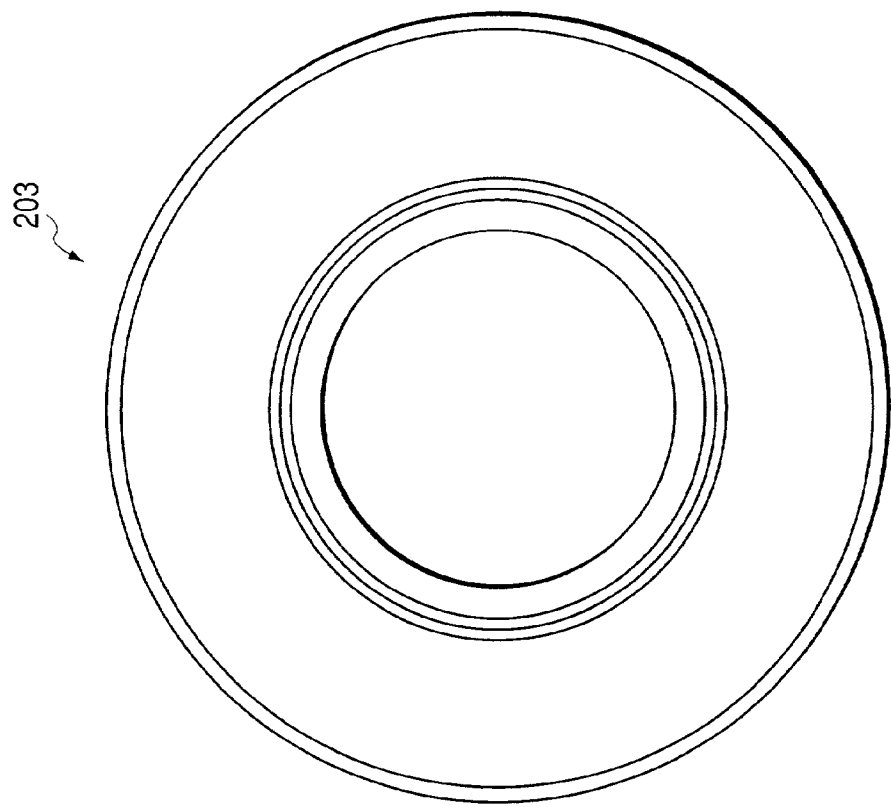
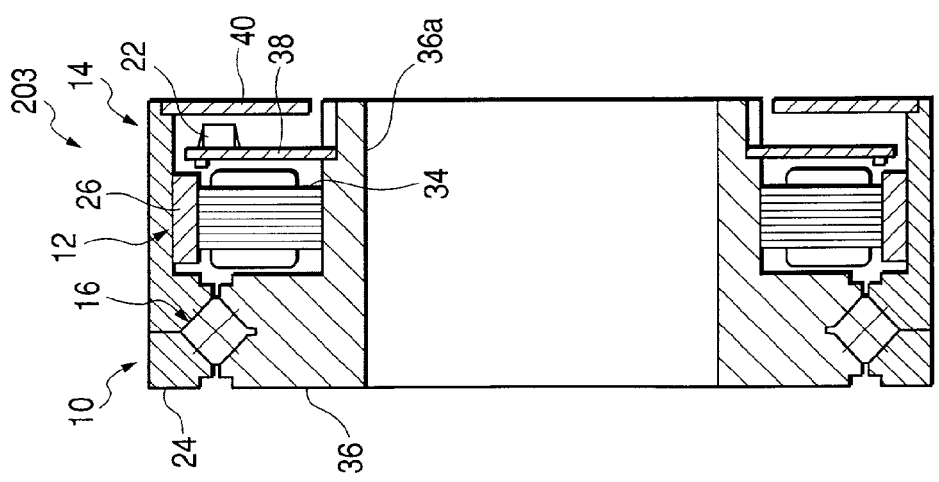

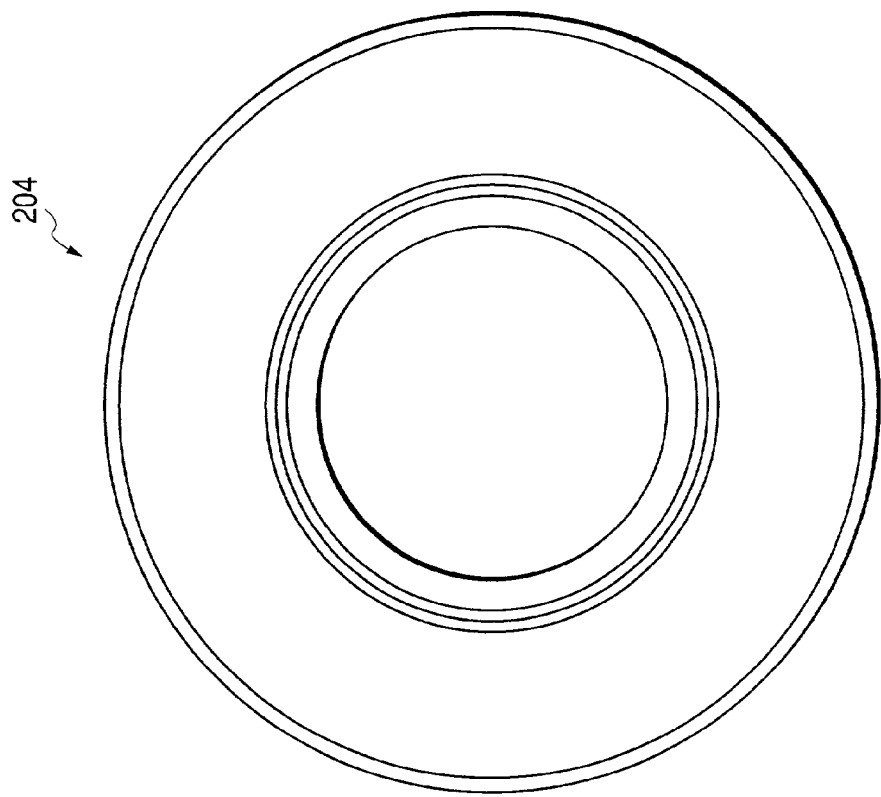
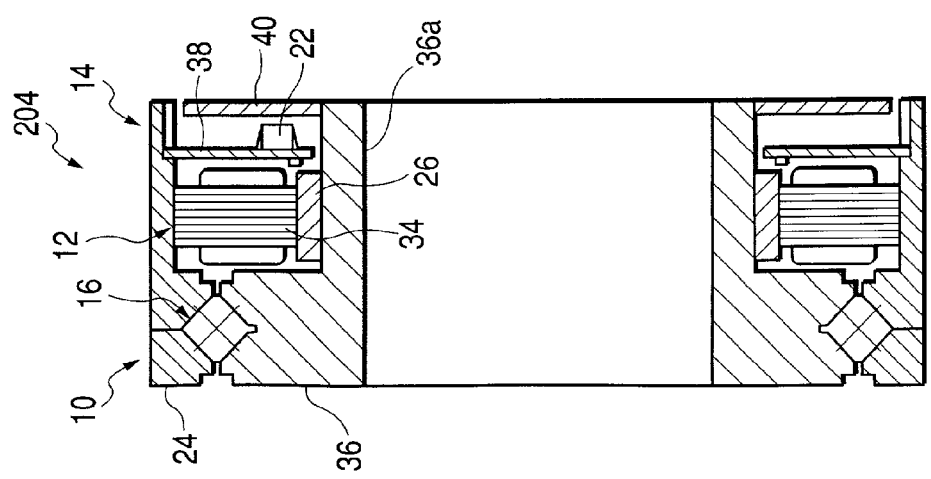

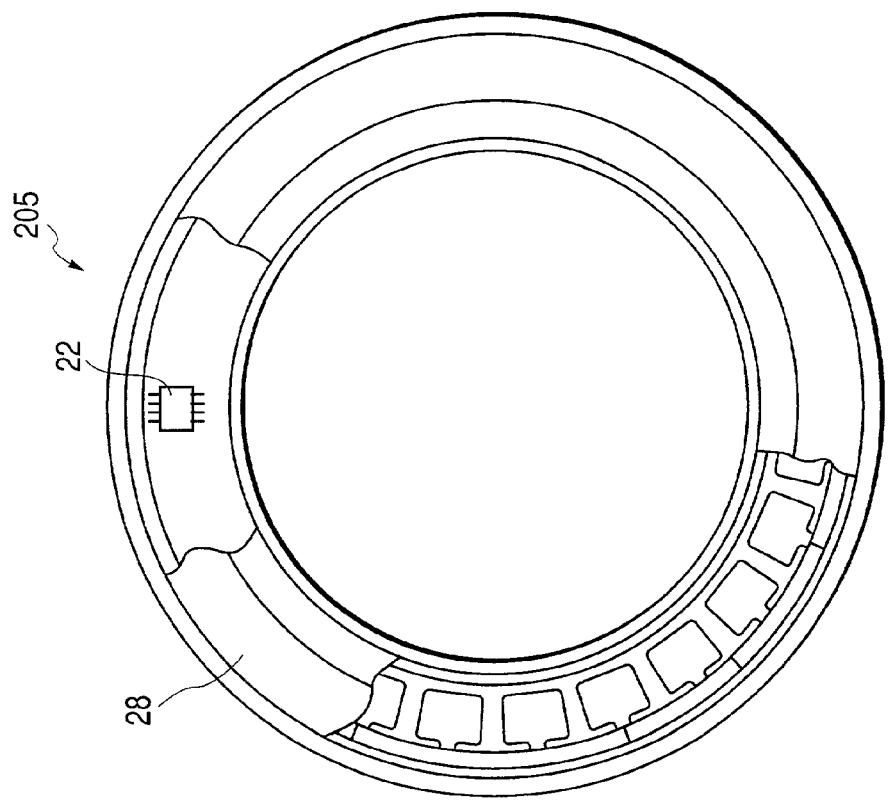
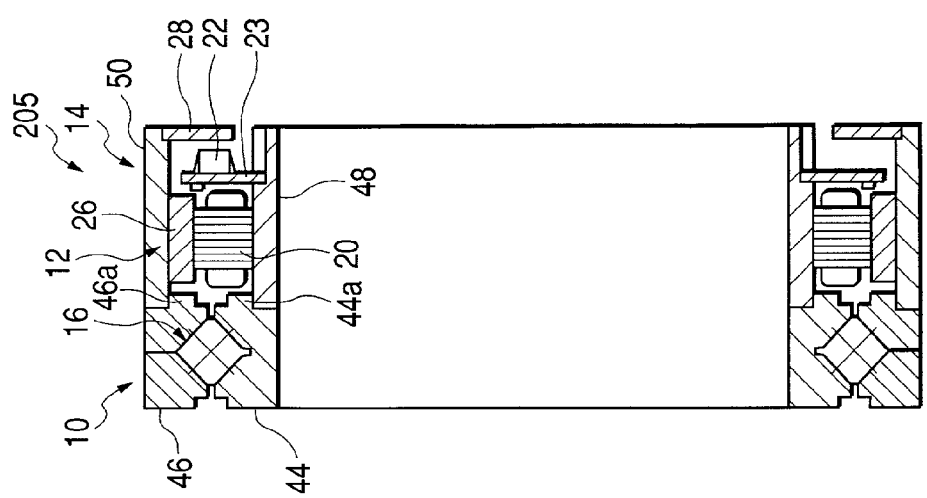

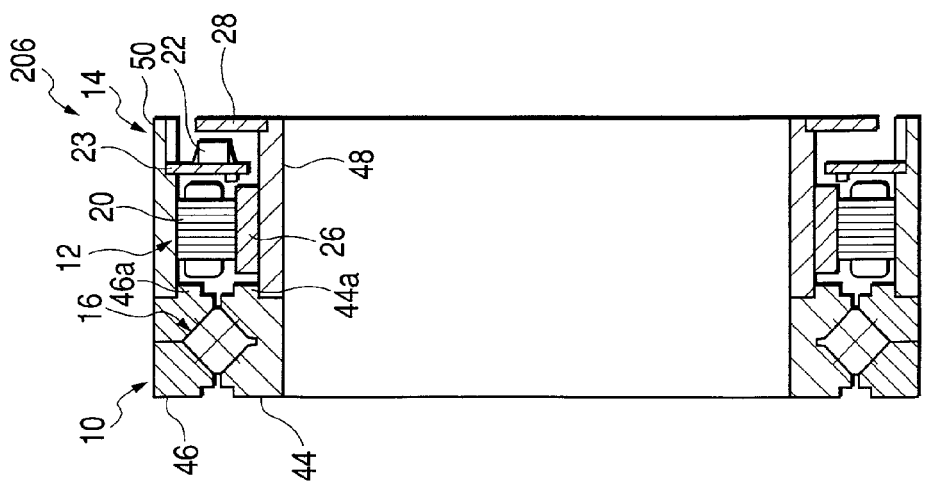
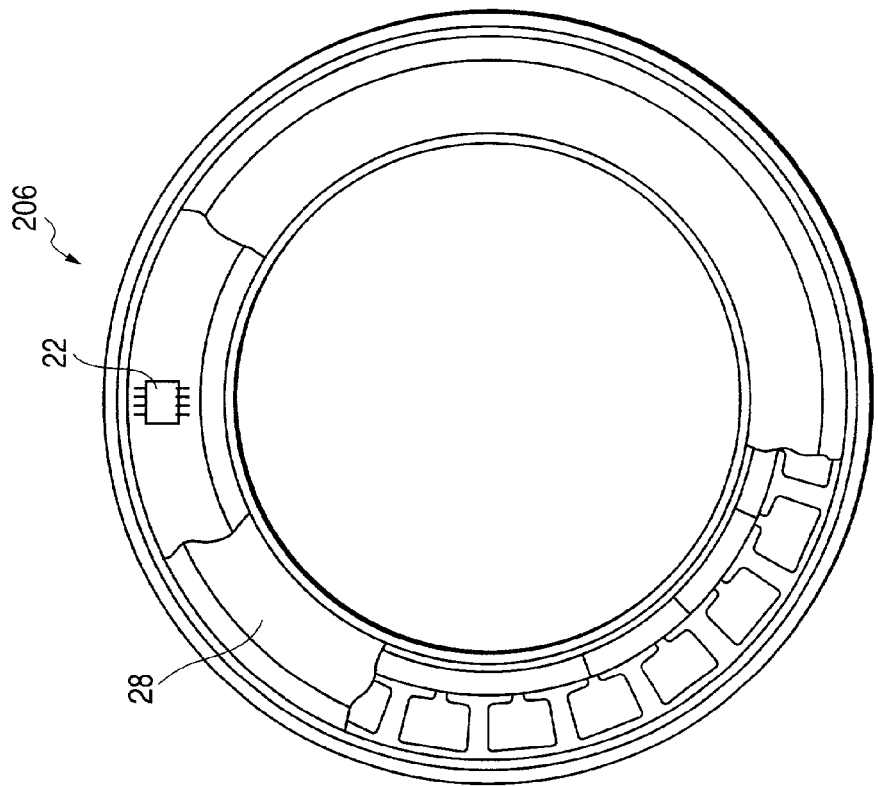

ROLLING BEARING WITH BUILT-IN MOTOR

BACKGROUND OF THE INVENTION

1. Field of the Invention

The present invention relates to a rolling bearing with a built-in motor which can be used in a drive apparatus for driving a robot, industrial automated equipment, computer equipment and its peripheral equipment. The present invention also relates to a distributing actuator which is used in a semiconductor manufacturing apparatus and in an industrial robot.

2. Description of the Related Art

As a direct drive motor which is used in the field of factory automation (FA), for example, there is known one disclosed in JP-A-63-213457 having a structure shown in FIG. 44. This direct drive motor uses a crossed roller bearing 110 as the bearing of the motor and, in the interior portion of the bearing, there are held, via a housing 112, an encoder 114 on the inner side in the radial-direction thereof and a stator 116 on the axial direction thereof. A rotor 120 and a slit plate 122 included in the encoder 114 are fixed to the outer portion of the bearing, through a rotor hub 118. And, the rotor hub 118 can be rotated by receiving the drive force of a motor which is composed of the rotor 120 and stator 116.

Now, FIG. 45 shows the structure of an exciting coil disposed on the stator 116. Here, there is used an exciting circuit having three phases (A phase, B phase, and C phase). The stator 116 includes a plurality of salient poles 124a–124l which are projected radially from the stator 116; and, poles are formed by winding conductors around the respective salient poles. Specifically, the A phase is wound on every third salient poles, that is, a total of four salient poles 124a, 124d, 124g, 124j in series; the B phase is wound on the four salient poles 124b, 124e, 124h, 124k in series; and, the C phase is wound on the four salient poles 124c, 124f, 124i, 124l in series. By the way, the position relationship between teeth respectively formed on the mutually opposed surfaces of the stator 116 and rotor 120 is similar to a PM (Permanent-magnet Motor)-type pulse motor.

Now, FIG. 46 is an explanatory view of the rotation principle of the rotor 120.

The magnetic flux to be produced by the salient poles of the stator 116 can be expressed as the sum of a bias magnetic flux $\phi M$ produced by a permanent magnet and a excitation magnetic flux $\phi C$ produced by conducting an exciting current through an exciting coil wound on a salient pole, that is, $\phi O = \phi M + \phi C$. Here, in case where the current is conducted through the exciting coil while allowing the salient poles to have a phase difference of 120° in the order of A phase—B phase—C phase, the excitation magnetic flux $\phi C$ moves in the order of A phase—B phase—C phase, so that the magnetic flux portion of $\phi O$ is caused to move. For this reason, the rotor 120 is attracted to this magnetic flux portion to thereby be able to produce a rotation drive force in the rotor 120.

Also, as a second example of the conventional direct drive motor, there is known one which is disclosed in JP-A-62-68455U having a structure shown in FIG. 47. This direct drive motor uses a crossed roller bearing 110: specifically, a stator 138 is fixed to a frame 126 connected to the outer ring of the bearing; a rotor 130 is disposed on the side of a shaft in such a manner that it is opposed to the inside diameter side of the stator 138; and, on the inner side of a shaft to which the rotor 130 is to be fixed, there is disposed a detector device 132 for detecting the position and speed of the rotor 130.

Further, as a third example of the conventional direct drive motor, there is known one disclosed in JP-A-9-56108 which is used in computer equipment. In this publication, there is disclosed a composite bearing apparatus having the following structure. That is, the composite bearing apparatus includes a two-step shaft including a large-diameter portion and a small-diameter portion, balls are interposed between an outer peripheral rolling groove formed in the inner peripheral surface of an outer ring and an inner peripheral rolling groove formed in the outer peripheral surface of the large-diameter portion of the two-step shaft, and further balls are interposed between an inner peripheral rolling groove formed in an inner ring fitted with the small-diameter portion of the two-step shaft and an outer peripheral rolling groove formed in the inner surface of a sleeve outer ring. And, a rotor and a stator are disposed on the outer periphery side of the sleeve outer ring of the composite bearing apparatus.

However, in all of the above-mentioned conventional structures, the rotor and stator cooperating together in forming the drive source as well as the detector are disposed in the interior portion of the motor separately from the bearing and, therefore, due to the installation space for these parts, it is difficult to reduce the size of the bearing apparatus. Specifically, in the case of the structure disclosed in JP-63-213457, the rotor 120 and stator 116 are disposed next to the crossed roller bearing 110 in the axial direction thereof, and the detector device (encoder) 114 is disposed on the inner side of the diameter direction of the crossed roller bearing 110; and, in the case of the structure disclosed in JP-62-68455U, the detector device 132 is stored in the diameter-direction inner portion of the rotor 130. These structures can reduce the axial-direction length of the roller bearing, which can reduce the size of the roller bearing to some degrees. However, in these structures, in fact, the size reduction is not sufficient. Also, such compact structure complicates the whole structure of the bearing and motor, increases the number of parts and complicates the process for assembling the parts into the roller bearing, which results in the increased manufacturing cost of the roller bearing. Further, it is difficult to provide a proper degree of rotation accuracy with respect to the shaft in assembling, which makes it difficult to assemble the rolling bearing with a sufficient degree of accuracy.

And, in the case of the structure disclosed in JP-A-9-56108, since the rotor and stator are disposed on the outer periphery side of the composite bearing, it is also difficult to reduce the size of the composite bearing.

In addition, a conventional rotation drive apparatus to be incorporated into the joint portion of an industrial robot is structured such that, for example, the motor shaft of an electric motor and a rotation drive shaft are connected together by a coupling and the rotation of the electric motor is transmitted to the rotation drive shaft through the coupling. Due to this, the rotation drive apparatus requires a bearing and the coupling for supporting the rotation drive shaft, which in turn requires a space for installation of these component parts. However, this space makes it difficult to reduce the size of the rotation drive apparatus.

In view of this, in JP-A-1-144369, there is disclosed a rotation drive apparatus of a direct drive type in which, an ultrasonic motor is used as a motor for driving a rotation drive shaft, and the rotation drive shaft can be driven directly by the ultrasonic motor. This rotation drive apparatus eliminates the need for provision of the above-mentioned coupling and thus does not need to secure a space for installation of the coupling, thereby being able to reduce the size of the rotation drive apparatus.

However, in the rotation drive apparatus disclosed in the above publication, since the vibrating body of the ultrasonic motor is contacted with the inner ring of the bearing for supporting the rotation drive shaft to thereby drive the rotation drive shaft, there is a possibility that there can occur slippage between the inner ring of the bearing and the vibrating body. Due to this, in the above-mentioned conventional rotation drive apparatus, although the size of the apparatus can be reduced, the drive efficiency of the rotation drive shaft is low.

Further, as a motor which is capable of rotating a driven shaft without using a coupling, JP-A-6-276717 discloses a bearing motor as shown in FIG. 48.

A bearing motor shown in FIG. 48 comprises the following parts: that is, a circular-collar-shaped main stator 410; two collar-shaped guide plates 406; a cylindrical-shaped spacer 407; balls 408; two circular-collar-shaped permanent magnet plates 405; two coils 404; and, two circular-collar-shaped auxiliary stators 401.

The main stator 410 comprises two circular-shaped main magnetic poles 411 each including not only two circular-shaped ball rolling grooves respectively formed in the upper and lower surfaces on the inner periphery side thereof but also a plurality of pole pieces arranged radially on the outer side thereof. The guide plates 406 are respectively disposed opposed to the ball rolling grooves of the main stator 410 and include circular-shaped ball rolling grooves corresponding to the ball rolling grooves of the main stator 410. The cylindrical-shaped spacer 407 is inserted into an insertion hole formed in the main stator 410 for supporting and fixing the inner peripheral sides of the guide plates 406 and also supports and fixes a driven shaft B inserted into the main stator 410. The balls 408 are interposed between the ball rolling grooves of the main stator 410 and the ball rolling grooves of the guide plates 406.

Each of the permanent magnet plates 405 includes a circular-shaped magnet member having vertically magnetized and radially arranged magnet pieces, the number of which is the same as or different from that of the pole pieces of the main magnetic pole 411. And, the permanent magnet plates 405 are respectively arranged opposed to the main magnetic poles 411 with their respective inner peripheral sides fixed to their associated guide plates 406. The two coils 404 are respectively disposed on the upper and lower surfaces of the outer peripheral side of the main stator 410. Each of the auxiliary stators 401 includes a circular-shaped auxiliary magnetic pole 402 having pole pieces arranged radially on the inner peripheral surface thereof, the number of which is the same as that of main magnetic pole 411. And, the auxiliary stators 401 are situated outside in the thickness direction of the coils 404 and permanent magnet plates 405 and respectively fixed to the upper and lower surfaces of the main stator 410 with their respective auxiliary magnetic poles 402 opposed to their associated main magnetic poles 411.

Since the above conventional bearing motor can transmit the output of the motor directly to the driven shaft B, the coupling can be omitted. However, there still remain the following problems to be solved. That is, in the bearing motor, a rotor is composed of the permanent magnet plates 405, guide plates 406 and spacer 407; a stator is composed of the main stator 410, coils 404 and auxiliary magnetic poles 402; and, a bearing mechanism is composed of the balls 408 and guide plates 406. This structure is large in size in the radial and axial directions thereof.

Conventionally, a distributing actuator for use in a semiconductor manufacturing apparatus includes, for example, a distributing element and a drive mechanism for driving the distributing element in the vertical direction, in the horizontal direction, or in the back-and-forth direction.

Although the above conventional distributing actuator is able to feed a substrate such as a wafer to a target place, it also have the following problems to be solved. That is, in the conventional distributing actuator, since there are required drive motors the number of which corresponds to the driving directions of the distributing element, the structure of the distributing actuator is complicated and the manufacturing cost thereof is expensive.

SUMMARY OF THE INVENTION

The present invention aims at eliminating the drawbacks found in the above-mentioned conventional bearings. Accordingly, it is a first object of the invention to provide a rolling bearing with a built-in motor which not only can be assembled with high machine accuracy and by a simple operation, but also can reduce the size thereof at a high level and at a low cost.

Further, it is a second object of the invention to provide a bearing with a motor which can drive the rotation drive shaft using an ultrasonic motor with high efficiency.

Moreover, it is a third object of the invention to provide which can drive and rotate a driven shaft without using a coupling and can reduce its dimensions in the radial and axial directions as much as possible to thereby be able to reduce the size and installation space thereof.

In addition, it is a fourth object of the invention to provide a distributing actuator which can be simplified in structure and also the manufacturing cost of which can be reduced.

In attaining the first object, there is provided a rolling bearing with a built-in motor, comprising: a bearing part including an inner ring, an outer ring, and a plurality of rolling elements; and, a motor part including a stator and a rotor and capable of rotationally driving the inner and outer rings of the bearing part with respect to each other, wherein the bearing part includes a first bearing ring having a cylindrical-shaped inner fixing portion so formed in one end face of the inner ring as to be coaxial therewith, and a second bearing ring having a cylindrical-shaped outer fixing portion so formed in one end face of the outer ring as to be coaxial therewith, and also wherein, when viewed in the diameter direction of the bearing, between the inner fixing portion of the first bearing ring and the outer fixing portion of the second bearing ring, there are interposed the stator and rotor of the motor part.

According to the present rolling bearing with a built-in motor, in the bearing part, the first bearing ring having a cylindrical-shaped inner fixing portion so formed in one end face of the inner ring as to be coaxial therewith and the second bearing ring having a cylindrical-shaped outer fixing portion so formed in one end face of the outer ring so to be coaxial therewith are superimposed on each other through the rolling elements, and the stator and rotor of the motor part are disposed in a space between the inner fixing portion extended from the end portion of the first bearing ring and the outer fixing portion extended from the end portion of the second bearing ring, whereby the motor part is substantially received in the interior portion of the rolling bearing. Thanks to this, the rolling bearing can be made greatly compact as well as the machine accuracy of the bearing can be maintained at high accuracy near to the finishing accuracy of the rolling bearing. Also, since the structure is simple, the bearing assembling operation can be facilitated, which makes it possible to reduce the manufacturing cost of the rolling bearing.

In the rolling bearing with a built-in motor of the first aspect, the stator of the motor part may be fixed to the outer periphery of the inner fixing portion and the rotor of the motor part may be fixed to the inner periphery of the outer fixing portion, and also wherein, while the first bearing ring is disposed on the stationary side of the bearing and the second bearing ring is disposed on the rotary side thereof, the respective bearing rings may be driven and rotated with respect to each other.

In the present rolling bearing with a built-in motor, due to the stator fixed to the outer periphery of the inner fixing portion and the rotor fixed to the inner periphery of the outer fixing portion, the respective bearing rings can be rotationally driven with respect to each other while the first bearing ring is disposed on the stationary side of the bearing and the second bearing ring is disposed on the rotary side thereof.

Further, the rolling bearing with a built-in motor of the first aspect, the rotor of the motor part may be fixed to the outer periphery of the inner fixing portion, the stator of the motor part may be fixed to the inner periphery of the outer fixing portion, and the respective bearing rings may be driven and rotated with respect to each other while the first bearing ring is disposed on the rotary side of the bearing and the second bearing ring is disposed on the stationary side thereof.

In the present rolling bearing with a built-in motor, due to the rotor fixed to the outer periphery of the inner fixing portion and the stator fixed to the inner periphery of the outer fixing portion, the respective bearing rings can be rotationally driven with respect to each other while the first bearing ring is disposed on the stationary side of the bearing and the second bearing ring is disposed on the rotary side thereof.

In the rolling bearing with a built-in motor of the first aspect, the axial-direction end portion of the inner fixing portion may project in the axial direction of the bearing from the axial-direction end portion of the outer fixing portion and, when viewed in the axial direction of the bearing, between the axial-direction end portion of the outer fixing portion and the axial-direction end portion of the inner fixing portion, there may be interposed at least parts of the stator and rotor.

In the present rolling bearing with a built-in motor, since the stator and rotor of the motor part are interposed between the axial-direction end portion of the outer fixing portion and the axial-direction end portion of the inner fixing portion, assembling and maintenance of the rolling bearing can be facilitated.

Additionally, in the rolling bearing with a built-in motor, a detecting part for detecting the rotation of the bearing part may be interposed between the above-mentioned inner and outer fixing portions.

In the present rolling bearing with a built-in motor, because the detecting part is interposed between the inner and outer fixing portions, there can be provided a structure in which the detecting part is received substantially in the interior portion of the rolling bearing. Thanks to this, the structure of the rolling bearing can be made more compact.

Moreover, In the rolling bearing with a built-in motor of the first aspect, the detecting part may include a slit disk to be mounted on the rotary side of the bearing and a light radiation detect portion to be mounted on the stationary side of the bearing, the slit disk maybe disposed on the axial-direction end portion of the detecting part on the opposite side to the bearing part between the inner and outer fixing portions, and the light radiation detect portion may be so disposed on the bearing part side of the slit disk in the axial direction thereof as to be opposed to the slit disk.

In the present rolling bearing with a built-in motor, the detecting part includes a slit disk and a light radiation detect portion, the slit disk is disposed on the axial-direction end portion of the detecting part on the opposite side to the bearing part between the inner and outer fixing portions, and the light radiation detect portion is so disposed on the bearing part side of the slit disk in the axial direction thereof as to be opposed to the slit disk, whereby the slit disk is disposed in the axial-direction end portion of the rolling bearing with a built-in motor and thus the slit disk can be made to function as a seal. This can simplify the structure of the rolling bearing with a built-in motor to thereby be able to reduce the manufacturing cost thereof.

In the rolling bearing with a built-in motor of the first aspect, at least one of the inner and outer fixing portions may be formed of non-magnetic material.

In the present rolling bearing with a built-in motor, since at least one of the inner and outer fixing portions is formed of non-magnetic material, occurrence of electrolytic corrosion due to the driving operation of the motor part can be prevented. This not only can extend the life of the bearing but also can maintain the stable rotational operation of the bearing for a long period of time.

In addition, in the rolling bearing with a built-in motor, the inner fixing portion may be formed separately from the inner ring.

In the present rolling bearing with a built-in motor, because the inner fixing portion is formed separately from the inner ring, not only the structure of the inner ring can be simplified but also, after the bearing part and motor part are assembled separately, they can be combined together. Therefore, when compared with a structure in which the motor part is formed integrally with the bearing part, the assembling process of the bearing can be simplified. Also, since the bearing part and motor part are structured such that they can be separated from each other, the maintenance of the rolling bearing can be facilitated.

Further, in the rolling bearing with a built-in motor wherein the outer fixing portion may be formed separately from the outer ring.

In the present rolling bearing with a built-in motor, since the outer fixing portion is formed separately from the outer ring, not only the structure of the outer ring can be simplified but also, after the bearing part and motor part are assembled separately, they can be combined together. Therefore, when compared with a structure in which the motor part is formed integrally with the bearing part, the assembling process of the bearing can be simplified. Also, since the bearing part and motor part are structured such that they can be separated from each other, the maintenance of the rolling bearing can be facilitated.

Further, in the rolling bearing with a built-in motor of the first aspect, the bearing part may be composed of a crossed roller bearing.

In the present rolling bearing with a built-in motor, because a crossed roller bearing is used as the bearing part, a radial load, axial loads in two directions, and a moment load can be received by a single bearing. This not only can shorten the axial-direction length of the bearing but also can facilitate the assembling operation of the bearing.

Additionally, in the rolling bearing with a built-in motor wherein the rolling elements may be respectively formed of ceramics material.

In the present rolling bearing with a built-in motor, since ceramics material is used as the material of the rolling elements, electrolytic corrosion due to the motor part can be prevented. At the same time, the rotation performance of the bearing itself can be enhanced and the rigidity of the bearing can also be increased.

In attaining the second object, according to a second aspect of the invention, there is provided a bearing with a motor, comprising: a bearing including a plurality of rolling elements interposed between an outer ring and an inner ring; a motor housing connected to one end of the outer ring coaxially with the outer ring; an ultrasonic motor stator having an outer peripheral surface fixed to the inner peripheral surface of the motor housing; and, an ultrasonic motor rotor so disposed as to be rotatable with respect to the ultrasonic motor stator and connected to the inner ring through a rotor connecting body.

Also, the bearing with a motor of the second aspect, may comprise: a bearing including a plurality of rolling elements interposed between an outer ring and an inner ring; a motor housing connected to one end of the inner ring coaxially with the inner ring; an ultrasonic motor stator having an inner peripheral surface fixed to the outer peripheral surface of the motor housing; and, an ultrasonic motor rotor so disposed as to be rotatable with respect to the ultrasonic motor stator and connected to the outer ring through a rotor connecting body.

Further, in the bearing with a motor as set forth in the second aspect, the bearing may be composed of a crossed roller bearing.

In a bearing with a motor according to the second aspect of the invention, since the rotation force of the ultrasonic motor is transmitted directly to a driven body such as a drive shaft through the outer ring or inner ring of the bearing, the driven body such as a drive shaft can be driven by the ultrasonic motor with high efficiency.

In attaining the third object, according to a third aspect of the invention, there is provided a bearing motor, comprising: an outer ring-shaped member; an inner ring-shaped member disposed inside the outer ring-shaped member; a large number of roller-shaped rotors rollably interposed between the outer and inner ring-shaped members; and, a retainer for holding the roller-shaped rotors almost at regular intervals in the peripheral direction of the outer and ring-shaped members, wherein each of the roller-shaped rotors includes a rotor core formed in a cylindrical shape or in a taper shape, an outer tube for covering the rotor core, a field coil wound around the peripheral surface of the rotor core, and a pair of energizing sleeves for energizing the field coil with a field current; the retainer is composed of a pair of annular side plates respectively disposed on the two sides of the roller-shaped rotor, and a large number of columnar portions with their respective two ends supported by the annular side plates; each of the columnar portions is composed of a pair of magnetic bodies disposed opposed to each other between the mutually adjoining ones of the roller-shaped rotors, and a permanent magnet interposed between the pair of magnetic bodies; and, the outer and inner ring-shaped members respectively include ring-shaped energizing brushes respectively contactable with their associated energizing sleeves.

In a bearing motor according to the third aspect of the invention, since, by fitting the driven shaft with the outer peripheral surface of the outer ring-shaped member or the inner peripheral surface of the inner ring-shaped member, the motor output is transmitted to the driven shaft through the outer or inner ring-shaped member, the driven shaft can be driven without using a coupling. Also, because the motor part and bearing part are formed as an integral body, the dimensions of the bearing motor in the radial and axial directions thereof can be reduced as much as possible, which makes it possible to reduce the size of the bearing motor as well as save the installation space thereof.

In attaining the fourth object, according to a fourth aspect of the invention, there is provided a distributing actuator comprising a distributing element and a drive mechanism for driving the distributing element, wherein the drive mechanism comprises a drive motor, a nut rotatable about its vertical axis by the drive force of the drive motor, a drive shaft including a male screw portion so formed in its outer peripheral surface as to be threadedly engageable with a female screw portion formed in the inner peripheral surface of the nut, a first clutch plate drivable and rotatable about its vertical axis by the drive shaft, an oscillating arm so connected to the first clutch plate through a first connecting pin as to be rotatable about its vertical axis, a second connecting pin for connecting together the oscillation arm and distributing element in such a manner that they can be rotated about their own vertical axes, a second clutch plate disposed with its upper surface opposed to the lower surface of the first clutch plate, a guide rod extended horizontally from the second clutch plate toward the distributing element, a guide member for guiding the distributing element in the longitudinal direction of the guide rod, a first electromagnetic clutch interposed between the first and second clutch plates, a third clutch plate disposed with its upper surface opposed to the lower surface of the second clutch plate, a plurality of guide shafts respectively extended downwardly from the third clutch plate, a guide shaft support for supporting the guide shafts in such a manner that they can be slided in the vertical direction, and a second electromagnetic clutch interposed between the second and third clutch plates.

According to the thus structured distributing actuator of the invention, the distributing element can be moved in the vertical direction, in the horizontal direction, or in the back-and-forth direction using a single drive motor, thereby eliminating the need for provision of motors corresponding in number to the driving directions of the distributing element. This can simplify the structure of the distributing actuator as well as can reduce the manufacturing cost thereof.

Also, in the fourth aspect of the invention, the first electromagnetic clutch can be formed by embedding an electromagnet in the first or second clutch plate. Further, in the fourth aspect of the invention, the second electromagnetic clutch can be formed by embedding an electromagnet in the second or third clutch plate.

BRIEF DESCRIPTION OF THE DRAWINGS

FIG. 1A is a section view thereof and FIG. 1B is a partially sectional side view thereof;

FIGS. 2A and 2B show the structure of a modification of the first embodiment of a rolling bearing with a built-in motor according to the invention; specifically, FIG. 2A is a section view thereof and FIG. 2B is a partially sectional side view thereof;

FIGS. 3A and 3B show the structure of a second embodiment of a rolling bearing with a built-in motor according to the invention; specifically, FIG. 3A is a section view thereof and FIG. 3B is a partially sectional side view thereof;

FIGS. 4A and 4B show the structure of a modification of the second embodiment of a rolling bearing with a built-in motor according to the invention; specifically, FIG. 4A is a section view thereof and FIG. 4B is a partially sectional side view thereof;

FIGS. 5A and 5B show the structure of a third embodiment of a rolling bearing with a built-in motor according to the invention; specifically, FIG. 5A is a section view thereof and FIG. 5B is a partially sectional side view thereof;

FIGS. 6A and 6B show the structure of a modification of the third embodiment of a rolling bearing with a built-in motor according to the invention; specifically, FIG. 6A is a section view thereof and FIG. 6B is a partially sectional side view thereof;

DETAILED DESCRIPTION OF THE PREFERRED EMBODIMENTS

Now, description will be given below in detail of the preferred embodiments of a rolling bearing with a built-in motor according to the invention with reference to the accompanying drawings.

Figure 1B:
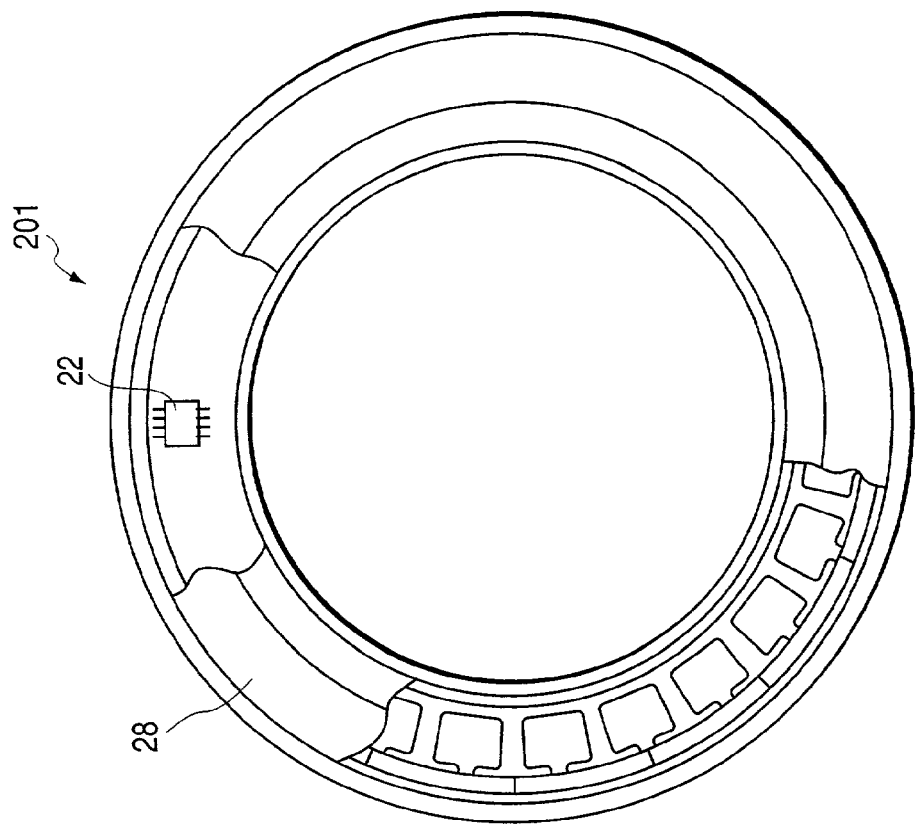
FIGS. 1A and 1B show the structure of a first embodiment of a rolling bearing with a built-in motor according to the invention; specifically.
Figure 1A:
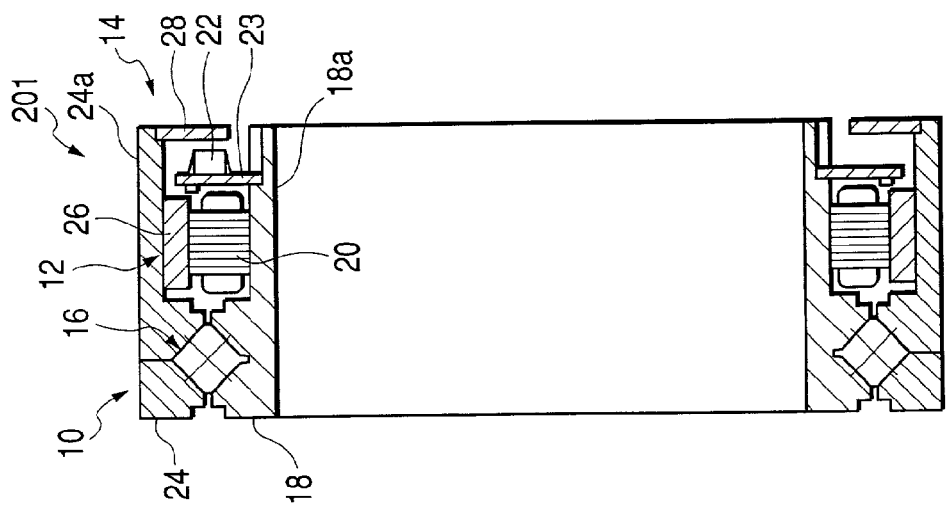

FIGS. 1A and 1B show a first embodiment of a rolling bearing with a built-in motor according to the invention; and, specifically, FIG. 1A is a section view thereof, and FIG. 1B is a partially sectional side view thereof.

A rolling bearing with a built-in motor 201 according to the present embodiment includes a bearing part 10, a motor part 20 and a detecting part 14; and, the motor part 12 and detecting part 14 are disposed inside the bearing part 10.

The bearing part 10 uses a crossed roller bearing 16 which not only can receive a radial load, axial-direction loads in both directions and a moment load but also is advantageous in shortening the axial-direction length of the bearing and can be assembled by a simple operation. This crossed roller bearing 16 includes an inner ring (a first bearing ring) 18, one end of which is formed in a cylindrical shape extending in the axial direction of the inner ring 18; and, to a cylindrical-shaped extension portion (inside fixed portion) 18a of the inner ring 18, there are fixed a stator 20 of the motor part 12 and a light radiation detecting part (optical reflection type encoder module) 22 serving as the fixed portion of a rotary encoder included in the detecting part 14. And, similarly to the inner ring 18, the outer ring (a second bearing ring) 24 of the crossed roller bearing 16 has one end thereof formed in a cylindrical shape and, to an extension portion (outside fixed portion) 24a thereof, there are fixed a motor drive magnet (rotor) 26 of the motor part 12 and a seal with a slit 28 which is an integral body of the slit disk of the rotary encoder of the detecting part 14 and the seal of the bearing. By the way, between the bearing rings of the crossed roller bearing 16, there is interposed a separator which is used to maintain a roller distance for rolling elements.

The motor part 12 is structured such that the stator 20 and motor drive magnet 26 are disposed opposed to each other and, in case where a signal and power from a motor drive driver (not shown) are applied to the stator 20, the second bearing ring 24 can be driven and rotated. In case where the inner and outer rings are formed of magnetic material so that they can also serve as the members of a magnetic circuit, the motor characteristic can be enhanced. However, in case where any one of the inner ring, outer ring and rolling elements is formed of non-magnetic material, there can be obtained an effect that occurrence of stray current corrosion (electrolytic corrosion) caused by formation of a magnetic circuit in the motor can be prevented. This can extend the life of the bearing and can maintain the stable rotation operation of the bearing for a long period of time. Also, to secure the performance of the bearing and prevent occurrence of electrolytic corrosion, it is effective to have the rolling elements made of ceramics material. This is effective not only in prevention of electrolytic corrosion but also in enhancement in the rotation performance of the bearing itself and in increase in the rigidity of the bearing.

The detecting part 14 is used to detect the rotation angle and rotation speed in a non-contact manner. Specifically, the detecting part 14 comprises an annular seal with a slit 28 having a plurality of openings formed on the circumference thereof, and an optical reflection type encoder module 22 including light sources and light receive portions so formed at given positions on the circumference thereof as to face the openings of the seal with a slit 28. The detecting part 14 detects the rotation angle and rotation speed based on the pulse signals that are generated by the seal with a slit 28 and encoder module 22 when they are moved with respect to each other due to the rotation operation of the second bearing ring 24. Since the seat with a slit 28 is disposed in the axial-direction end portion of the detecting part 14, it can also function as a seal which prevents dust against attachment to the detecting part 14. By the way, the encoder module 22 is mounted on one surface of a fixing ring member 23 fixed to the outer peripheral surface of the extension portion 18a of the first bearing ring 18.

As described above, in the rolling bearing with a built-in motor 201 according to the present embodiment, since the motor part 12 and detecting part 14 are received substantially in the interior portion of the bearing, the structure of the rolling bearing can be simplified and can be made compact to a great extent, which can reduce the manufacturing cost of the rolling bearing. Also, because the assembling accuracy of the rolling bearing with a built-in motor 201 itself can be enhanced, the rotation shaft can be mounted onto the second bearing ring 24 of the rolling bearing with a built-in motor 201 with the same high accuracy as the finishing accuracy of the bearing part 10. Further, this mounting operation can be facilitated. In addition, since there is not required a large installation space on the inner side of the radial direction of the rolling bearing with a built-in motor 201, the bearing inside diameter of the rolling bearing with a built-in motor 201 can be designed large, which reduces the difference between the bearing inside diameter and bearing outside diameter, thereby being able to reduce the thickness of the bearing further.

Also, in case where the extension portion 18a of the first bearing ring 18 is formed integrally with the inner ring of the bearing part 10 and the extension portion 24a of the second bearing ring 24 is formed integrally with the outer ring of the bearing part 10, not only the structure of the rolling bearing can be simplified but also occurrence of play due to resonance can be reduced by changing the design of the structure only slightly to thereby be able to enhance the vibration characteristic of the rolling bearing. Further, in case where the inside diameter of the first bearing ring 18 is made coincident with the bearing inside diameter of the bearing part 10 and the outside diameter of the second bearing ring 24 is made coincident with the bearing outside diameter of the bearing part 10, the rolling bearing with a built-in motor 201 can be formed in the shape of a single rolling bearing. Thanks to this, the rotation shaft, housing and hub to be connected to the rolling bearing can be supported more positively and stably. Also, since the slit disk plate of the detecting part 14 is formed as a seal with a slit which can function also as a seal, the structure of the rolling bearing can be simplified, thereby being able to reduce the manufacturing cost of the rolling bearing further.

Next, description will be given below of a modification of the present embodiment.

Now, FIGS. 2A and 2B show the structure of a modification of the rolling bearing with a built-in motor 201 according to the present embodiment; and, specifically, FIG. 2A is a section view thereof and FIG. 2B is a partially sectional side view thereof. In the following description, parts having similar functions to those employed in the above-mentioned first embodiment are given the same designations and thus the description thereof is omitted.

In the case of the rolling bearing with a built-in motor 202 according to the present modification, the second bearing ring 24 is disposed on the stationary side of the rolling bearing, whereas the first bearing ring 18 is disposed on the rotary side thereof. Due to this, in the case of the motor part 12, the stator 20 is fixed to the second bearing ring 24 and the motor drive magnet 26 is fixed to the first bearing ring 18; and, in the case of the detecting part 14, a fixing ring member 23 mounted on the encoder module 22 is fixed to the second bearing ring 24 and the seat with a slit 28 is fixed to the first bearing ring 18. However, the remaining portions of the present modification are similar in structure to the first embodiment.

According to the structure of the present modification, the rotary shaft can be mounted on the first bearing ring 18 of the rolling bearing with a built-in motor 202 with high accuracy near to the finishing accuracy of the bearing part 10, so that there can be provided a similar operating effect to the above-mentioned effect of the first embodiment.

Next, description will be given below of a second embodiment of a rolling bearing with a built-in motor according to the invention with reference to FIGS. 3A to 4B.

Now, FIGS. 3A and 3B show the structure of the second embodiment of a rolling bearing with a built-in motor according to the invention. Specifically, FIG. 3A is a section view thereof and FIG. 3B is a partially sectional side view thereof.

In the case of the rolling bearing with a built-in motor 203 according to the present embodiment, the capacity of a stator 34 of the motor part 12 is increased to thereby increase the motor output. That is, the bearing inside diameter of a first bearing ring 36 is reduced to thereby increase a space between the extension portion 36a of the first bearing ring 36 and the second bearing ring 24, whereby the size of the stator 34 that can be installed is increased. With the increased size of the installation space, in the detecting part 14, the inside diameter of the fixing ring member 38 to which the encoder module 22 is to be fixed is reduced and, at the same time, the inside diameter of the seal with a slit 40 is also reduced.

In the structure of the rolling bearing with the built-in motor 203 according to the present embodiment, since the stator 34 is increased in size, the magnetic flux that can be generated can be increased, which can provide a further stronger magnetic force. This makes it possible to obtain a high-output motor which is enhanced in the rotation drive force.

Also, FIGS. 4A and 4B show the structure of a modification of a rolling bearing with a built-in motor according to the present embodiment. Specifically, FIG. 4A is a section view thereof and FIG. 4B is a partially sectional side view thereof.

In the case of a rolling bearing with a built-in motor 204 according to the present modification, the second bearing ring 24 is disposed on the stationary side of the rolling bearing 204, whereas the first bearing ring 36 is disposed on the rotary side thereof. Due to this, in the case of the motor part 12, the stator 34 is fixed to the second bearing ring 24 and the motor drive magnet 26 is fixed to the first bearing ring 36; and, in the case of the detecting part 14, a fixing ring member 38 mounted on the encoder module 22 is fixed to the second bearing ring 24 and the seat with a slit 28 is fixed to the first bearing ring 18. However, the remaining portions of the present modification are similar in structure to the second embodiment.

According to the structure of the present modification, the rotary shaft can be mounted onto the first bearing ring 36 with high accuracy near to the finishing accuracy of the bearing part 10, so that there can be provided a similar operating effect to the above-mentioned effect of the second embodiment.

Next, description will be given below of a third embodiment of a rolling bearing with a built-in motor according to the invention with reference to FIGS. 5A to 6B.

Now, FIGS. 5A and 5B show the structure of the third embodiment of a rolling bearing with a built-in motor according to the invention. Specifically, FIG. 5A is a section view thereof and FIG. 5B is a partially sectional side view thereof.

In the rolling bearing with a built-in motor 205 according to the present embodiment, a cylindrical-shaped inner fixing portion 48 and a cylindrical-shaped outer fixing portion 50, to which the motor part 12 and detecting part 14 are fixed respectively, are produced separately from the bearing part 10 and are respectively connected to the respective one-side surfaces of the inner ring (first bearing ring) 44 and outer ring (second bearing ring) 46 of the bearing part 10.

A stepped portion 44*a* is formed on the inner periphery side of the motor part 12 side one end face of the inner ring 44, and the inner fixing portion 48 is fixed to the stepped portion 44*a* by close fit or by adhesion. Similarly, a stepped portion 46*a* is formed on the outer periphery side of the motor part 12 side one end face of the outer ring 46, and the outer fixing portion 50 is fixed to the stepped portion 46*a*.

The inner fixing portion 48 fixes together the stator 20 of the motor part 12 and the encoder module 22 of the detecting part 14. Also, the outer fixing portion 50 fixes together the motor drive magnet 26 of the motor part 12 and the seal with a slit 28 which is an integral body of the slit disk of the rotary encoder of the detecting part 14 and the seal of the bearing.

According to the rolling bearing with a built-in motor 205 thus structured, since the bearing part 10 is produced separately from the motor part 12 and detecting part 14, not only the structures of the inner ring 44 and outer ring 46 can be simplified but also there can be employed an assembling method in which the bearing part 10 as well as the motor part 12 and detecting part 14 are assembled individually and, after they are assembled, the two individual assemblies are combined together. This method can simplify the assembling process when compared with a method in which the motor part 12 and detecting part 14 are formed integrally with the bearing part 10. Further, because the two assemblies are structured in such a manner that they can be separated from each other, maintenance of the rolling bearing with a built-in motor 205 can be facilitated.

Here, in case where at least one of the inner and outer fixing portions 48 and 50 is formed of non-magnetic material such as austenite stainless steel, occurrence of electrolytic corrosion can be prevented. In this case, as the material for the inner ring, outer ring and rolling elements of the bearing, there can be used bearing steel or high-hardness bearing steel such as martensite stainless steel.

By the way, only one of the inner ring 44 and inner ring fixing potion 48 or only one of the outer ring 46 and outer ring fixing portion 50 may be formed as a separate member. In this case, the separately-formed side is able to provide the above-mentioned effect.

Also, FIGS. 6A and 6B show the structure of a modification of a rolling bearing with a built-in motor according to the present embodiment. Specifically, FIG. 6A is a section view thereof and FIG. 6B is a partially sectional side view thereof.

In the rolling bearing with a built-in motor 206 according to the present modification, the outer ring 46 is disposed on the stationary side of the rolling bearing 206, whereas the inner ring 44 is disposed on the rotary side thereof. That is, in the motor part 12, the stator 20 is fixed to the outer fixing portion 50 which is connected to the outer ring 46, and the motor drive magnet 26 is fixed to the inner fixing portion 48 connected to the inner ring 44; and, in the detecting part 14, the fixing ring member 23 mounted on the encoder module 22 is fixed to the outer fixing member 50, and the slit disk 28 is fixed to the inner fixing member 48. However, the remaining portions of the present modification are similar in structure to the third embodiment. According to the structure of the present modification as well, there can be obtained similar effects to those of the third embodiment.

Figure 7:
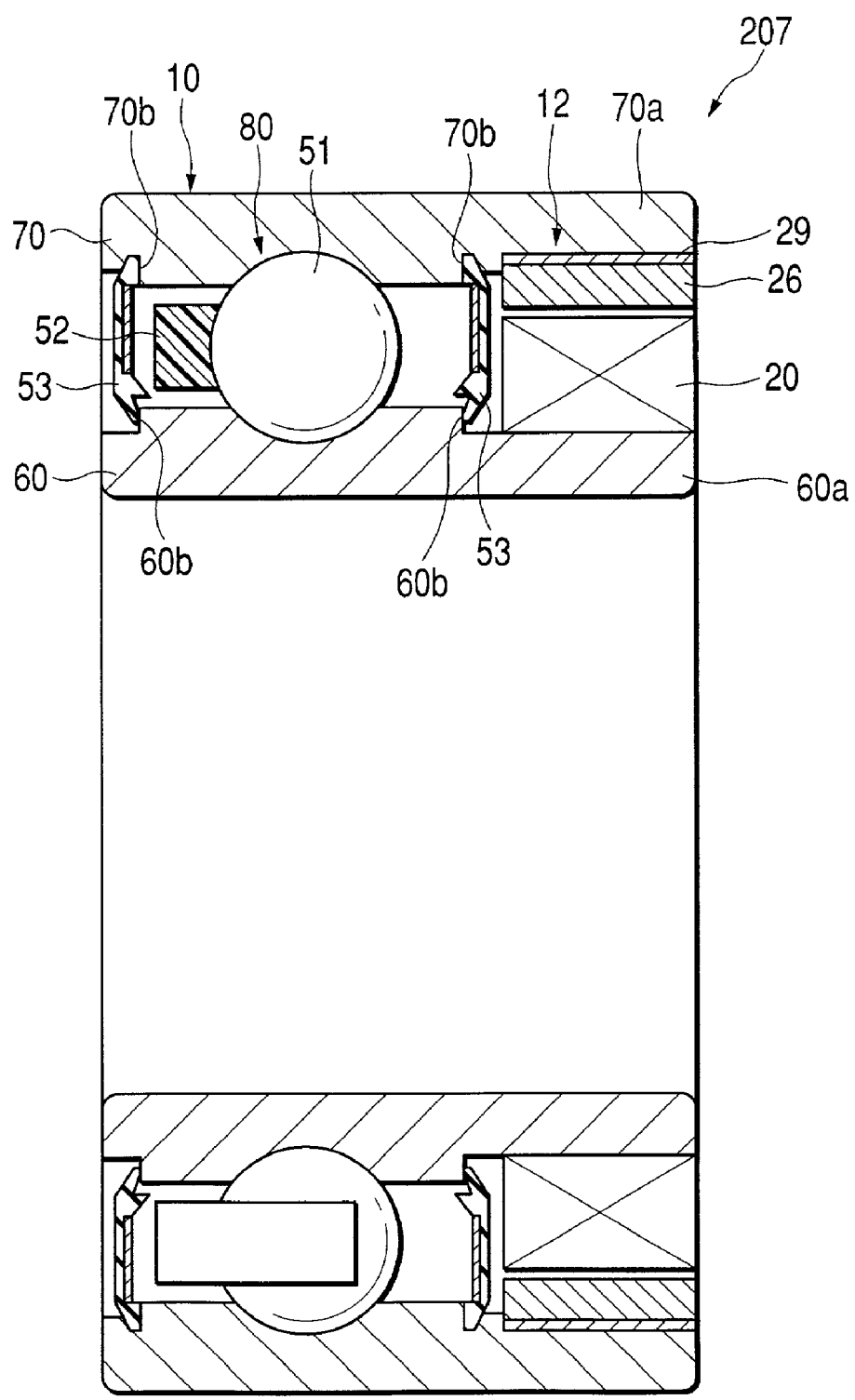
FIG. 7 is a section view of a fourth embodiment of a rolling bearing with a built-in motor according to the invention.

Now, FIG. 7 shows a section view of a fourth embodiment of a rolling bearing with a built-in motor 207 according to the invention. In the rolling bearing with a built-in motor 207 according to the fourth embodiment, a ball bearing 80 is used in the bearing part 10. The ball bearing 80 comprises a plurality of rolling elements (balls) 51 interposed between an inner ring (first bearing ring) 60 and an outer ring (second bearing ring) 70, and a retainer 52 for holding the rolling elements 51 therein.

Also, the bearing part 10 includes two seal members 53 which are respectively disposed on the axial-direction two sides thereof where the rolling elements 51 are interposed. One (in FIG. 7, the right one) of the two seal members 53 is interposed between the motor part 12 and rolling element 51.

Two seal grooves 70*b* for mounting the seal members 53 therein are formed along the inner peripheral surface of the outer ring 70 respectively on the axial-direction two sides of the portion of the outer ring 70 with which the rolling element 51 can be contacted. The seal members 53 mounted in their respective seal grooves 70 extends up to and contacts with stepped portions 60*b* which are formed on the outer peripheral surface of the inner ring 60. That is, in a space between the inner and outer rings 60 and 70, the seal members 53 seal the rolling elements 51, retainer 52 and raceways from outside, while the seal members 53 also seal the rolling contact portions of the rolling bearing.

In the present embodiment, the outer ring 70 is disposed on the rotary side of the rolling bearing 207 and the inner ring 60 is disposed on the stationary side thereof. Due to this, in the motor part 12, the rotor 26 is fixed to the outer ring 70 and the stator 20 is fixed to the inner ring 60, respectively.

Here, the rotor 26 is constructed by a permanent magnet bonded and fixed to the inner periphery of a ring-shaped member (soft-steel ring) 29 formed of soft steel material. The soft-steel ring 29 is fitted into the interior portion of the extension portion 70a of the outer ring 70. Also, the stator 20 is constructed by winding a coil around the outer peripheral surface of the extension portion 60a of the inner ring 60.

In the present embodiment, the stator 20 and rotor 26 do not project from a space existing between the extension portion (inner fixing portion) 60a of the inner ring 60 and the extension portion (outer fixing portion) 70a of the outer ring 70, when viewed from the diameter direction thereof as well as from the axial direction thereof.

According to the present embodiment, the inner ring 60 is fitted with and fixed to the outer surface of a shaft (not shown) such as a spindle. Then, the fitting surfaces of the shaft and the inner ring 60 are fixed together by an adhesive in order to prevent the shaft and inner ring 60 against mutual slippage therebetween. In case of preventing the fitting surfaces from creeping with respect to each other only using a pressure fixation method, a plurality of grooves may be formed in the outer peripheral surface of the shaft along the axial direction thereof at intervals in the circumferential direction thereof, and the shaft may be then inserted into the inside diameter of the inner ring 60 with hard fit. With this structure, a part of the inner ring 60 in the inside diameter side is in part deformed elastically and cut into the grooves, thereby being able to prevent the fitting surfaces against creep with respect to each other.

Also, the outer ring 70 is fitted into and fixed to the interior portion of a housing (not shown). Then, the outer ring 70 is bonded and fixed to the interior portion of the housing as a rotor in such a manner as to prevent a slippage between the fitting surfaces of the outer ring 70 and housing.

The inner ring 60 and outer ring 70 can be produced by quenching and hardening JIS SUJ2 material. The ring thus produced can be low in cost, when compared with a ring which is formed of non-magnetic material such as ceramics, thereby being able to reduce the manufacturing cost of the rolling bearing.

From the viewpoint of prevention of occurrence of electrolytic corrosion, as the material of the rolling element 51, there may be used ceramics such as silicon nitride and zirconium.

As the material of the retainer 52, there may be used non-magnetic material such as polyamide resin and polyether sulfone resin.

According to the rolling bearing with a built-in motor 207 thus structured, it is easy to assemble it and the manufacturing cost thereof can be reduced. Also, there can be obtained high rotation accuracy and low torque.

The present embodiment is suitable for use in a drive apparatus which drives a computer equipment and its peripheral equipment.

Figure 8:
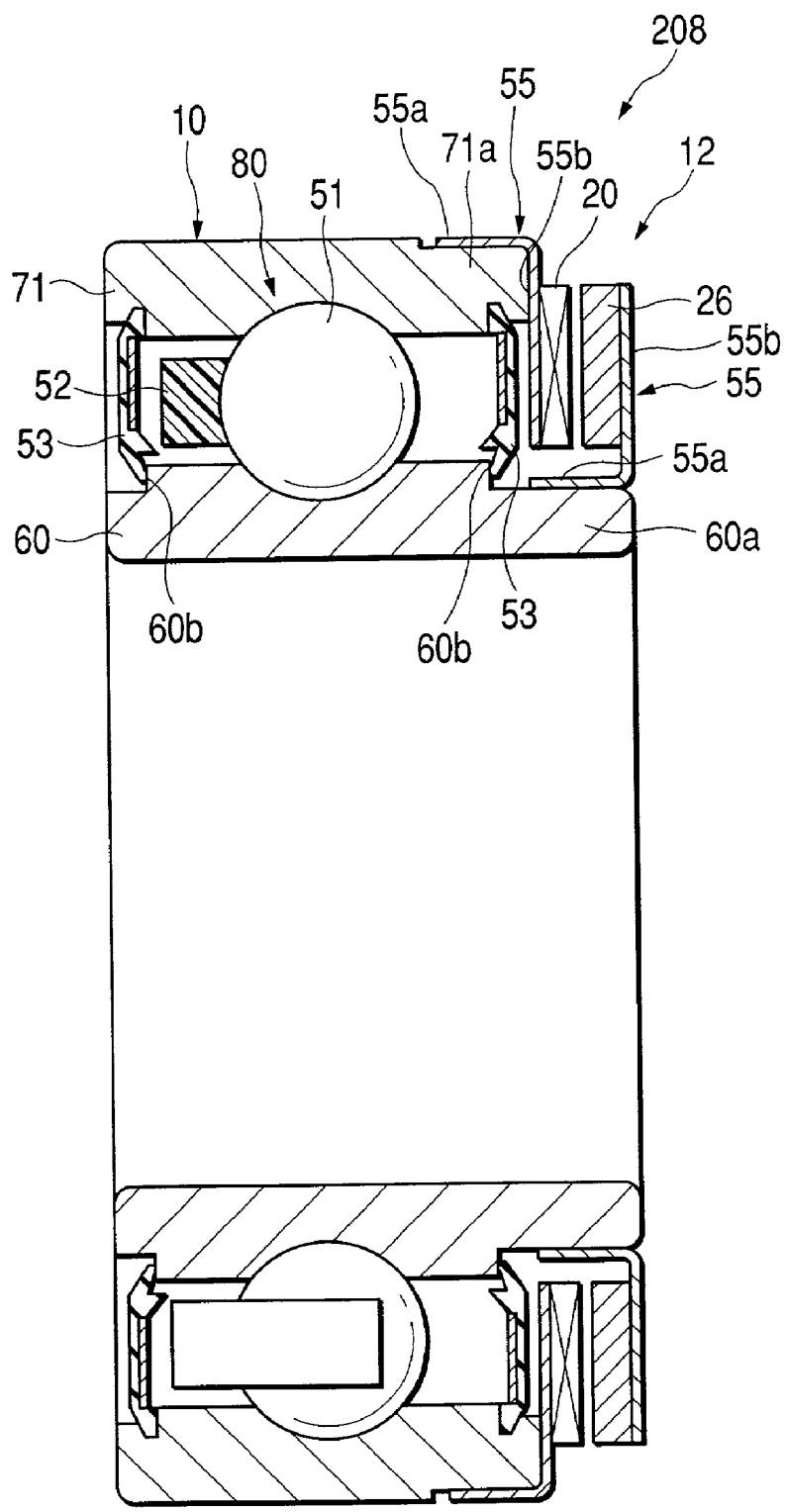
FIG. 8 is a section view of a fifth embodiment of a rolling bearing with a built-in motor according to the invention.

Now, FIG. 8 shows a section view of a fifth embodiment of a rolling bearing with a built-in motor 208 according to the invention. According to the present rolling bearing with a built-in motor 208, the extension portion (outer fixing portion) 71a of an outer ring (second bearing ring) 71 is formed shorter than the extension portion (inner fixing portion) 60a of an inner ring (first bearing ring) 60. That is, the axial-direction dimension of the outer ring 71 is set smaller than the axial-direction dimension of the inner ring 60 and, on one side in the axial direction, the extension portion 60a of the inner ring 60 projects in the axial direction from the extension portion 71a of the outer ring 71.

Two seal members 53 are disposed on the axial-direction two sides of the rolling element 51; and, the extension portion 71a of the outer ring 71 projects slightly toward the motor part 12 from the seal member 53 interposed between the rolling element 51 and motor part 12.

Ring-shaped retain plate 55 are fixed to the axial-direction end portions of the respective extension portions 60a and 71a of the inner ring 60 and outer ring 71 on the opposite side to the bearing part 10 side thereof. The retain plate 55 is formed of, for example, a soft-steel plate and includes a fixing surface 55a to be fixed to the extension portions 60a and 71a and a flange surface 55b for mounting the rotor or stator thereon, while the retain plate 55 has an L-shaped section. The fixing surface 55a is formed on one end edge portion (outer peripheral edge portion or inner peripheral edge portion) of the ring-shaped flange surface 55b in such a manner that the fixing surface 55a extends perpendicularly to the flange surface 55b and is formed integrally therewith.

The cylindrical-shaped fixing surface 55a of one retain plate 55 is fitted with the axial-direction end portion of the outer peripheral surface of the extension portion 71a of the outer ring 71. The flange surface 55b of the retain plate 55 extends perpendicularly toward the inner ring 60. The flange surface 55b is contacted with the axial-direction end face of the extension portion 71a of the outer ring 71. A stator 20 is disposed on a portion of the flange surface 55b, which is situated on the opposite side to the bearing part 10 side.

In the present embodiment, it can also be said that a stator unit with the stator 20 disposed on the retain plate 55 is fitted with the outer peripheral surface of the outer ring 71.

And, the fixing surface 55a of the other retain plate 55 is fitted with the outer surface of the axial-direction end portion of the outer peripheral surface of the extension portion 60a of the inner ring 60. The flange surface 55b of the retain plate 55 extends perpendicularly toward the outer ring 71. A rotor 26 is mounted on the bearing part 10 side of the flange surface 55b. The rotor 26 is disposed opposed to the stator 20, when viewed in the axial direction of the rolling bearing. The axial-direction end face of the extension portion 60a of the inner ring 60 is substantially flush with the surface of the flange surface 55b on the opposite side to the bearing part 10 side thereof.

In the present embodiment, the stator 20 and rotor 26, are received between the outer peripheral surface of the extension portion (inner fixing portion) 60a of the inner ring 60 and the outer peripheral surface of the extension portion (outer fixing portion) 71a of the outer ring 71, when viewed in the diameter direction of the rolling bearing. In this case as well, in the present specification, it is assumed that the stator 20 and rotor 26 are interposed between the inner and outer fixing portions when viewed in the diameter direction of the rolling bearing.

When viewed in the axial direction of the rolling bearing, the stator 20 and rotor 26 are received between the axial-direction end portion of the extension portion 60a of the inner ring 60 and the axial-direction end portion of the extension portion 71a of the outer ring 71.

According to the present embodiment, the inner ring 60 is disposed on the rotary side of the bearing 208 and the outer ring 71 is disposed on the stationary side thereof. Here, the rotor 26 can be produced by print-wiring a coil on the flange surface 55b of the retain plate 55. Also, the stator 20 can be produced by arranging a multi-polar magnet on the flange surface 55b of the retain plate 55.

According to the rolling bearing with a built-in motor 208 thus structured, in the manufacturing process thereof, the motor part 12 can be assembled after the bearing part 10 is assembled. Therefore, assembling of the rolling bearing 208 can be facilitated and thus the manufacturing cost of the rolling bearing 208 can be reduced. Also, maintenance of the motor part 12 can be facilitated.

The present embodiment is suitable for use in a drive apparatus which drives a computer equipment and its peripheral equipment.

Figure 9:
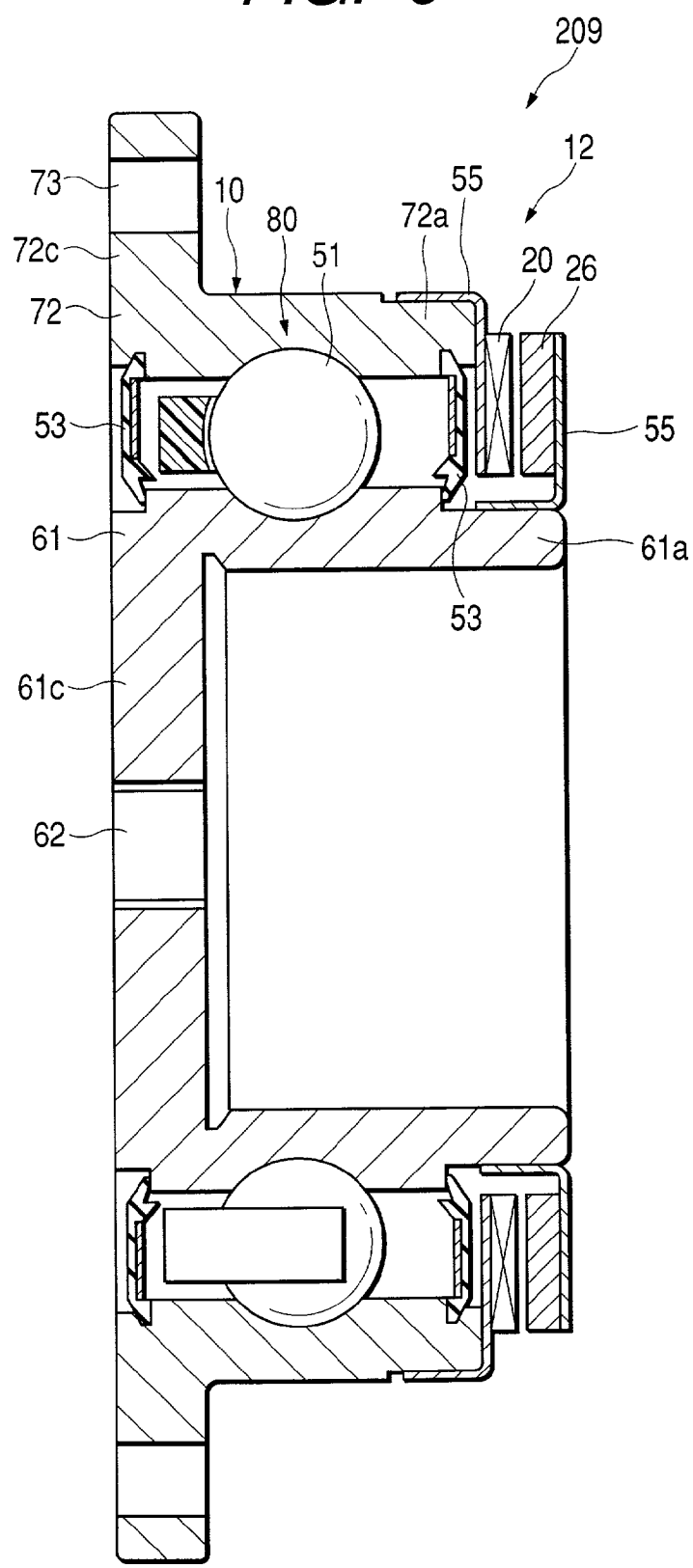
FIG. 9 is a section view of a sixth embodiment of a rolling bearing with a built-in motor according to the invention.

Now, FIG. 9 shows a section view of a sixth embodiment of a rolling bearing with a built-in motor 209 according to the invention. According to the present rolling bearing with a built-in motor 209, the structure of the motor part 12 is almost similar to the fifth embodiment.

In the present embodiment, in the axial-direction end portion of the bearing part 10 on the opposite side to the motor part 12 side thereof, a flange portion 72c extending outwardly in the diameter direction of the bearing 209 is formed integrally with an outer ring 72. In the ring-shaped flange portion 72c, there are formed a plurality of penetration holes 73 which open at regular intervals on the circumference of the flange portion 72c. The outer ring 72 is fixed to a rotary member (not shown) disposed opposed to the flange portion 72c by fixing device such as a bolt which can be inserted into the penetration holes 73. Thus, the outer ring 72 can be rotated together with the rotary member.

According to the present embodiment, an inner ring 61 is structured such that the inner ring inside diameter of the axial-direction end portion thereof on the opposite side to the motor part 12 side thereof is closed by a disk-shaped end wall 61c. A screw hole 62 which penetrates through the central portion of the end wall 61c is formed in the end wall 61c which is formed integrally with the inner ring 61. The inner ring 61 is fixed to a fixing member (not shown) disposed opposed to the end wall 61c by a male screw which can be threadedly engaged into the screw hole 62.

According to the rolling bearing with a built-in motor 209 thus structured, because the rotary member (not shown) and outer ring 72 are flange connected to each other, or because the rotary member (not shown) and inner ring 61 are screw connected to each other, there can be avoided a problem that their respective fitting surfaces can creep with respect to each other.

The present embodiment is suitable for use in a drive apparatus which drives a computer equipment and its peripheral equipment.

By the way, although not shown, as a method for fixing together the inner ring 61 and fixing member, instead of the screw connecting method, there can also be used other methods such as a spline connecting method.

Also, the seal member 53, which is employed in the fourth to sixth embodiments, can be omitted according to cases. For example, depending on the using environment of the rolling bearing with a built-in motor, in case where there is disposed seal equipment on the apparatus side on which the rolling bearing with a built-in motor is to be mounted, the seal member 53 of the rolling bearing with a built-in motor can be omitted.

Figure 10:
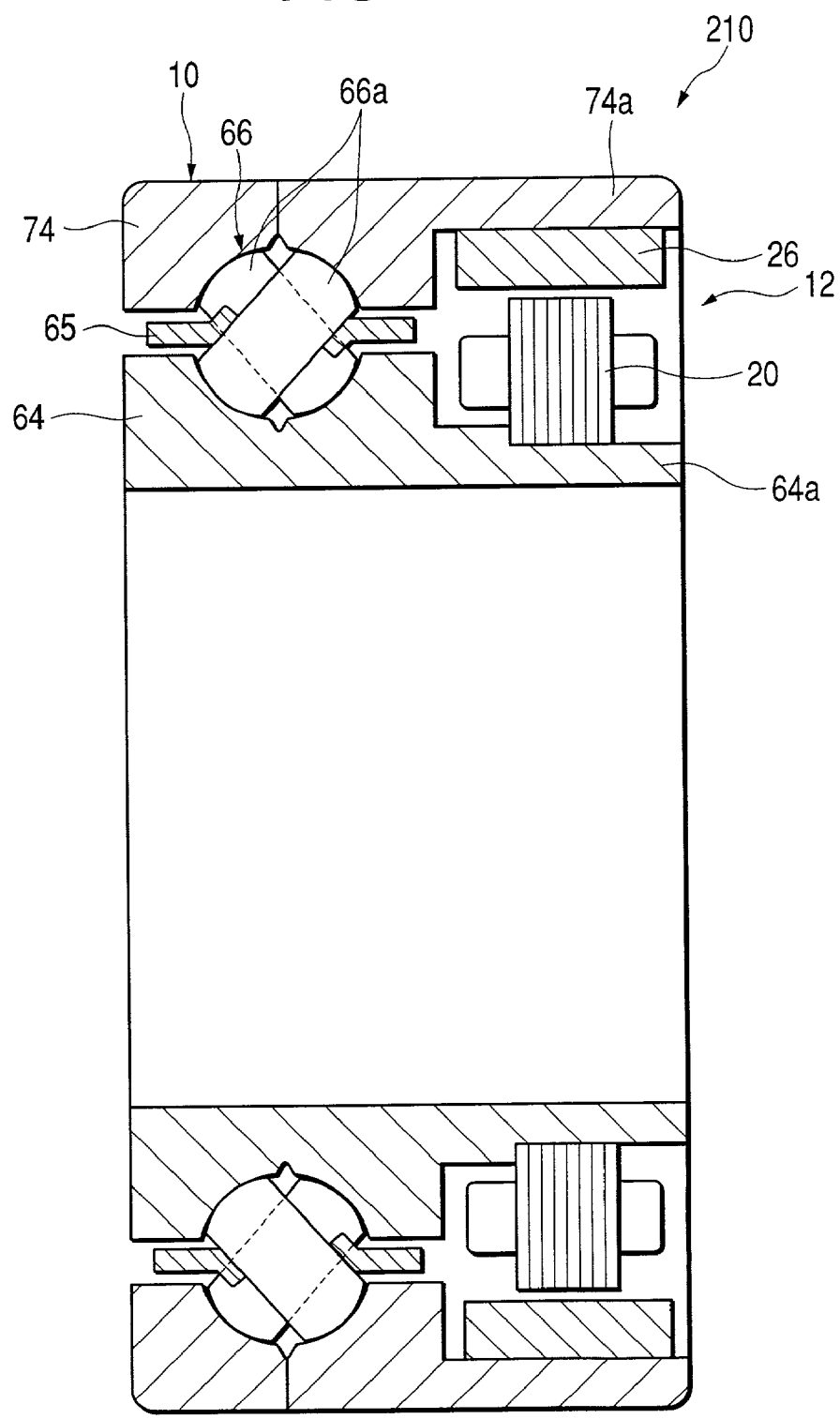
FIG. 10 is a section view of a seventh embodiment of a rolling bearing with a built-in motor according to the invention.

Now, FIG. 10 shows a section view of a seventh embodiment of a rolling bearing with a built-in motor 210 according to the invention. According to the present rolling bearing with a built-in motor 210, a crossed ball bearing 66 is used in the bearing part 10.

The crossed ball bearing 66 according to present embodiment includes a plurality of rolling elements 66a incorporated into between a pair of bearing rings (between inner and outer rings 64 and 74) and, each of the bearing rings includes a raceway groove composed of a raceway surface having a diameter larger than the radius of the rolling element 66a. At least one of the pair of bearing rings includes two raceway surfaces. Each of the rolling elements 66a has an outside diameter which serves as a rolling contact surface, while the outside diameter has a curvature in the axial direction thereof as well. The rolling elements are disposed on the circumference of the crossed ball bearing such that the adjacent rolling elements are alternated, and the outside diameters of the respective rolling elements 66a are always contacted with the two mutually mating bearing rings at one point for each of them, specifically, at one point on the raceway surface of one bearing ring and at one point on the raceway surface of the other bearing ring; that is, the crossed ball bearing is a two-point-contact bearing. Therefore, since a preload is applied to the crossed ball bearing, an axial load, a radial load and a moment load can be supported by a single bearing.

Here, a retainer 65 is used to support the rolling elements 66a in a freely rollable manner.

Also, the rolling element 66a according to the present embodiment has a shape which can be obtained by working the two end portions of a ball having a single curvature into plane surfaces. By the way, instead of a single curvature, the ball may have a shape with the variable curvature.

According to the present embodiment, the outer ring 74 is formed by combining together two members each having a single raceway surface. That is, the outer ring 74 is structured such as to be divided into two sections. However, this is not limitative but, instead of the outer ring 74, the inner ring 64 may be structured such as to be divided into two sections.

Then, a sleeve may be fitted with the outer peripheral surface of the outer ring 74 or with the inner peripheral surface of the inner ring 64, whereby separation of the dividable-side bearing ring can be prevented more positively.

According to the present embodiment, the outer ring 74 is disposed on the rotary side of the bearing 210, whereas the inner ring 64 is disposed on the stationary side thereof. Due to this, in the motor part 12, the stator 20 is fixed to the outer peripheral surface of the extension portion (inner fixing portion) 64a of the inner ring 64 and the rotor 26 is fixed to the inner peripheral surface of the extension portion (outer fixing portion) 74a of the outer ring 74, respectively.

Here, as a permanent magnet for the rotor 26, there can be used a ferrite magnet, an aluminum-manganese magnet, an alnico magnet, and a rare earth magnet (such as a Nd—Fe—B magnet). Especially, since the rare earth magnet provides a large magnetic force product, the generation torque of the motor can be increased with a small motor volume; therefore, it is preferable to use the rare earth magnet.

In the present embodiment, the stator 20 with a coil wound therearound is disposed on the outer periphery of the inner fixing portion, whereas the rotor 26 composed of a permanent magnet is disposed on the inner periphery of the outer fixing portion. However, this is not limitative but, for example, the stator may be formed of a permanent magnet.

According to the rolling bearing with a built-in motor 210 thus structured, the contact area between the rolling elements 66a and rolling grooves can be reduced, so that the inner ring 64 and outer ring 74 can be rotated very smoothly with respect to each other with low torque. And, the axial load, radial load and moment load can be supported properly.

By the way, a separator (not shown) may be used, instead of the retainer 65.

The present embodiment is suitable for use in a drive apparatus which drives a computer equipment and its peripheral equipment.

The present invention is not limited to the above-mentioned embodiments but proper modifications and improvements are also possible.

Combinations of the above-mentioned embodiments are also possible. For example, the detect part used in the first to third embodiments can also be applied to the fourth to seventh embodiments.

According to the first to seventh embodiments of a rolling bearing with a built-in motor of the invention, there can be employed a structure in which the motor part and detecting part are received substantially in the interior portion of the bearing, the structure of the rolling bearing can be simplified and can be made greatly compact, assembling of the rolling bearing can be facilitated, and the manufacturing cost of the rolling bearing can be reduced. Further, the assembling accuracy of the rolling bearing with a built-in motor itself can be enhanced and also the rotary shaft, housing and hub can be mounted with the same high accuracy as the finishing accuracy of the bearing part. In addition, this mounting operation can also be facilitated.

Now, description will be given below of eighth to twenty-third embodiments of a bearing with a motor according to the invention with reference to FIGS. 11 to 36.

Figure 11:
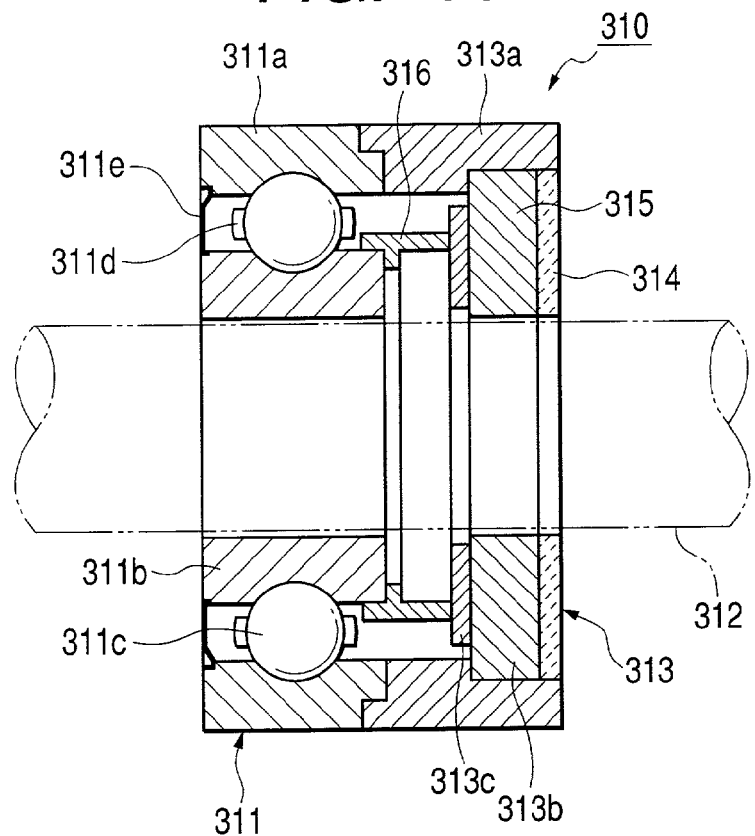
FIG. 11 is a section view of an eighth embodiment of a bearing with a motor according to the invention.

FIG. 11 shows an eighth embodiment of a bearing with a motor according to the invention. In FIG. 11, reference numeral 310 designates a rotation drive apparatus of a direct drive type. This rotation drive apparatus 310 includes a rotation drive shaft 312 supported on a ball bearing 311 and an ultrasonic motor 313 for driving the rotation drive shaft 312.

The ultrasonic motor 313 includes a motor housing 313a formed in a cylindrical shape, an annular stator 313b with its outer peripheral surface fixed to the inner peripheral surface of the motor housing 313a, and an annular rotor 313c so disposed as to be rotatable with respect to the stator 313b. An outer ring 311a of the ball bearing 311 is connected to one end of the motor housing 313a in such a manner as to be coaxial with the motor housing 313a.

The stator 313b can be produced by bonding an annular body 315 made of metal to the surface of a piezoelectric ceramics 314. In the surface of the portion of the annular body 315 that is contacted with the rotor 313c, a large number of grooves (not shown) are formed in a comb-tooth shape along the circumferential direction of the annular body 315.

To the rotor 313c of the ultrasonic motor 313, there is connected one end of a rotor connecting body 316 formed in a cylindrical shape. The other end of the rotor connecting body 316 is coaxially connected to an inner ring 311b of the ball bearing 311, whereby the inner ring 311b of the ball bearing 311 can be rotated integrally with the rotor 313c. By the way, the ball bearing 311 includes, besides the outer ring 311a and inner ring 311b, rolling elements 311c, a retainer 311d and a seal 311e.

Figure 12:
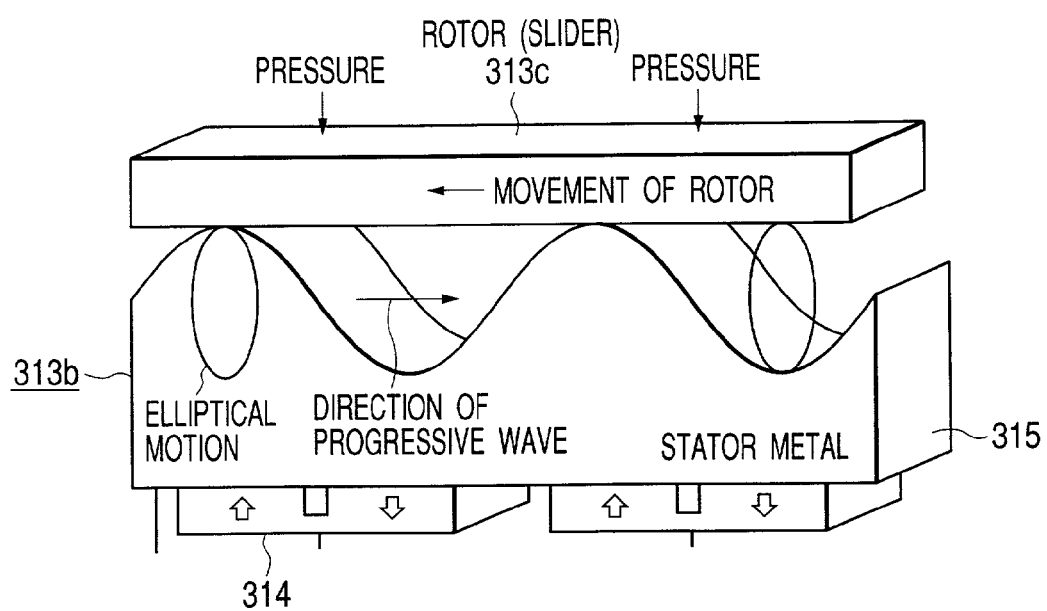
FIG. 12 is an explanatory view of the operation principle of an ultrasonic motor.

In the above structure, description will be given below of the operation principle of the ultrasonic motor 313 with reference to FIG. 12.

When a high-frequency voltage is applied to the piezoelectric ceramics 314 of the ultrasonic motor 313, the piezoelectric ceramics 314 generates ultrasonic vibrations due to an electrostriction effect. In this case, the ultrasonic vibrations generated by the piezoelectric ceramics 314, as shown in FIG. 12, while flexing the annular body 315 of the stator 313b, advance continuously in the circumferential direction of the stator 313b as progressive waves, with the result that the rotor 313c is rotated in the opposite direction to the advancing direction of the progressive waves. In case where the rotor 313c of the ultrasonic motor 313 is rotated in this manner, not only the inner ring 311b of the ball bearing 311 is rotated integrally with the rotor 313c but also the rotation drive shaft 312 supported on the ball bearing 311 is rotated integrally with the inner ring 311b.

In the above-mentioned first embodiment, since the rotor 313c of the ultrasonic motor 313 for driving the rotation drive shaft 312 is connected to the inner ring 311b of the ball bearing 311 for supporting the rotation drive shaft 312 by the rotor connecting body 316, the rotation force of the ultrasonic motor 313 is transmitted directly to the rotation drive shaft 312 through the inner ring 311b, so that the rotation drive shaft 312 can be driven by the ultrasonic motor 313 with high efficiency.

Figure 13:
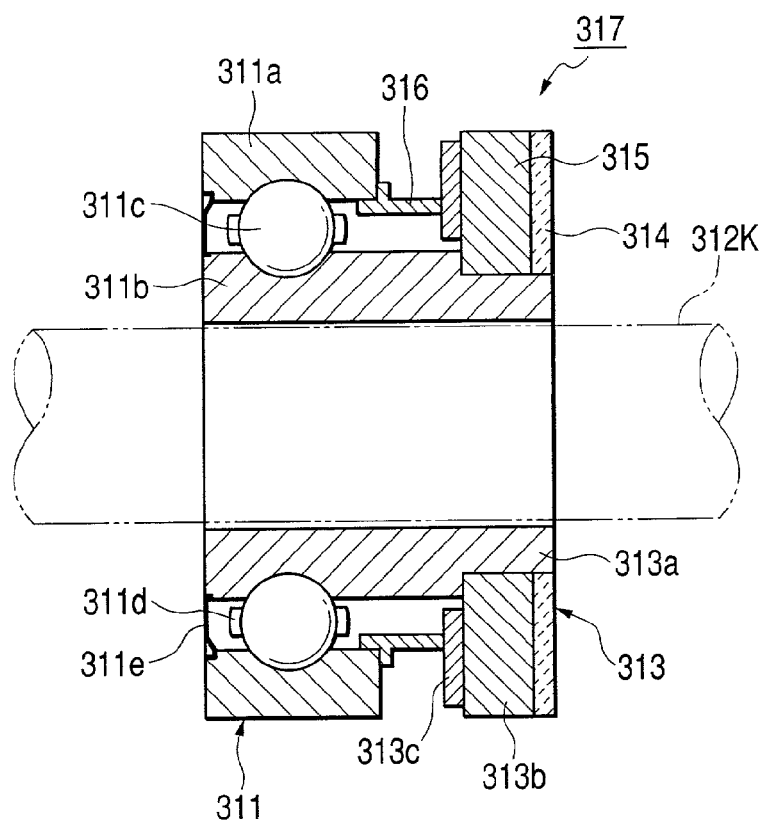
FIG. 13 is a section view of a ninth embodiment of a bearing with a motor according to the invention.
Figure 14:
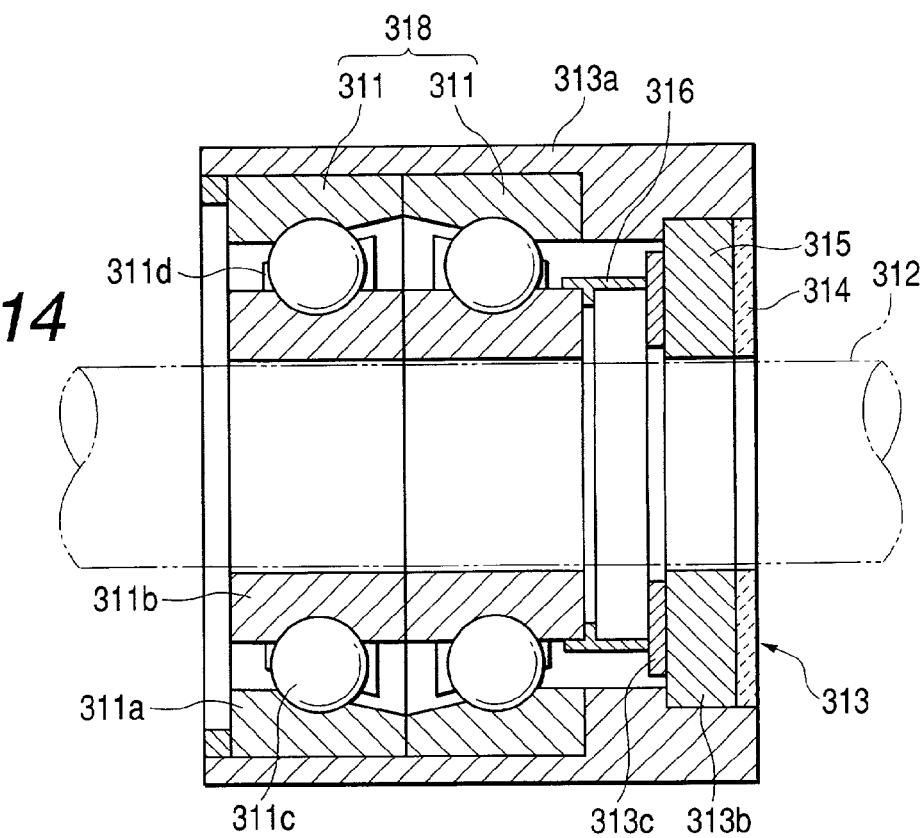
FIG. 14 is a section view of a tenth embodiment of a bearing with a motor according to the invention.
Figure 15:
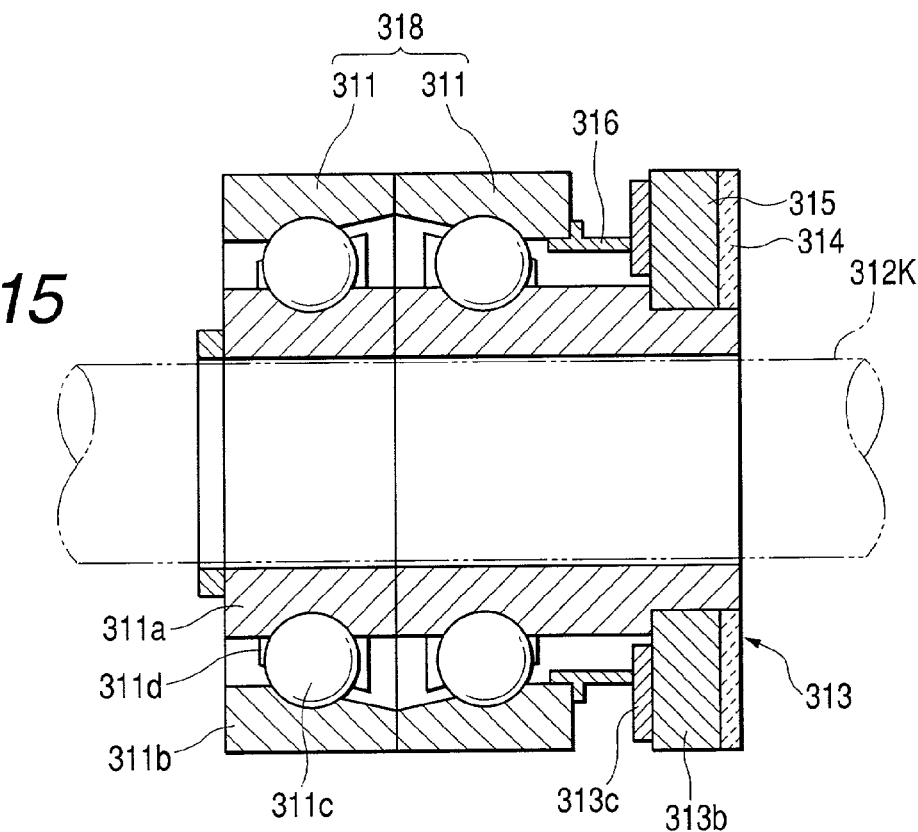
FIG. 15 is a section view of an eleventh embodiment of a bearing with a motor according to the invention.

Next, FIG. 13 shows a ninth embodiment of a bearing with a motor according to the invention. In FIG. 13, reference numeral 317 designates a rotation drive apparatus of a direct drive type. This rotation drive apparatus 317 includes a fixed shaft 312K for supporting a ball bearing 311, and an ultrasonic motor 313 for driving the outer ring 311a of the ball bearing 311.

The ultrasonic motor 313 comprises a motor housing 313a formed in a cylindrical shape, an annular stator 313b with its inner peripheral surface fixed to the outer peripheral surface of the motor housing 313a, and an annular rotor 313c so disposed as to be rotatable with respect to the stator 313b; and, the motor housing 313a is formed integrally with the inner ring 311b of the ball bearing 311.

The stator 313b is composed of a piezoelectric ceramics 14 and an annular body 315 made of metal which is bonded to the surface of the piezoelectric ceramics 14; and, in the surface of the portion of the annular body 315 that is contacted with the rotor 313c, there are formed a large number of comb-tooth-shaped grooves (not shown) along the circumferential direction of the annular body 315.

One end of a rotor connecting body 316 formed in a cylindrical shape is connected to the rotor 313c of the ultrasonic motor 313. The other end of the rotor connecting body 316 is coaxially connected to an outer ring 311a of the ball bearing 311, whereby the outer ring 311a of the ball bearing 311 can be rotated integrally with the rotor 313c. By the way, the ball bearing 311 includes not only the outer ring 311a and inner ring 311b but also rolling elements 311c, a retainer 311d and a seal 311e.

In the above structure, when the rotor 313c of the ultrasonic motor 313 is rotated, the outer ring 311a of the ball bearing 311 is rotated integrally with the rotor 313c. Here, assuming that the inner ring 311b is a stationary ring, the outer ring 311a of the ball bearing 311 can be rotated. Therefore, since the rotor 313c of the ultrasonic motor 313 is connected to the outer ring 311a of the ball bearing 311 by the rotor connecting body 316, the rotation force of the ultrasonic motor 313 is transmitted directly to the outer ring 311a, so that the outer ring 311a can be driven by the ultrasonic motor 313 with high efficiency.

In the above-mentioned first and second embodiments, as the bearing for supporting the rotation drive shaft, there is used a single-row deep groove ball bearing. However, as in a tenth embodiment of the invention shown in FIG. 14 and an eleventh embodiment of the invention shown in FIG. 15, as the bearing for supporting the rotation drive shaft, there can also be used a combined bearing 318 which is composed of two angular contact ball bearings.

Figure 16:
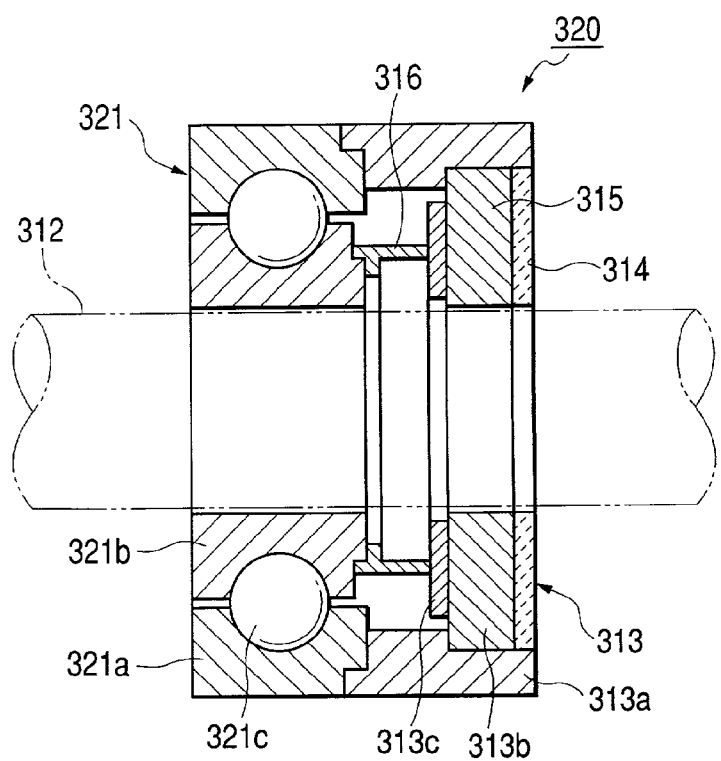
FIG. 16 is a section view of a twelfth embodiment of a bearing with a motor according to the invention.

Next, FIG. 16 shows a twelfth embodiment of a bearing with a motor according to the invention. In FIG. 16, reference numeral 320 designates a rotation drive apparatus of a direct drive type. This rotation drive apparatus 320 includes a rotation drive shaft 312 supported on a crossed ball bearing 321 and an ultrasonic motor 313 for driving the rotation drive shaft 312.

The ultrasonic motor 313 includes a motor housing 313a formed in a cylindrical shape, an annular stator 313b with its outer peripheral surface fixed to the inner peripheral surface of the motor housing 313a, and an annular rotor 313c so disposed as to be rotatable with respect to the stator 313b; and, to one end of the motor housing 313a, there is connected an outer ring 321a of the crossed ball bearing 321 in such a manner as to be coaxial with the motor housing 313a.

The stator 313b is comprised of a piezoelectric ceramics 314 and an annular body 315 made of metal which is bonded to the surface of the piezoelectric ceramics 314; and, in the surface of the portion of the annular body 315 that is contacted with the rotor 313c, a large number of grooves (not shown) are formed in a comb-tooth shape along the circumferential direction of the annular body 315.

One end of a rotor connecting body 316 formed in a cylindrical shape is connected to the rotor 313c of the ultrasonic motor 313. The other end of the rotor connecting body 316 is coaxially connected to an inner ring 321b of the crossed ball bearing 321, whereby the inner ring 321b of the crossed ball bearing 321 can be rotated integrally with the rotor 313c. By the way, the crossed ball bearing 321 includes not only the outer ring 321a and inner ring 321b but also a plurality of rolling elements 321c; and, the plurality of rolling elements 321c are arranged between the outer ring 321a and inner ring 321b in such a manner that the mutually adjoining rolling elements 321c intersect each other about at right angles.

In the above structure, in case where the rotor 313c of the ultrasonic motor 313 is rotated, not only the inner ring 321b of the crossed ball bearing 321 is rotated integrally with the rotor 313c but also the rotation drive shaft 312 supported on the crossed ball bearing 321 is rotated integrally with the inner ring 321b. Thus, since the rotor 313c of the ultrasonic motor 313 is connected to the inner ring 321b of the crossed ball bearing 321 by the rotor connecting body 316, the rotation force of the ultrasonic motor 313 is transmitted directly to the rotation drive shaft 312 through the inner ring 321b, so that the rotation drive shaft 312 can be driven by the ultrasonic motor 313 with high efficiency.

Figure 17:
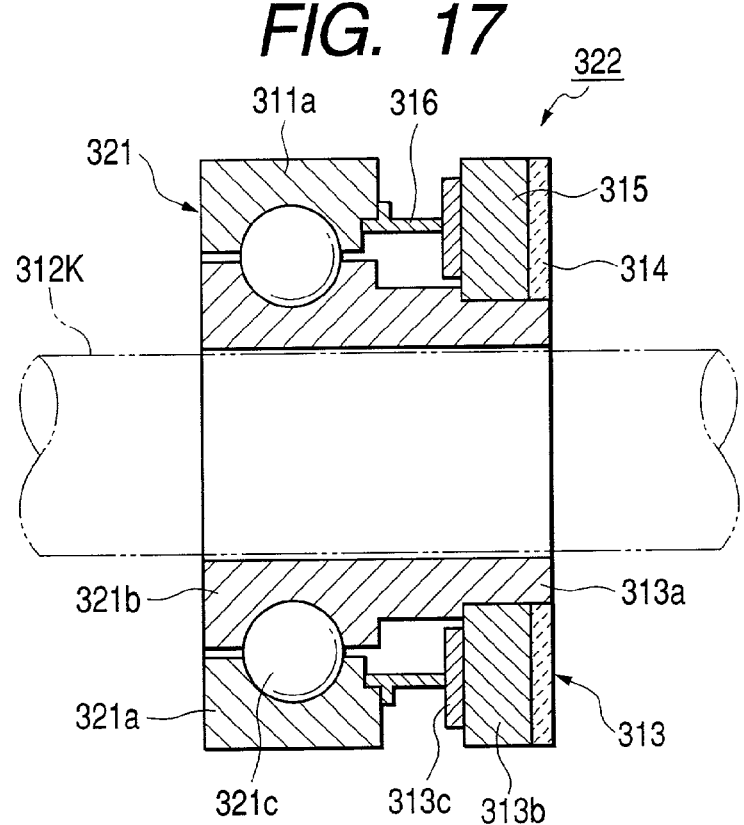
FIG. 17 is a section view of a thirteenth embodiment of a bearing with a motor according to the invention.
Figure 18:
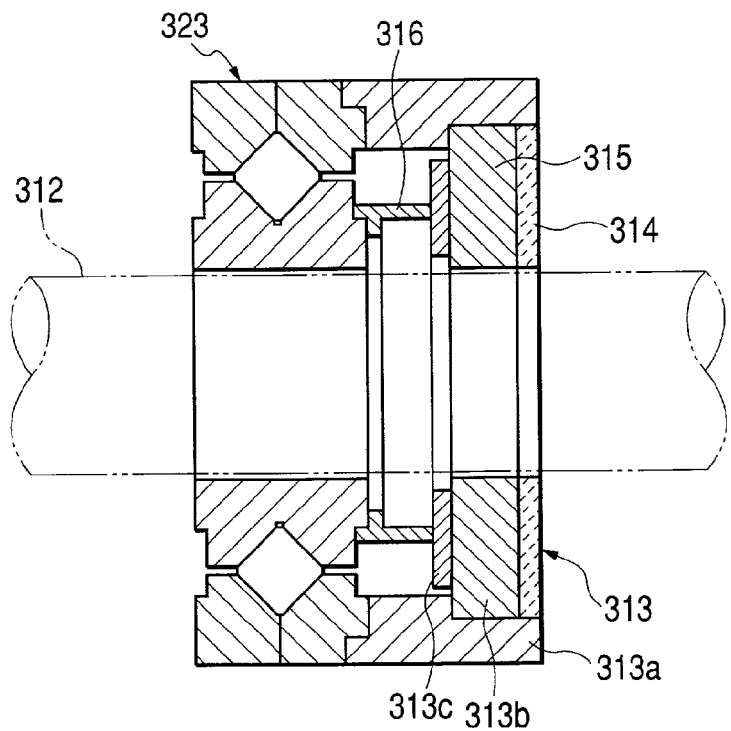
FIG. 18 is a section view of a fourteenth embodiment of a bearing with a motor according to the invention.
Figure 19:
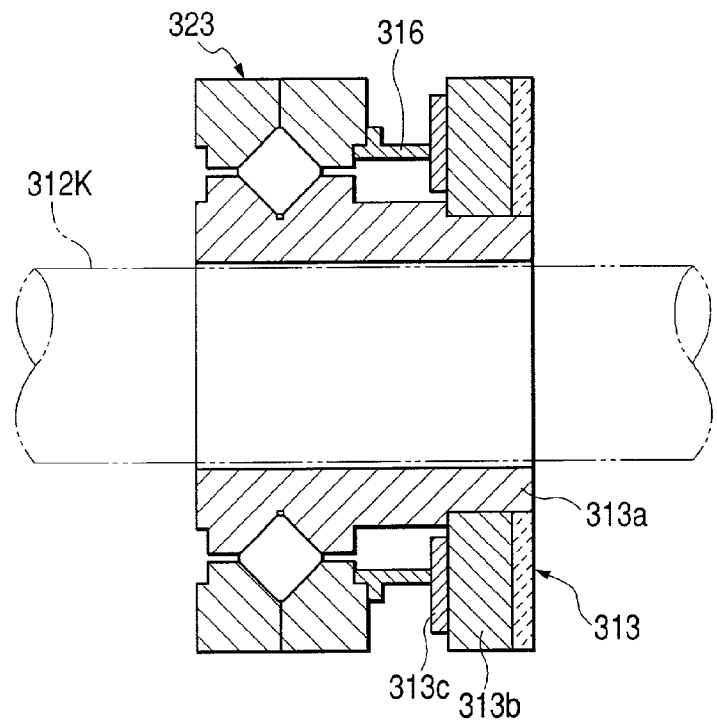
FIG. 19 is a section view of a fifteenth embodiment of a bearing with a motor according to the invention.

Next, FIG. 17 shows a thirteenth embodiment of a bearing with a motor according to the invention. In FIG. 17, reference numeral 322 designates a rotation drive apparatus of a direct drive type. This rotation drive apparatus 322 includes a fixed shaft 312K supported on a crossed ball bearing 321 and an ultrasonic motor 313 for driving the outer ring 321a of the crossed ball bearing 321.

The ultrasonic motor 313 includes a motor housing 313a formed in a cylindrical shape, an annular stator 313b with its inner peripheral surface fixed to the outer peripheral surface of the motor housing 313a, and an annular rotor 313c so disposed as to be rotatable with respect to the stator 313b; and, an inner ring 321b of the crossed ball bearing 321 is connected to one end of the motor housing 313a in such a manner as to be integral with the motor housing 313a.

The stator 313b is composed of a piezoelectric ceramics 314 and an annular body 315 made of metal which is bonded to the surface of the piezoelectric ceramics 314; and, in the surface of the portion of the annular body 315 that is contacted with the rotor 313c, a large number of grooves (not shown) are formed in a comb-tooth shape along the circumferential direction of the annular body 315.

One end of a rotor connecting body 316 formed in a cylindrical shape is connected to the rotor 313c of the ultrasonic motor 313. The other end of the rotor connecting body 316 is coaxially connected to an outer ring 321a of the crossed ball bearing 321, whereby the outer ring 321a of the crossed ball bearing 321 can be rotated integrally with the rotor 313c. By the way, the crossed ball bearing 321 includes not only the outer ring 321a and inner ring 321b but also a plurality of rolling elements 321c; and, the plurality of rolling elements 321c are arranged between the outer ring 321a and inner ring 321b in such a manner that the mutually adjoining rolling elements 321c intersect each other about at right angles.

In the present structure, in case where the rotor 313c of the ultrasonic motor 313 is rotated, the outer ring 321a of the crossed ball bearing 321 is rotated integrally with the rotor 313c. Here, assuming that the inner ring 321b is a stationary ring, the outer ring 321a of the crossed ball bearing 321 can be rotated. Therefore, since the rotor 313c of the ultrasonic motor 313 is connected to the outer ring 321a of the crossed ball bearing 321 by the rotor connecting body 316, the rotation force of the ultrasonic motor 313, when the inner ring 321b is fixed to the fixed shaft 312K, is transmitted directly to the outer ring 321a, so that the rotation drive shaft 312 can be driven by the ultrasonic motor 313 with high efficiency.

In the above-mentioned twelfth and thirteenth embodiments, as the bearing for supporting the rotation drive shaft 312, there is used the crossed ball bearing 321. However, as in a fourteenth embodiment of the invention shown in FIG. 18 and a fifteenth embodiment of the invention shown in FIG. 19, a crossed roller bearing 323 can be used as the bearing for supporting the rotation drive shaft 312.

Figure 20:
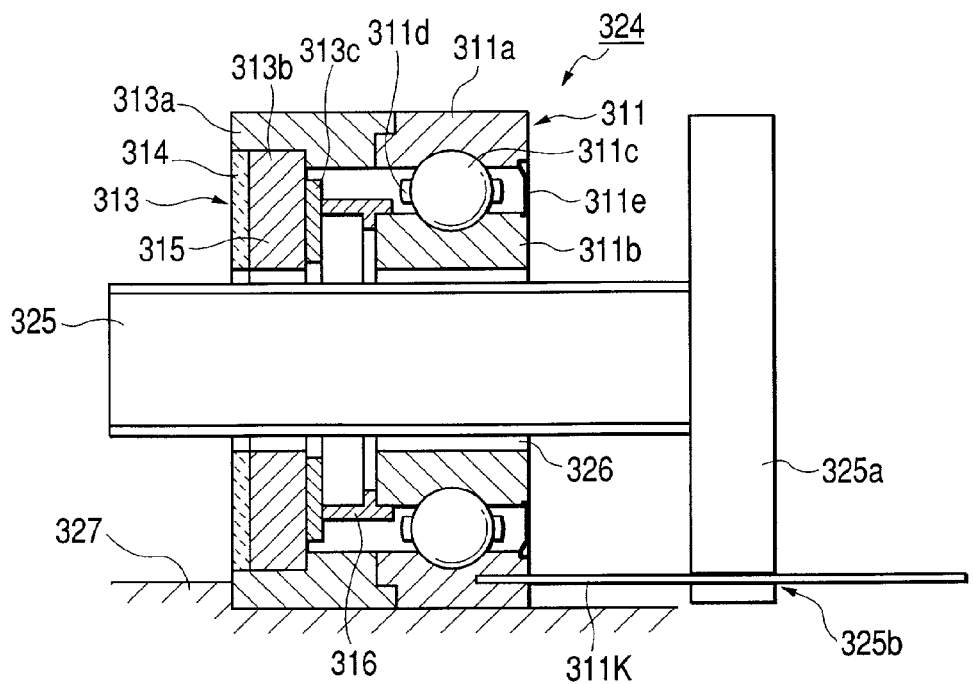
FIG. 20 is a section view of a sixteenth embodiment of a bearing with a motor according to the invention.
Figure 21:
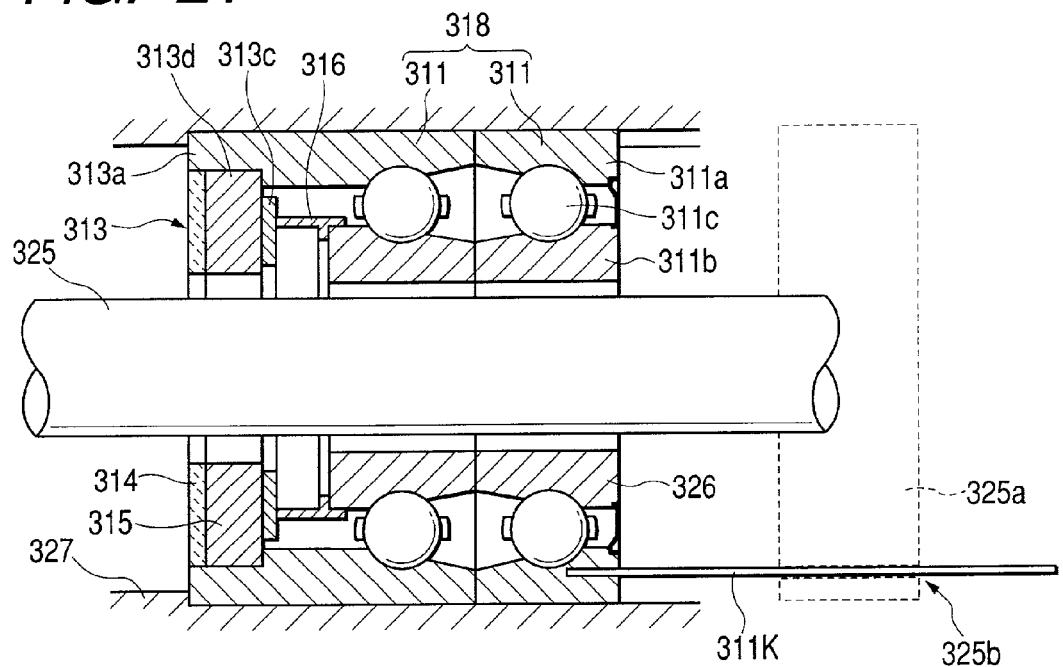
FIG. 21 is a section view of a seventeenth embodiment of a bearing with a motor according to the invention.

Next, FIG. 20 shows a sixteenth embodiment of a bearing with a motor according to the invention. In FIG. 20, reference numeral 324 designates a screw-type reciprocating apparatus. This screw-type reciprocating apparatus 324 comprises a nut 326 for reciprocating a screw shaft 325 in the axial direction thereof and an ultrasonic motor 313 for driving the nut 326. Also, the screw-type reciprocating apparatus 324 further includes a ball bearing 311 for supporting the nut 326, while the inner ring 311b of the ball bearing 311 is formed integrally with the nut 326.

The ultrasonic motor 313 includes a motor housing 313a formed in a cylindrical shape, an annular stator 313b with its outer peripheral surface fixed to the inner peripheral surface of the motor housing 313a, and an annular rotor 313c so disposed as to be rotatable with respect to the stator 313b; and, an outer ring 311a of the ball bearing 311 is connected to one end of the motor housing 313a in such a manner as to be coaxial with the motor housing 313a.

The stator 313b is composed of a piezoelectric ceramics 31 and an annular body 315 made of metal which is bonded to the surface of the piezoelectric ceramics 314; and, in the surface of the portion of the annular body 315 that is contacted with the rotor 313c, a large number of grooves (not shown) are formed in a comb-tooth shape along the circumferential direction of the annular body 315.

One end of a rotor connecting body 316 formed in a cylindrical shape is connected to the rotor 313c of the ultrasonic motor 313. The other end of the rotor connecting body 316 is coaxially connected to an inner ring 311b of the ball bearing 311, whereby the inner ring 311b of the ball bearing 311 can be rotated integrally with the rotor 313c. By the way, the ball bearing 311 includes not only the outer ring 311a and inner ring 311b but also rolling elements 311c, a retainer 311d and a seal 311e. Also, the outer ring 311a of the ball bearing 311 and motor housing 313a are fixed to a base 327.

In the above structure, when a high-frequency voltage is applied to the piezoelectric ceramics 314 of the ultrasonic motor 313, the piezoelectric ceramics 314 generates ultrasonic vibrations due to electrostriction. Then, the ultrasonic vibrations generated by the piezoelectric ceramics 314, while flexing the stator 313b, advance continuously in the circumferential direction of the stator 313b as progressive waves, with the result that the rotor 313c is rotated in the opposite direction to the advancing direction of the progressive waves. In case where the rotor 313c of the ultrasonic motor 313 is rotated in this manner, not only the inner ring 311b of the ball bearing 311 is rotated integrally with the rotor 313c but also the nut 326 formed integrally with the inner ring 311b is rotated. The rotation of the screw shaft 325 is prevented by a rotation preventive guide rod 311K inserted through a rotation preventive guide 325b disposed on the flange 325a of the screw shaft 325 which can be threadedly engaged with the nut 326, but the screw shaft 325 is reciprocated in the axial direction thereof.

In the sixteenth embodiment, because the rotor 313c of the ultrasonic motor 313 for driving the nut 326 is connected to the inner ring 311b of the ball bearing 311 for supporting the nut 326 by the rotor connecting body 316, the rotation force of the ultrasonic motor 313 is transmitted directly to the nut 326 through the inner ring 311b of the ball bearing 311. Thanks to this, the nut 326 can be driven by the ultrasonic motor 313 with high efficiency and thus the screw shaft 325 can be reciprocated back and forth with high efficiency.

By the way, in the sixteenth embodiment, as the bearing for supporting the nut 326, there is used a single-row deep groove ball bearing. However, as in a seventeenth embodiment of the invention shown in FIG. 21, a combined bearing 318 which is composed of two angular contact ball bearings can also be used as the bearing for supporting the nut 326.

Figure 22:
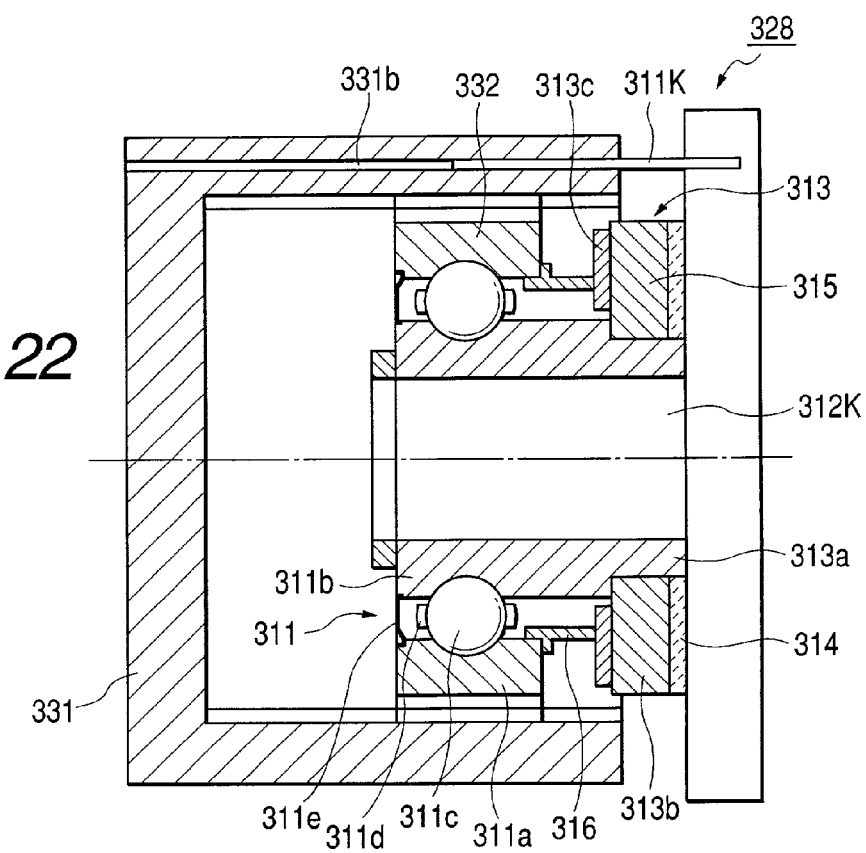
FIG. 22 is a section view of an eighteenth embodiment of a bearing with a motor according to the invention.
Figure 23:
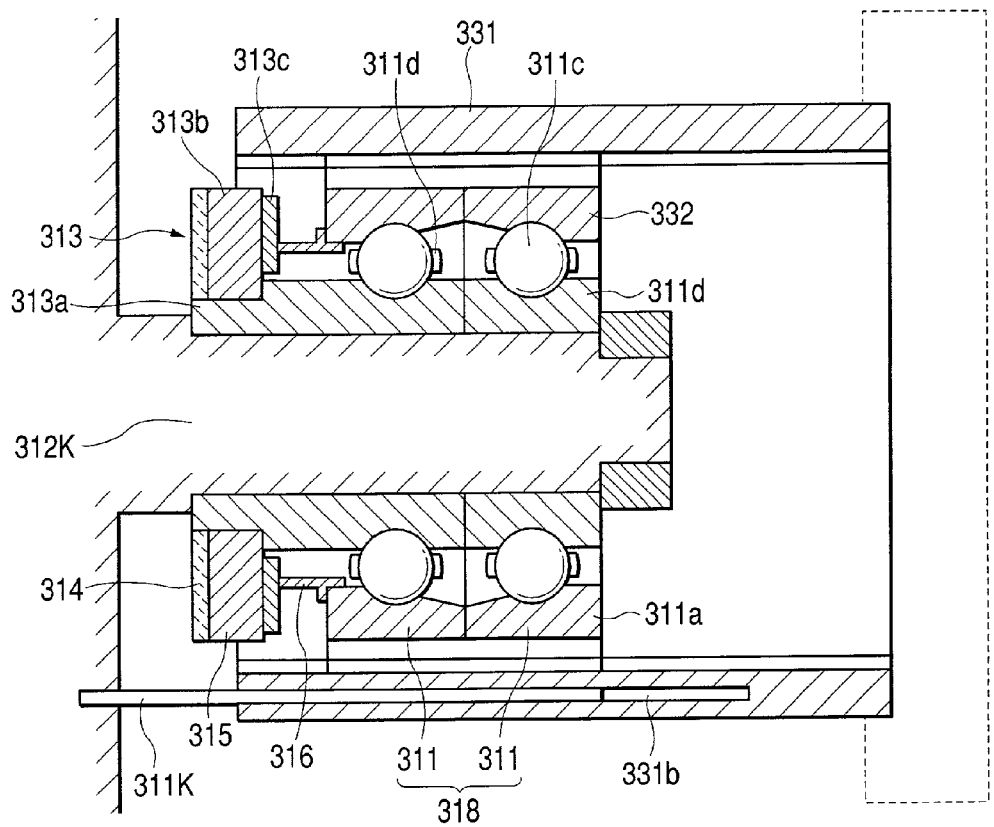
FIG. 23 is a section view of a nineteenth embodiment of a bearing with a motor according to the invention.

Next, FIG. 22 shows an eighteenth embodiment of a bearing with a motor according to the invention. In FIG. 22, reference numeral 328 designates a screw-type reciprocating apparatus. This screw-type reciprocating apparatus 328 comprises a nut 332 for reciprocating a hollow screw shaft 331 in the axial direction thereof and an ultrasonic motor 313 for driving and rotating the nut 332. Also, the screw-type reciprocating apparatus 328 further includes a ball bearing 311 for supporting the screw shaft 331; and, the outer ring 311a of the ball bearing 311 is formed integrally with the nut 332 and the inner ring 11b of the ball bearing 311 and motor housing 313a are fixed by a fixed body 312K. Also, a rotation preventive guide rod 311K is inserted and guided into the rotation preventive guide portion 331b of the hollow screw shaft 331 to thereby prevent the hollow screw shaft 331 against rotation.

The ultrasonic motor 313 comprises a motor housing 313a formed in a cylindrical shape, an annular stator 313b with its inner peripheral surface fixed to the outer peripheral surface of the motor housing 313a, and an annular rotor 313c so disposed as to be rotatable with respect to the stator 313b, while the motor housing 313a is formed integrally with the inner ring 311b of the ball bearing 311. Further, the inner peripheral surface of the motor housing 313a is fitted with and fixed to a fixed body 312K.

The stator 313b is composed of a piezoelectric ceramics 314 and an annular body 315 which is made of metal and is bonded to the surface of the piezoelectric ceramics 314; and, in the surface of the portion of the annular body 315 that is contacted with the rotor 313c, a large number of grooves (not shown) are formed in a comb-tooth shaped along the circumferential direction of the annular body 315.

One end of a rotor connecting body 316 formed in a cylindrical shape is connected to the rotor 313c of the ultrasonic motor 313, there is connected. The other end of the rotor connecting body 316 is coaxially connected to the outer ring 311a of the ball bearing 311, whereby the outer ring 311a of the ball bearing 311 can be rotated integrally with the rotor 313c. By the way, the ball bearing 311 includes not only the outer ring 311a and inner ring 311b but also rolling elements 311c, a retainer 311d and a seal 311e.

In the above structure, in case where the rotor 313c of the ultrasonic motor 313 is rotated, not only the outer ring 311a of the ball bearing 311 formed integrally with the rotor 313c is rotated but also the nut 332 formed integrally with the outer ring 311a is rotated. And, due to the rotation of the nut 332 as well as due to the rotation preventive guide portion 331b and rotation preventive guide rod 311K, the hollow screw shaft 331 is reciprocated in the axial direction thereof.

In the eighteenth embodiment, since the rotor 313c of the ultrasonic motor 313 for driving the screw shaft 331 is connected to the outer ring 311a of the ball bearing 311 for supporting the screw shaft 331 by the rotor connecting body 316, the rotation force of the ultrasonic motor 313 is transmitted directly to the screw shaft 331 through the outer ring 311a of the ball bearing 311 and nut 332. This allows the ultrasonic motor 313 to drive the screw shaft 331 with high efficiency.

By the way, in the eighteenth embodiment, as the bearing for supporting the screw shaft 331, there is used the single-row deep groove ball bearing. However, as in a nineteenth embodiment of the invention shown in FIG. 23, a combined bearing 318 which is composed of two angular contact ball bearing 311 can also be used as the bearing for supporting the screw shaft 331.

Figure 24:
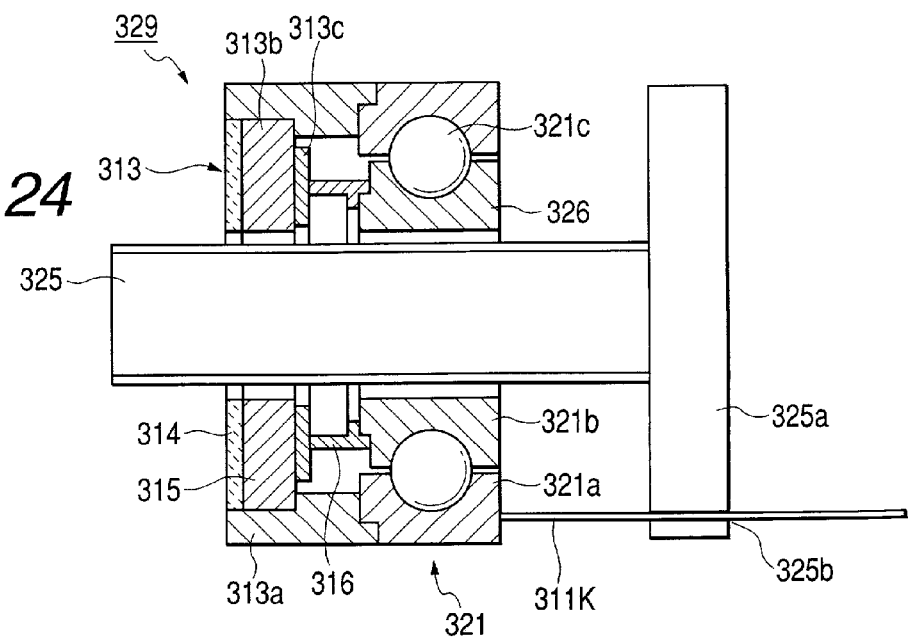
FIG. 24 is a section view of a twentieth embodiment of a bearing with a motor according to the invention.
Figure 25:
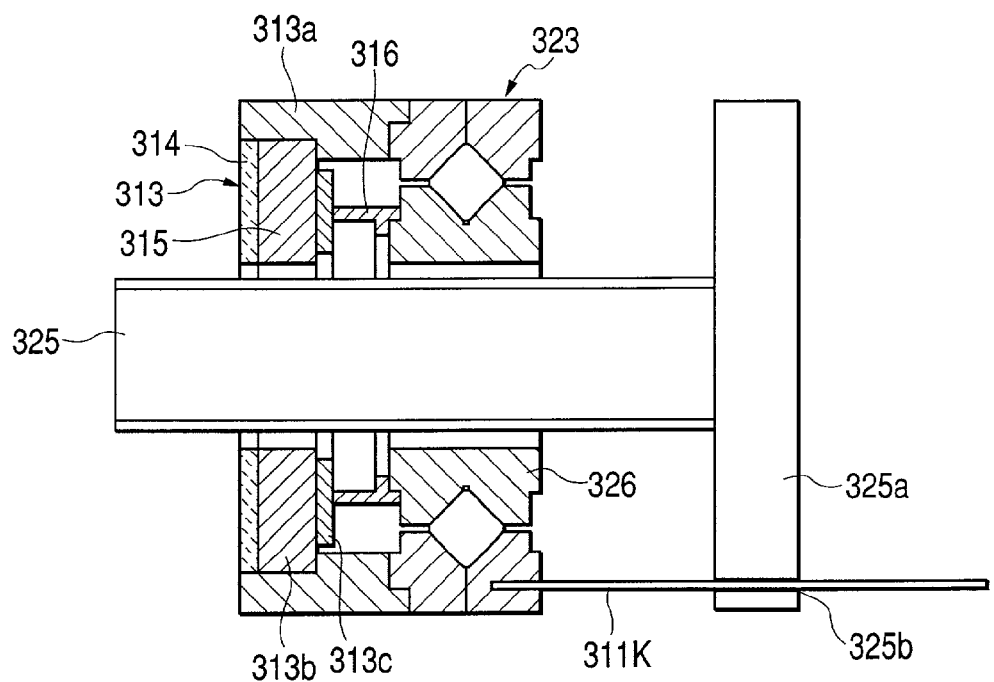
FIG. 25 is a section view of a twenty-first embodiment of a bearing with a motor according to the invention.

Next, FIG. 24 shows a twentieth embodiment of a bearing with a motor according to the invention. In FIG. 24, reference numeral 329 designates a screw-type reciprocating apparatus. This screw-type reciprocating apparatus 329 comprises a nut 326 for reciprocating a screw shaft 325 in the axial direction thereof and an ultrasonic motor 313 for driving and rotating the nut 326. Also, the screw-type reciprocating apparatus 329 further includes a crossed ball bearing 321 for supporting the nut 326; and, the inner ring 321b of the crossed ball bearing 321 is formed integrally with the nut 326.

The ultrasonic motor 313 comprises a motor housing 313a formed in a cylindrical shape, an annular stator 313b with its outer peripheral surface fixed to the inner peripheral surface of the motor housing 313a, and an annular rotor 313c so disposed as to be rotatable with respect to the stator 313b, while one end of the motor housing 313a is connected coaxially with the inner ring 321b of the crossed ball bearing 321.

The stator 313b is composed of a piezoelectric ceramics 314 and an annular body 315 which is made of metal and is bonded to the surface of the piezoelectric ceramics 314; and, in the surface of the portion of the annular body 315 that is contacted with the rotor 313c, a large number of grooves (not shown) are formed in a comb-tooth shape along the circumferential direction of the annular body 315.

One end of a rotor connecting body 316 formed in a cylindrical shape is connected to the rotor 313c of the ultrasonic motor 313. The other end of the rotor connecting body 316 is coaxially connected to the outer ring 311a of the ball bearing 311, whereby the inner ring 321b of the crossed ball bearing 321 can be rotated integrally with the rotor 313c. By the way, the crossed ball bearing 321 includes not only the outer ring 321a and inner ring 321b but also a plurality of rolling elements 321c, while the plurality of rolling elements 321c are arranged between the outer ring 321a and inner ring 321b in such a manner that the mutually adjoining rolling elements 321c intersect each other about at right angles.

In the above structure, in case where the rotor 313c of the ultrasonic motor 313 is rotated, not only the inner ring 321b of the crossed ball bearing 321 formed integrally with the rotor 313c is rotated but also the nut 326 formed integrally with the inner ring 321b is rotated. And, due to the rotation of the nut 326 as well as due to the rotation preventive guide portion 325b and rotation preventive guide rod 311K, the screw shaft 325 is reciprocated in the axial direction thereof.

In the twentieth embodiment, since the rotor 313c of the ultrasonic motor 313 for driving the nut 326 is connected to the inner ring 321b of the crossed ball bearing 321 by the rotor connecting body 316, the rotation force of the ultrasonic motor 313 is transmitted directly to the nut 326 through the inner ring 321b of the crossed ball bearing 321 and, therefore, the nut 326 can be driven by the ultrasonic motor 313 with high efficiency.

By the way, in the twentieth embodiment, as the bearing for supporting the nut 326, there is used the crossed ball bearing 321. However, as in a twenty-first embodiment of the invention shown in FIG. 25, a crossed roller bearing 323 can also be used as the bearing for supporting the nut 326, instead of the crossed ball bearing 321.

Figure 26:
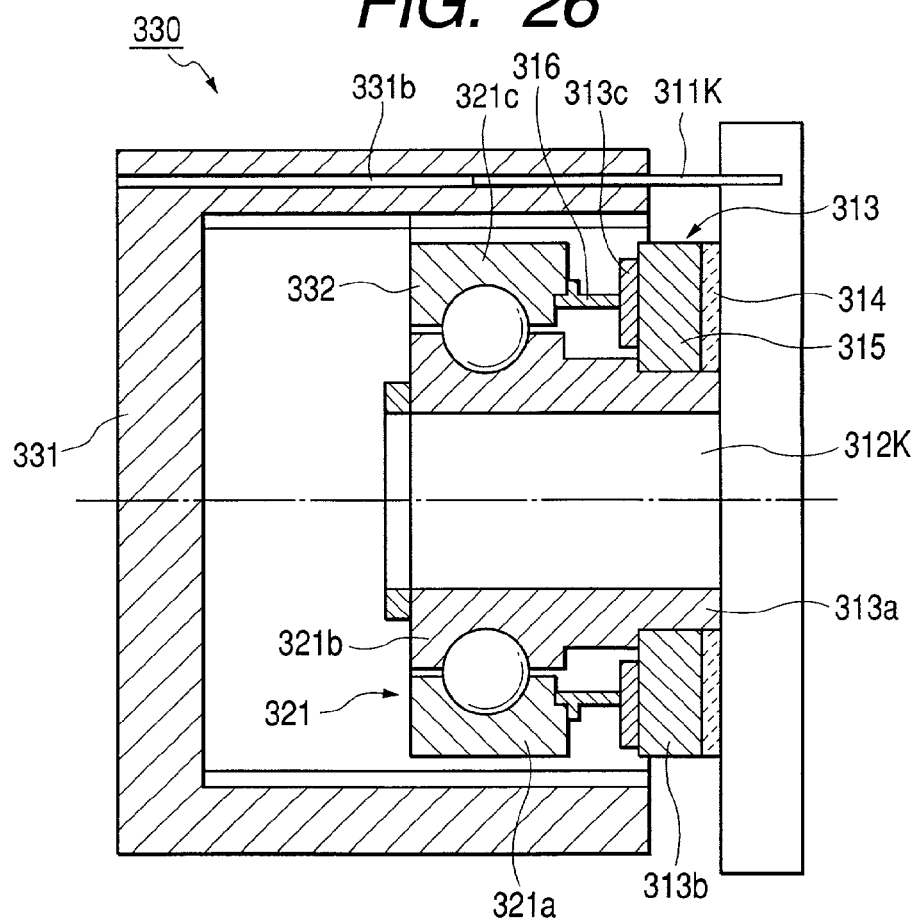
FIG. 26 is a section view of a twenty-second embodiment of a bearing with a motor according to the invention.
Figure 27:
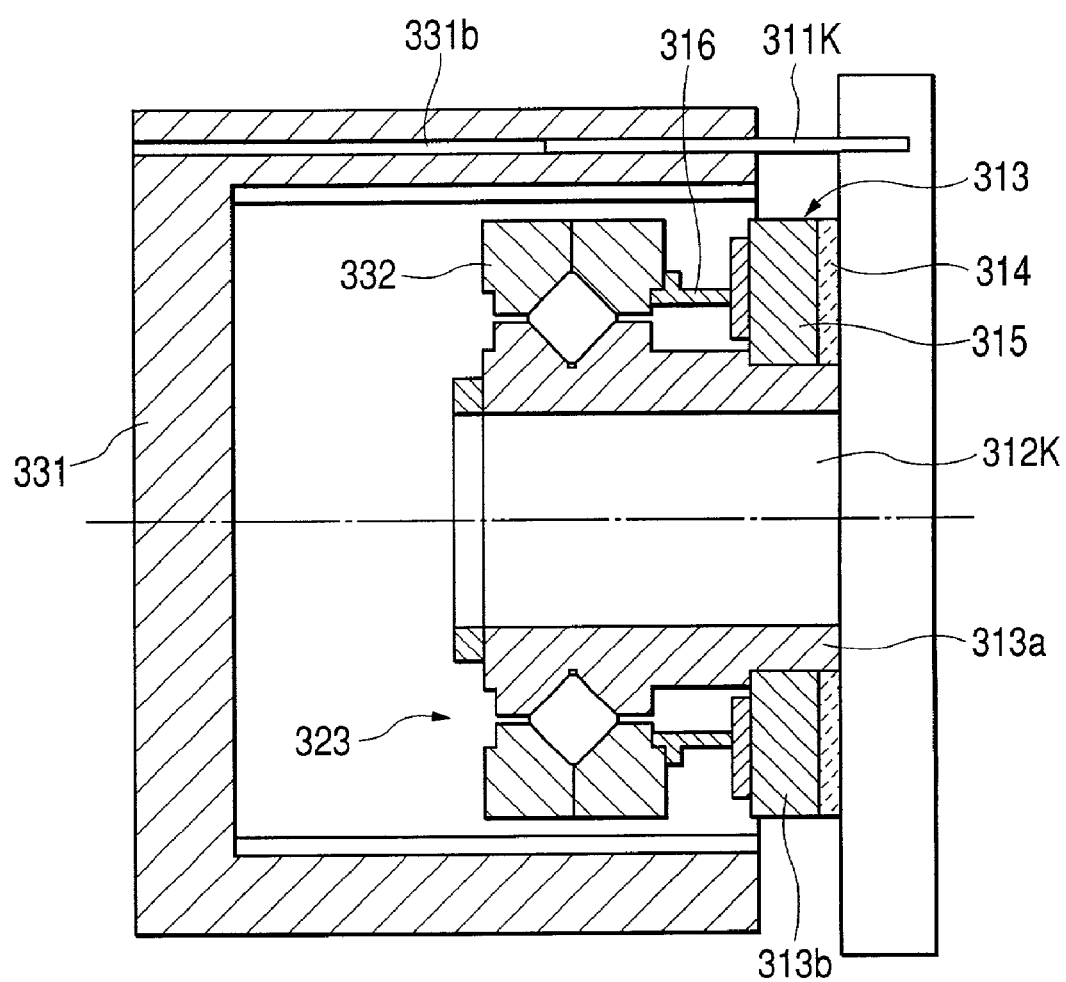
FIG. 27 is a section view of a twenty-third embodiment of a bearing with a motor according to the invention.

Next, FIG. 26 shows a twenty-second embodiment of a bearing with a motor according to the invention. In FIG. 26, reference numeral 330 designates a screw-type reciprocating apparatus. This screw-type reciprocating apparatus 330 comprises a nut 332 for reciprocating a hollow screw shaft 331 in the axial direction thereof and an ultrasonic motor 313 for driving and rotating the nut 332. Also, the screw-type reciprocating apparatus 330 further includes a crossed ball bearing 321 for supporting the screw shaft 331 through the nut 326; and, the outerring 321a of the crossed ball bearing 321 is formed integrally with the nut 332.

The ultrasonic motor 313 comprises a motor housing 313a formed in a cylindrical shape, an annular stator 313b with its inner peripheral surface fixed to the outer peripheral surface of the motor housing 313a, and an annular rotor 313c so disposed as to be rotatable with respect to the stator 313b, while one end of the motor housing 313a is formed integrally with the inner ring 321b of the crossed ball bearing 321.

The stator 313b is structured such that an annular body 315 made of metal is bonded to the surface of a piezoelectric ceramics 314; and, in the surface of the portion of the annular body 315 that is contacted with the rotor 313c, a large number of grooves (not shown) are formed in a comb-tooth shape along the circumferential direction of the annular body 315.

To the rotor 313c of the ultrasonic motor 313, there is connected one end of a rotor connecting body 316 formed in a cylindrical shape. The other end of the rotor connecting body 316 is coaxially connected to the outer ring 321a of the ball bearing 311, whereby the outer ring 321a of the crossed ball bearing 321 can be rotated integrally with the rotor 313c. By the way, the crossed ball bearing 321 includes not only the outer ring 321a and inner ring 321b but also a plurality of rolling elements 321c, while the plurality of rolling elements 321c are arranged between the outer ring 321a and inner ring 321b in such a manner that the mutually adjoining rolling elements 321c intersect each other about at right angles.

In the above structure, when the rotor 313c of the ultrasonic motor 313 is rotated, not only the outer ring 311a of the crossed ball bearing 321 is rotated integrally with the rotor 313c but also the nut 332 formed integrally with the outer ring 321a is rotated. And, due to the rotation of the nut 332, the screw shaft 331 is reciprocated in the axial direction thereof.

In the twenty-third embodiment, since the rotor 313c of the ultrasonic motor 313 for driving the nut 26 is connected to the outer ring 321a of the crossed ball bearing 321 for supporting the screw shaft 331 by the rotor connecting body 316, the rotation force of the ultrasonic motor 313 is transmitted directly to the screw shaft 331 through the outer ring 321a of the crossed ball bearing 321 and nut 332 and, therefore, the screw shaft 331 can be driven by the ultrasonic motor 313 with high efficiency.

By the way, in the twenty-second embodiment, as the bearing for supporting the screw shaft 331, there is used the crossed ball bearing 321. However, as in a twenty-third embodiment of the invention shown in FIG. 27, a crossed roller bearing 323 can also be used as the bearing for supporting the screw shaft 331, instead of the crossed ball bearing 321.

As has been described heretofore, according to the bearing with a motor of the invention, since the rotation force of the ultrasonic motor can be transmitted directly to the rotation drive shaft through the outer ring or inner ring of the bearing, the driven body such as the rotation drive shaft can be driven by the ultrasonic motor with high efficiency.

Next, description will be given below of twenty-fourth to twenty-fifth embodiments of a bearing motor according to the invention with reference to FIGS. 24–37.

Figure 28:
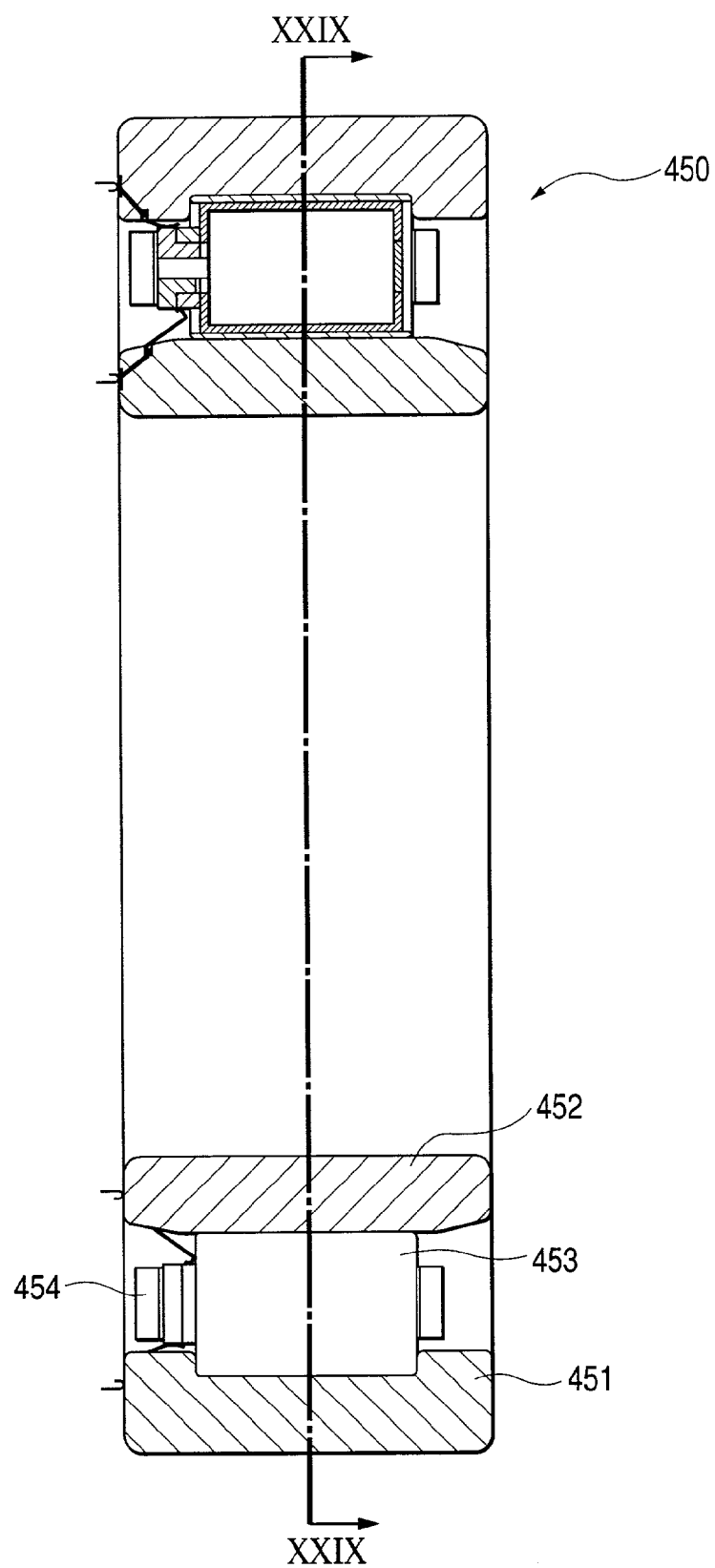
FIG. 28 is an axially sectional view of a bearing motor according to a twenty-fourth embodiment of the invention.
Figure 29:
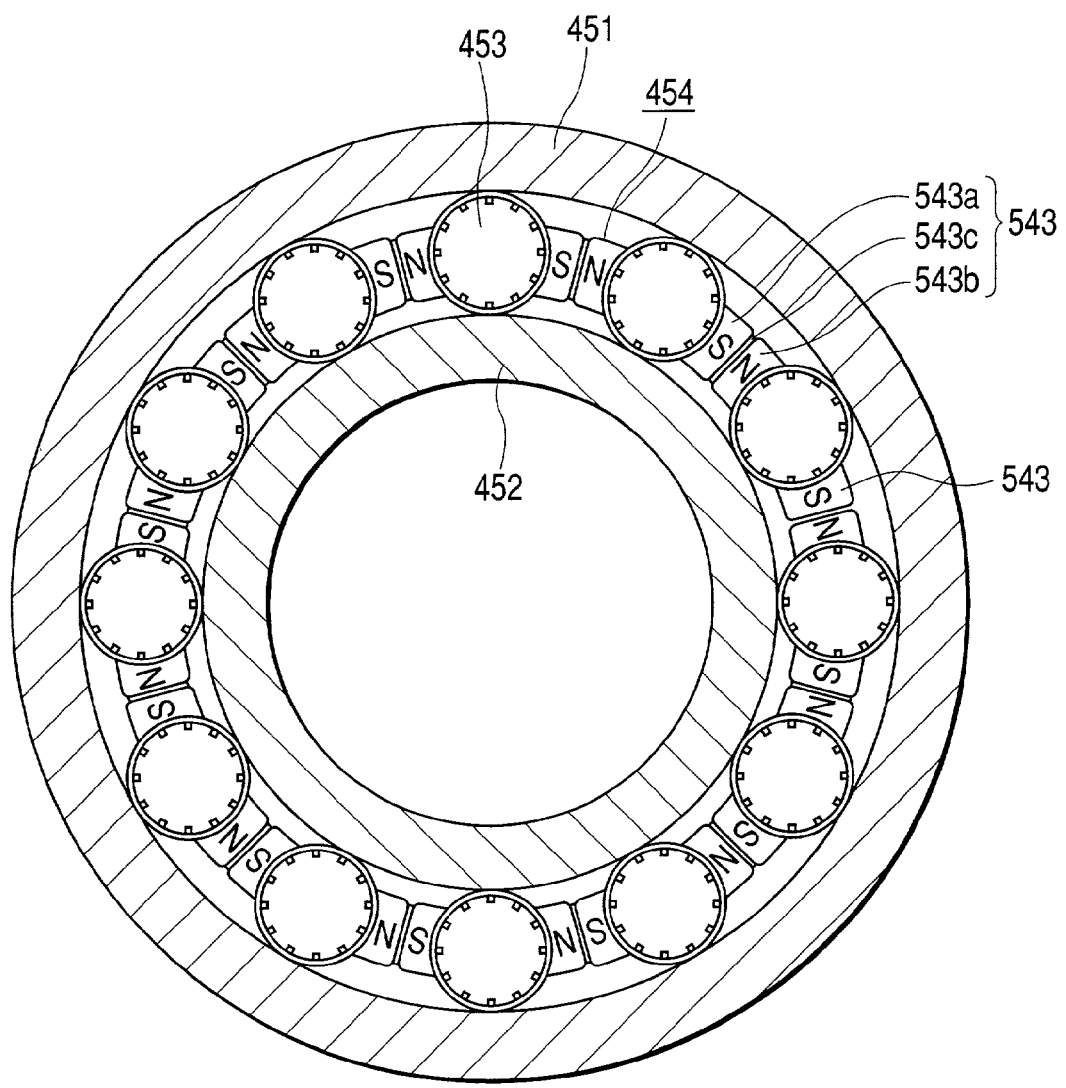
FIG. 29 is a section view taken along the arrow line XXIX—XXIX shown in FIG. 28.

FIGS. 28 to 36 respectively show the twenty-fourth embodiment of a bearing motor according to the invention. As shown in FIGS. 28 and 29, a bearing motor 450 according to the twenty-fourth embodiment of the invention comprises an outer ring-shaped member 451, an inner ring-shaped member 452 disposed inside the outer ring-shaped member 451, a large number of roller-shaped rotors 453 rollably interposed between the inner ring-shaped member 452 and outer ring-shaped member 451, and a retainer 454 for holding these roller-shaped rotors 453 almost at regular intervals in the peripheral direction of the inner ring-shaped member 452 and outer ring-shaped member 451.

Figure 30:
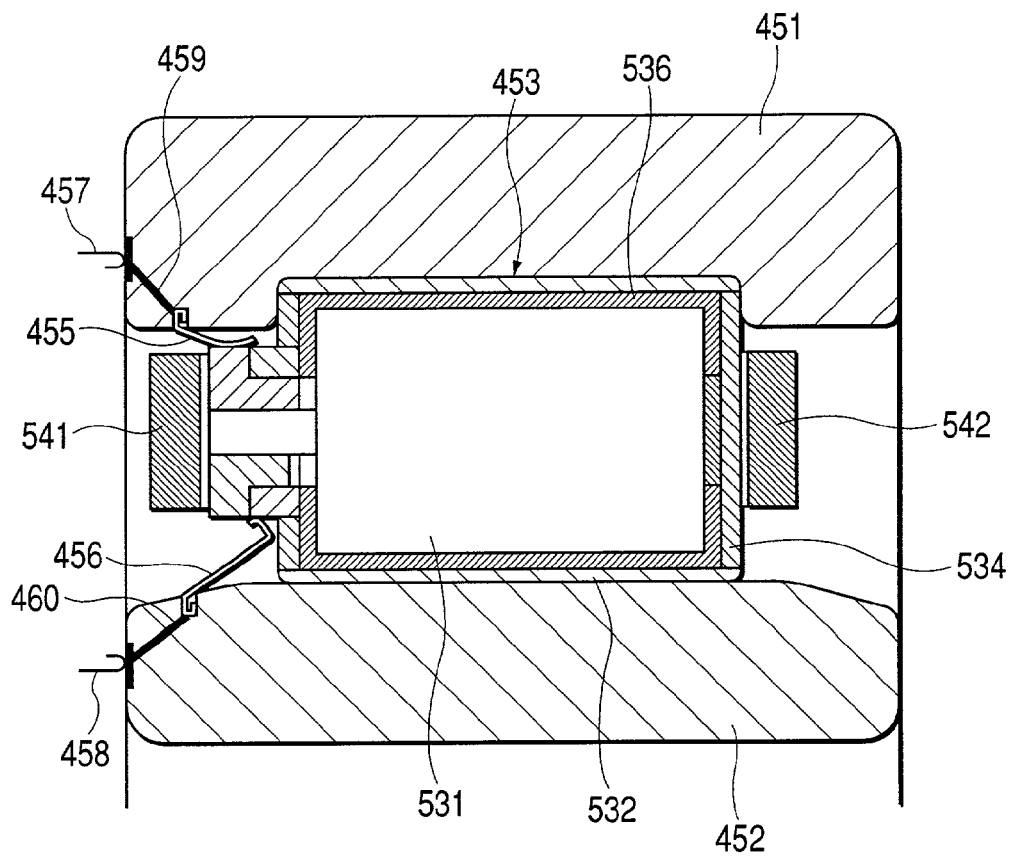
FIG. 30 is a partially enlarged section view of FIG. 28.
Figure 31:
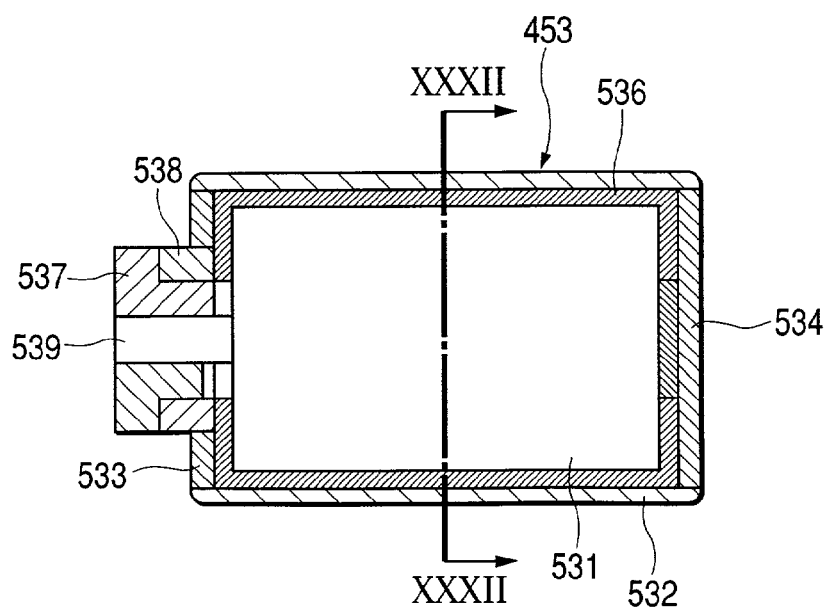
FIG. 31 is an axially sectional view of a roller-shaped rotor shown in FIG. 30.
Figure 32:
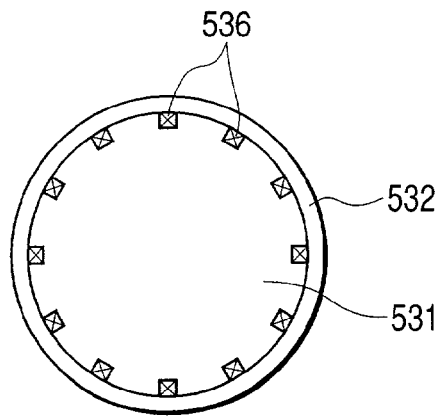
FIG. 32 is a section view taken along the arrow line XXXII—XXXII shown in FIG. 31.

Each of the roller-shaped rotors 453, as shown in FIGS. 30 to 32, comprises a cylindrical-shaped or circular-cone-shaped (in the present embodiment, cylindrical-shaped) rotor core 531, an outer tube 532 fitted with the peripheral surface of the rotor core 531, and two circular end plates 533, 534 for closing the opening ends of the outer tube 532.

Figure 33:
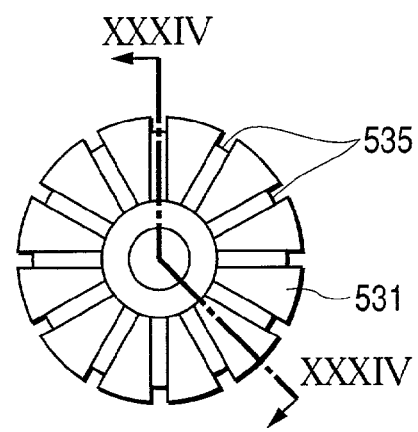
FIG. 33 is a left section view of a rotor core shown in FIG. 31.
Figure 34:
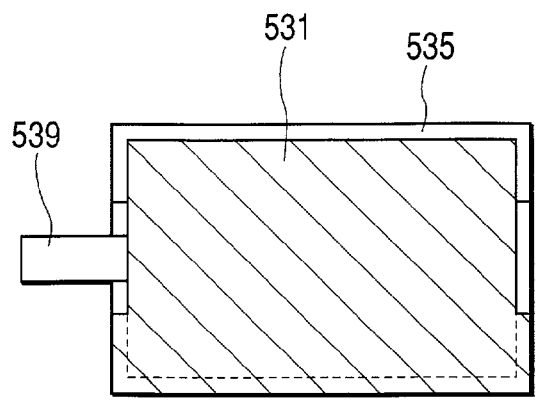
FIG. 34 is a section view taken along the arrow line XXXIV—XXXIV shown in FIG. 33.
Figure 35:
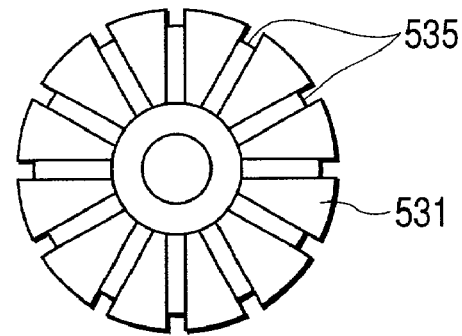
FIG. 35 is a right section view of the rotor core shown in FIG. 31.

As shown in FIGS. 33 to 35, a plurality of grooves 535 are formed on the peripheral surface of the rotor core 531 along the axial direction of the rotor core 531. These grooves 535 are formed almost at regular intervals in the peripheral direction of the rotor core 531, while a field coil 536 (see FIGS. 31 and 32) is wound in each of the grooves 535.

The two ends of the field coil 536 are connected to a pair of energizing sleeves 537, 538 respectively shown in FIG. 31. These energizing sleeves 537, 538 are mounted on a shaft 539 projected from the side surface of the roller-shaped rotor 453 in such a manner that they are electrically insulated, while one energizing sleeve 537 is in contact with a ring-shaped energizing brush 455 (see FIG. 30) mounted on the outer ring-shaped member 451.

On the other hand, the other energizing sleeve 538 is in contact with a ring-shaped energizing brush 456 mounted on the inner ring-shaped member 452. Field currents (direct currents) can be supplied to these ring-shaped energizing brushes 455, 456 from connecting terminals 457, 458 disposed on the side surfaces of the outer and inner ring-shaped members 451 and 452 through energizing paths 459, 460 formed in the interior portions of the outer and inner ring-shaped members 451 and 452. By the way, the outer and inner ring-shaped members 451 and 452 are electrically insulated from the ring-shaped energizing brushes 455, 456, connecting terminals 457, 458, and energizing paths 459, 460.

Figure 36A:
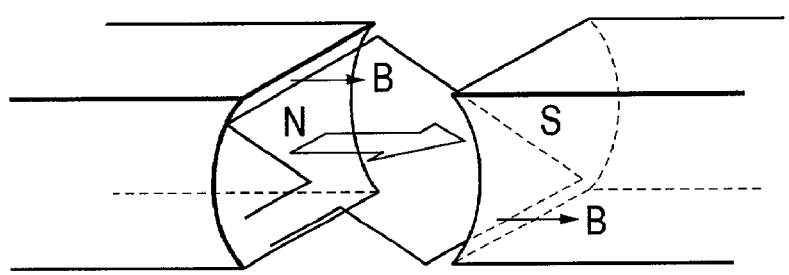
FIGS. 36a and 36b are explanatory views of the operation principle of a DC motor.
Figure 36B:
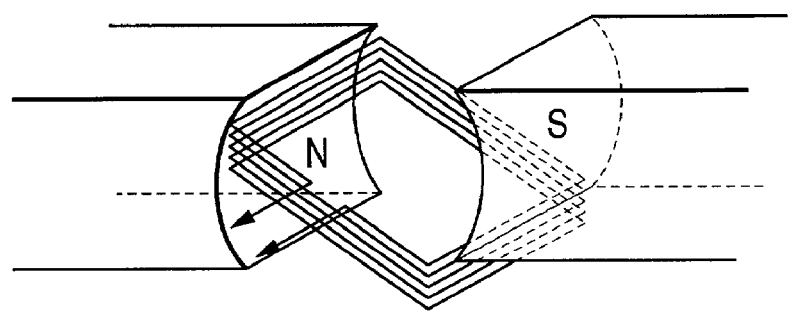
Figure 37:
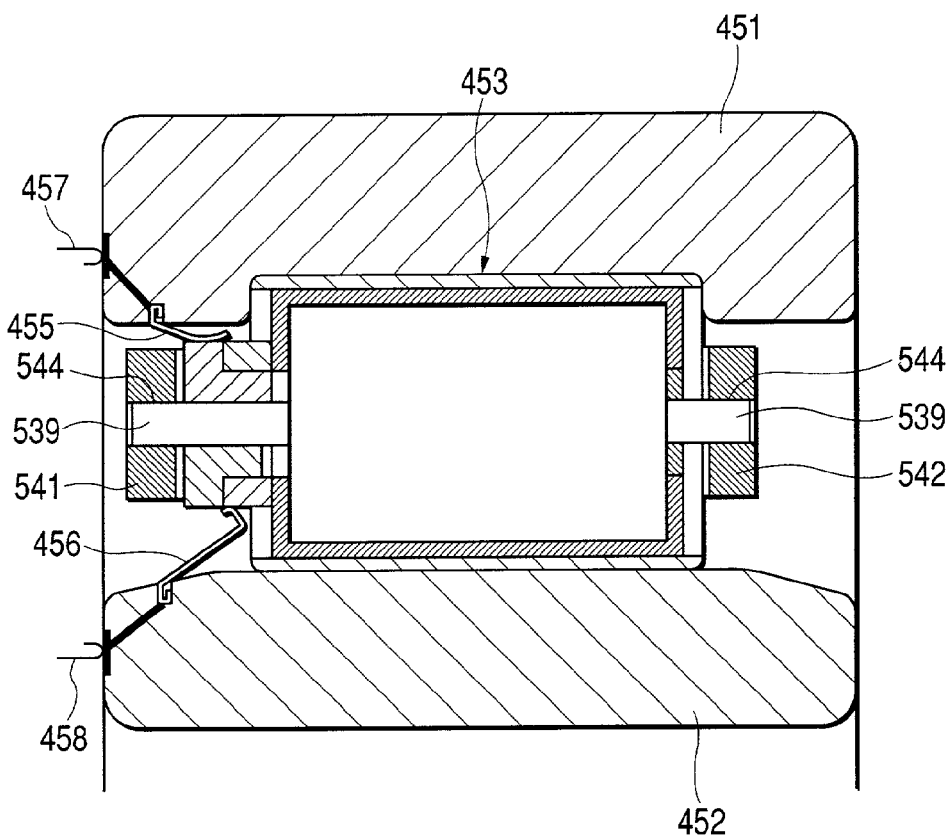
FIG. 37 is a section view of the main portions of a bearing motor according to a twenty-fifth embodiment of the invention.

The retainer 454, as shown in FIG. 30, includes a pair of annular side plates 541, 542 respectively disposed on the two sides of the roller-shaped rotor 453, while these annular side plates 541, 542 are made of non-magnetic material. Also, the retainer 454 further includes a large number of columnar portions 543 (see FIG. 29) the two ends of each of which are supported by the annular side plates 541, 542. Each of the columnar portions 543 includes a pair of magnetic bodies 543a, 543b so interposed between the two mutually adjoining roller-shaped rotors 453 as to be opposed to each other, and a permanent magnet 543c interposed between the pair of magnetic bodies 543a, 543b; and the columnar portions 543 cooperate together in forming the stator of a dc motor. And, a magnetic flux generated by the permanent magnet 543c, as shown in FIG. 36, forms a substantially uniform magnetic field in the circumferential direction thereof in such a manner that it penetrates through the roller-shaped rotor 453 in the circumferential direction thereof.

When the connecting terminals 457, 458 of the thus structured bearing motor 450 are connected to a dc source (not shown), field currents are supplied to the field coils 536 of the respective roller-shaped rotors 453 from the dc source connected to the connecting terminals 457, 458. Then, there is generated a rotation force between the permanent magnet 543c and the field coil 536 which is disposed opposed to the permanent magnet 543c and, due to this rotation force, the respective roller-shaped rotors 453 are allowed to rotate about their own axes according to the principle of a dc motor shown in FIG. 36. When the respective roller-shaped rotors 453 rotate about their own axes, of the outer ring-shaped member 451 and inner ring-shaped member 452 which can be contacted with the roller-shaped rotors 453, specifically, the ring-shaped member (for example, the inner ring-shaped members 452) situated on the rotary side is rotated by the friction force that is generated between the roller-shaped rotors 453 and itself.

In the above-mentioned embodiment of the invention, since, by bringing the driven shaft into fit with the outer peripheral surface of the outer ring-shaped member 451 or the inner peripheral surface of the inner ring-shaped member 452, the motor output can be transmitted to the driven shaft through the outer ring-shaped member 451 or inner ring-shaped member 452, the driven shaft can be driven without using a coupling. Also, because the motor part and bearing part of the bearing motor are formed as an integral body, the dimensions of the bearing motor in the radial and axial directions thereof can be reduced as much as possible, which makes it possible to reduce the size of the bearing motor as well as save the installation space thereof.

By the way, the twenty-fourth embodiment of the invention is not limited to the above-described embodiment. For example, in the above-described embodiment, the roller-shaped rotor 453 is formed in a cylindrical shape but it is also possible to use a roller-shaped rotor having a taper shape. Also, as in a twenty-fifth embodiment shown in FIG. 37, there can also be employed a structure in which, in the annular side plates 541, 542 of the retainer 454, there are formed a large number of penetration holes 544 almost at regular intervals in the peripheral direction of the annular side plates 541, 542, and shafts 539 respectively projected from the side surfaces of the roller-shaped rotors 453 are fitted into these penetration holes 544 to thereby hold the roller-shaped rotors 453 within the retainer 454.

As has been described heretofore, according to the twenty-fourth and twenty-fifth embodiments of the invention, there can be provided a bearing motor which can drive and rotate the driven shaft without using a coupling and can reduce the dimensions of the bearing motor in the radial and axial directions thereof as much as possible, thereby being able to reduce the size of the bearing motor and save the installation space thereof.

Next, description will be given below of a twenty-sixth embodiment of a distributing actuator according to the invention with reference to FIGS. 38 to 43.

Figure 38:
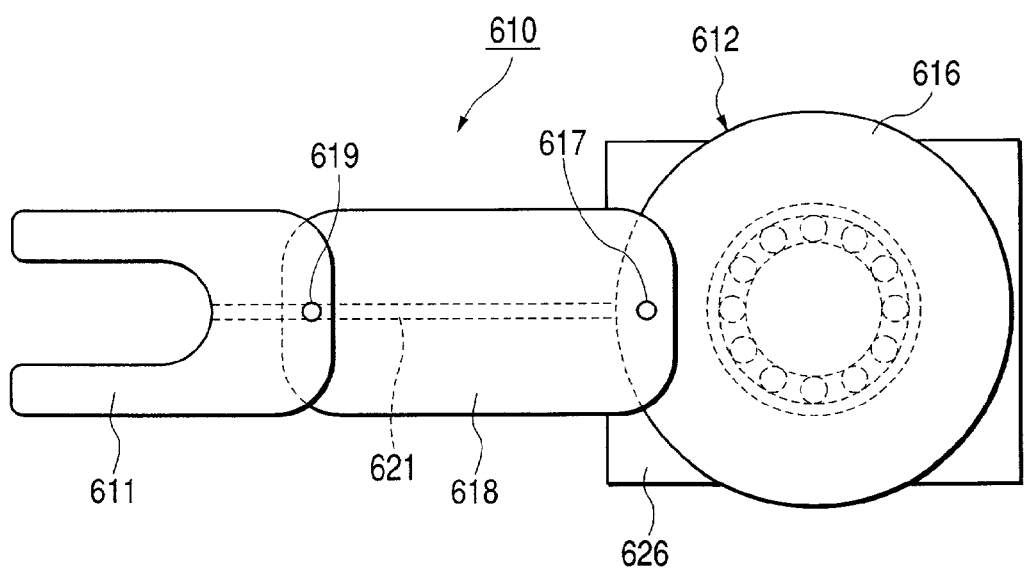
FIG. 38 is a plan view of a distributing actuator according to a twenty-sixth embodiment of the invention.
Figure 39:
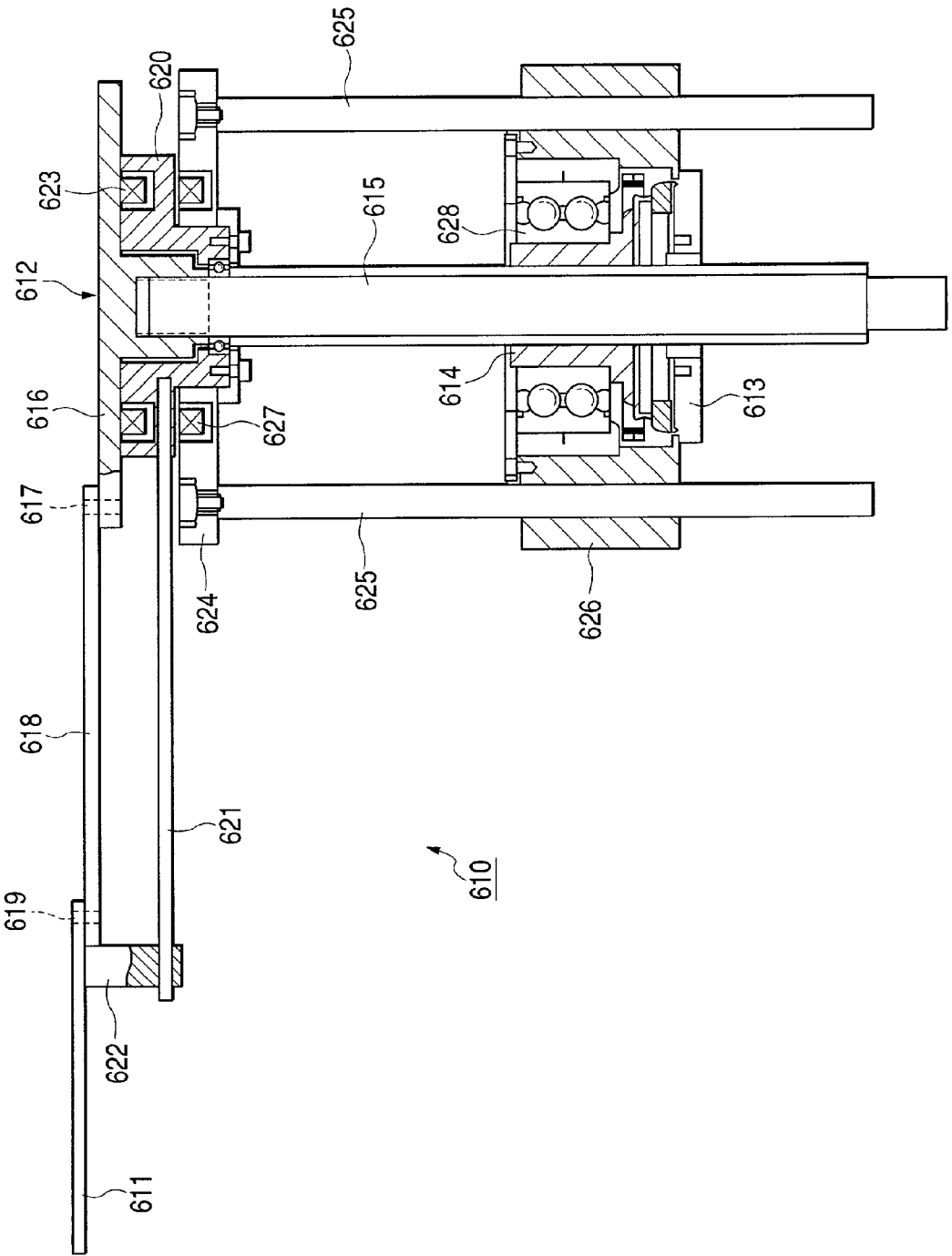
FIG. 39 is a longitudinal section view of the distributing actuator shown in FIG. 38.

As shown in FIGS. 38 and 39, a distributing actuator 610 according to the twenty-sixth embodiment of the invention comprises a plate-shaped distributing element 611 and a drive mechanism 612 for driving the distributing element 611 in the horizontal direction and in the vertical direction.

The drive mechanism 612 includes an ultrasonic motor 613, a nut 614, a drive shaft 615, a first clutch plate 616, an oscillation arm and first and second connecting pins 17, 19. The ultrasonic motor 613 serves as a drive motor. The nut 614 can be rotated about its vertical axis by the drive force of the ultrasonic motor 613. The drive shaft 615 includes a male screw portion which is so formed in its outer peripheral surface as to be threadedly engageable with a female screw portion formed in the inner periphery of the nut 614. The first clutch has a circular-shape and can be driven and rotated about its vertical axis by the drive shaft 615. The oscillation arm 618 is connected to the first clutch plate 616 through the first connecting pin 617 in such a manner that it can be rotated about its vertical axis. The second connecting pin 619 connects together the oscillation arm 618 and distributing element 611 in such a manner that they can be rotated about their own vertical axes. The first connecting pin 617, as shown in FIG. 38, is disposed on a straight line which connects together the center of the first clutch plate 616 and the center of the second connecting pin 619.

Also, the drive mechanism 612 further includes an annular second clutch plate 620 disposed with its upper surface opposed to the lower surface of the first clutch plate 616, a guide rod 621 extended horizontally from the outer peripheral edge portion of the second clutch plate 620 toward the distributing element 611, and a guide member 622 for guiding the distributing element 611 in the longitudinal direction of the guide rod 621. A ring-shaped electromagnet 623 which forms a first electromagnetic clutch is embedded between the first clutch plate 616 and the second clutch 620.

The drive mechanism 612 still further includes an annular third clutch plate 624 with its upper surface opposed to the lower surface of the second clutch plate 620, a plurality of guide shafts 625 extended downwardly at right angles from the third clutch plate 624, and a guide shaft support 626 for supporting these guide shafts 625 in such a manner that they can be slided in the vertical direction. A ring-shaped electromagnet 627 which forms a second electromagnetic clutch is embedded between the second clutch plate 620 and the third clutch plate 624. By the way, the guide shaft support 626 is fixed to a frame (not shown).

Figure 40:
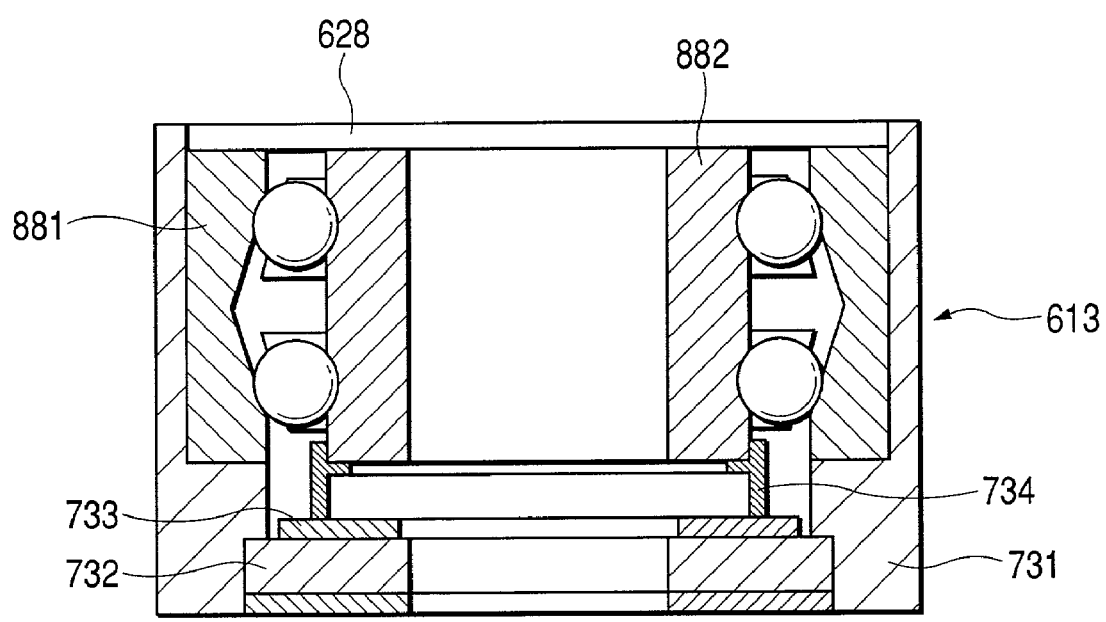
FIG. 40 is a view of the structure of an ultrasonic motor shown in FIG. 39.

The ultrasonic motor 613, as shown in FIG. 40, includes a motor housing 731 formed in a cylindrical shape, an annular stator 732 with its outer peripheral surface fixed to the inner peripheral surface of the motor housing 731, and an annular rotor 733 so disposed as to be rotatable with respect to the stator 732; and, the outer ring 881 of a double-row ball bearing 628 is fixed to the inner peripheral surface of the motor housing 731.

The stator 732 has a structure which is composed of a piezoelectric ceramics and an annular body which is made of metal and is bonded to the surface of the piezoelectric ceramics; and, in the surface of the portion of the stator 732 that can be contacted with the rotor 733, a large number of grooves (not shown) having a comb-tooth shape are formed along the circumferential direction thereof.

One end of a cylindrical-shaped rotor connecting body 734 is connected to the rotor 733 of the ultrasonic motor 613. The other end of the rotor connecting body 734 is coaxially connected to the inner ring 882 of the double-row ball bearing 628, whereby the inner ring 882 of the double-row ball bearing 628 can be rotated integrally with the rotor 733. By the way, the nut 614 is fixed to the inner peripheral surface of the inner ring 882.

Figure 41A:
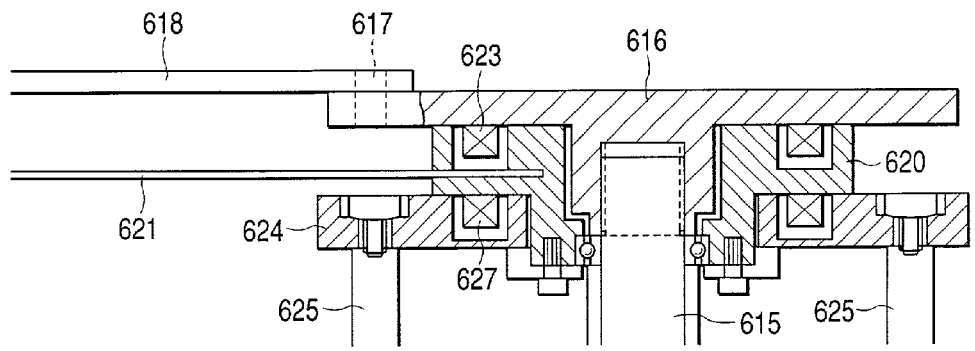
FIGS. 41a, 41b, and 41c are explanatory views of the operation of the distributing actuator shown in FIG. 39.

In the thus structured distributing actuator 610, when an exciting current is supplied to the electromagnet 623 to thereby magnetize the electromagnet 623, the first and second clutch plates 616 and 620 are attracted to each other; and, when an exciting current is supplied to the electromagnet 627 to thereby magnetize the electromagnet 627, the second and third clutch plates 620 and 624 are attracted to each other. And, as shown in FIG. 41A, when the ultrasonic motor 613 is driven while the clutch plates 616, 620 and 624 are attracted together due to the electromagnetic forces of the electromagnet 623 and 627, the clutch plates 616, 620 and 624 are driven and moved up and down in the vertical direction by the drive shaft 615, with the result that the distributing element 611 is moved in the vertical direction.

Figure 41B:
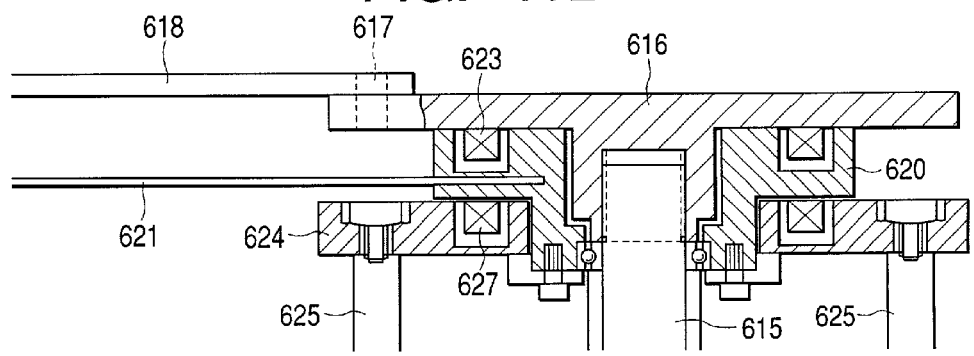
Figure 41C:
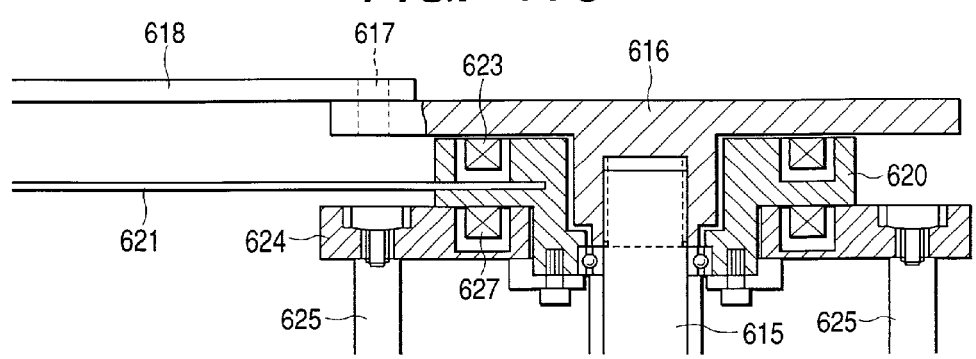
Figure 42A:
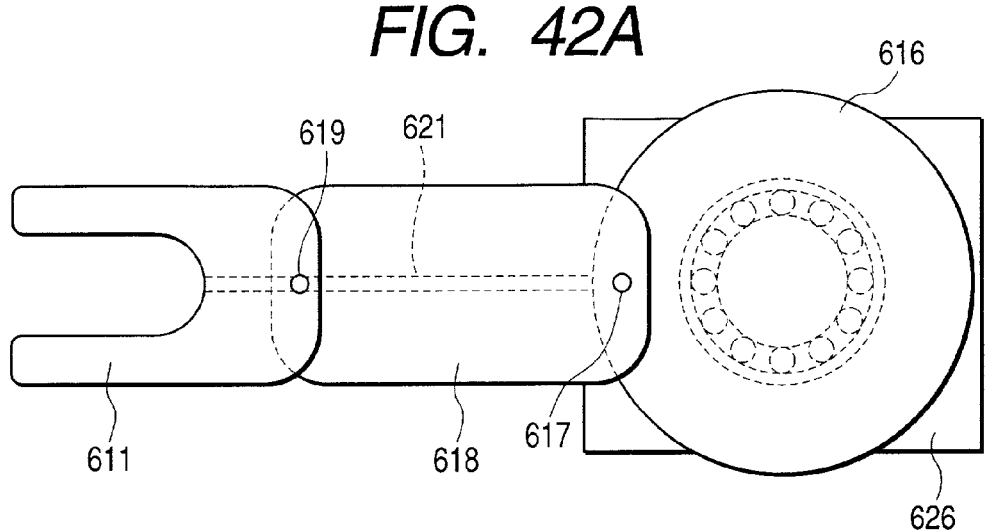
FIGS. 42a, 42b, and 42c are explanatory views of the movement of the distributing actuator shown in FIG. 38.
Figure 42B:
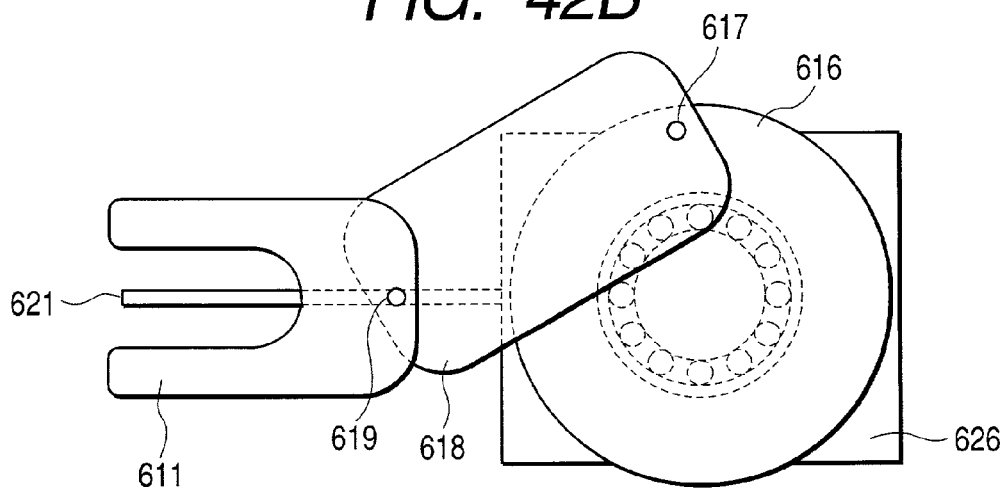
Figure 42C:
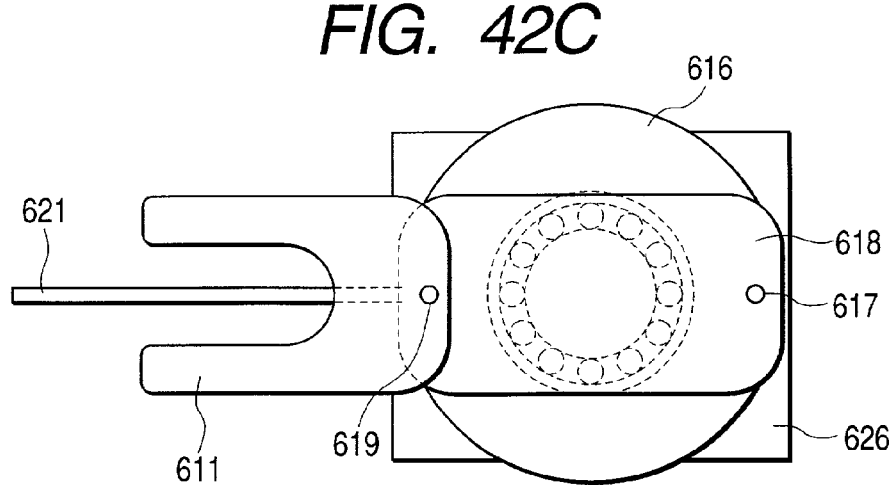

On the other hand, while only the electromagnet 627 is magnetized so that, as shown in FIG. 41C, the second and third clutch plates 620 and 624 are attracted to each other and the first clutch plate 616 is separated from the second clutch plate 620, when the ultrasonic motor 613 is driven, only the first clutch plate 616 is driven by the drive shaft 615. At the then time, the oscillation arm 618 connected to the first clutch plate 616 through the connecting pin 617 is moved in such a manner as shown in FIGS. 42A to 42C and, with the movement of the oscillation arm 618, the distributing element 611 is moved back and forth.

Figure 43:
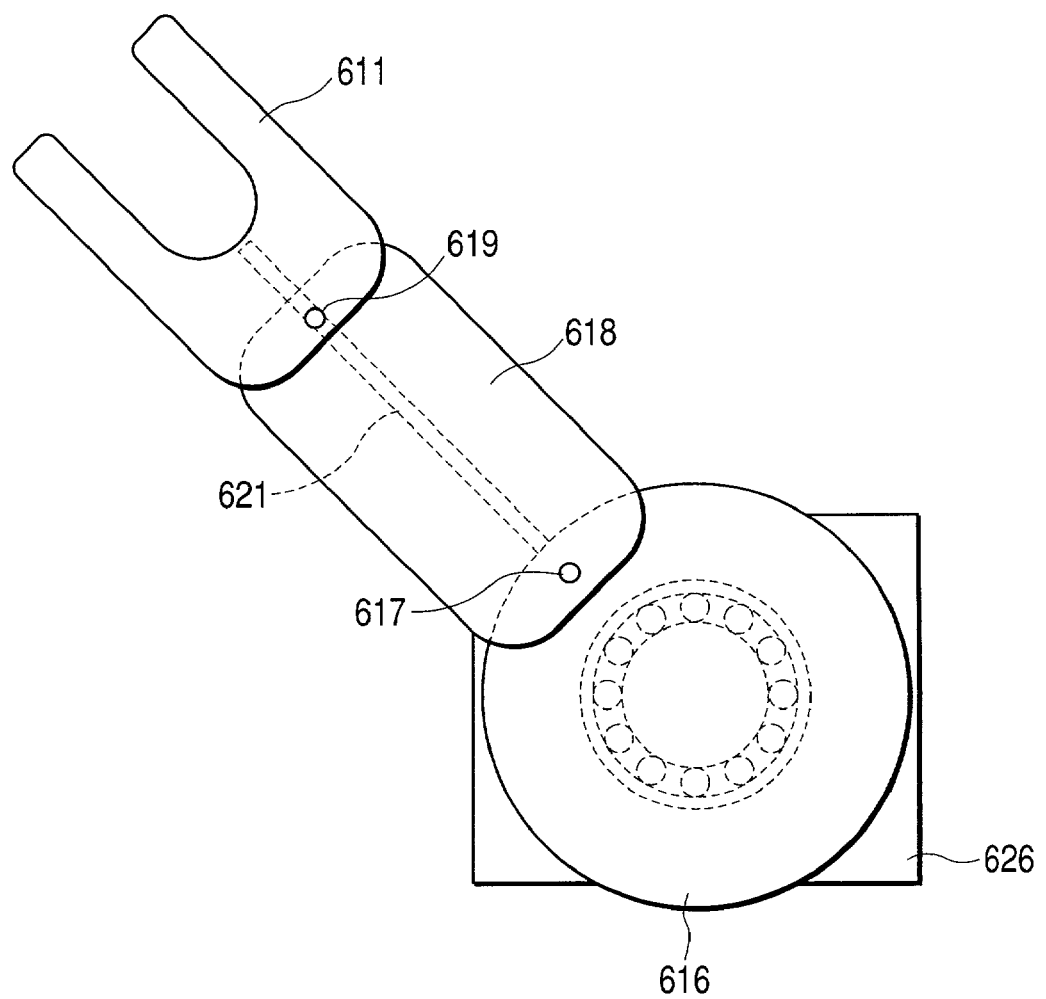
FIG. 43 is an explanatory view of another movement of the distributing actuator shown in FIG. 38.
Figure 44:
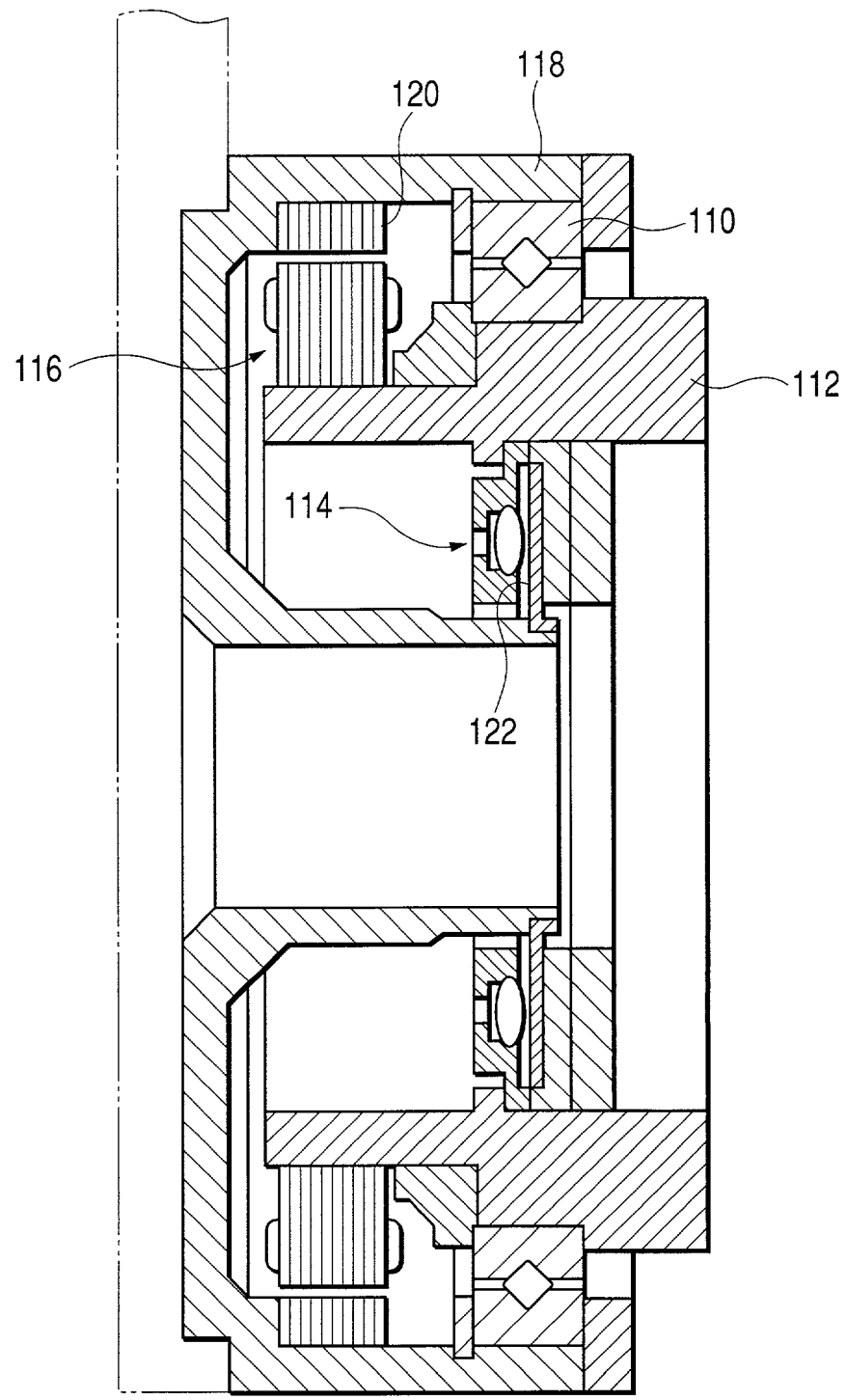
FIG. 44 is a view of an example of a conventional direct drive motor used in the field of factory automation.
Figure 45:
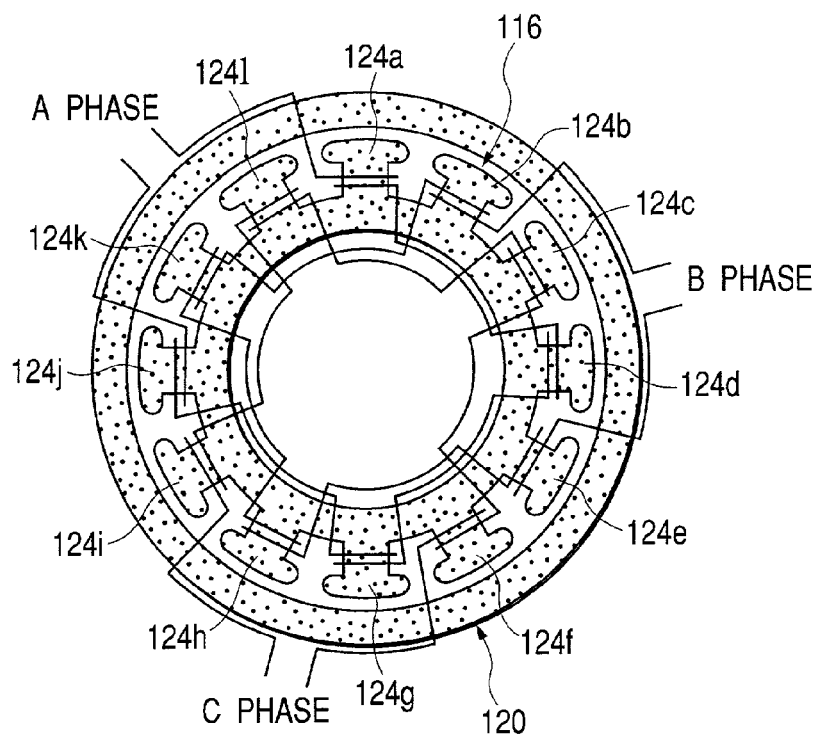
FIG. 45 is a view of the structure of an exciting coil disposed on a stator.
Figure 46:
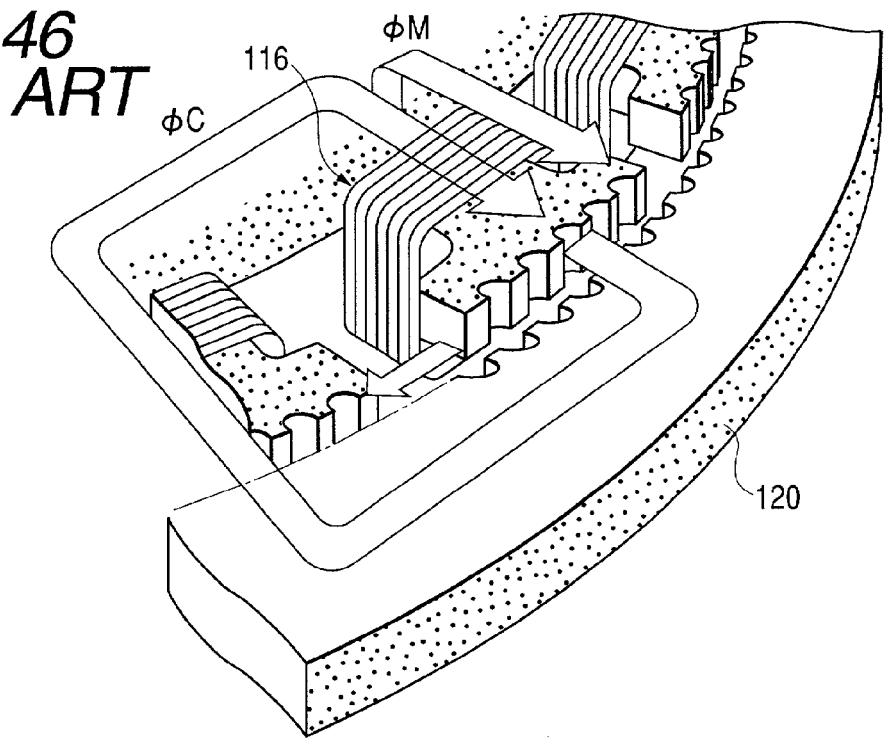
FIG. 46 is an explanatory view of the rotation principle of a rotor.
Figure 47:
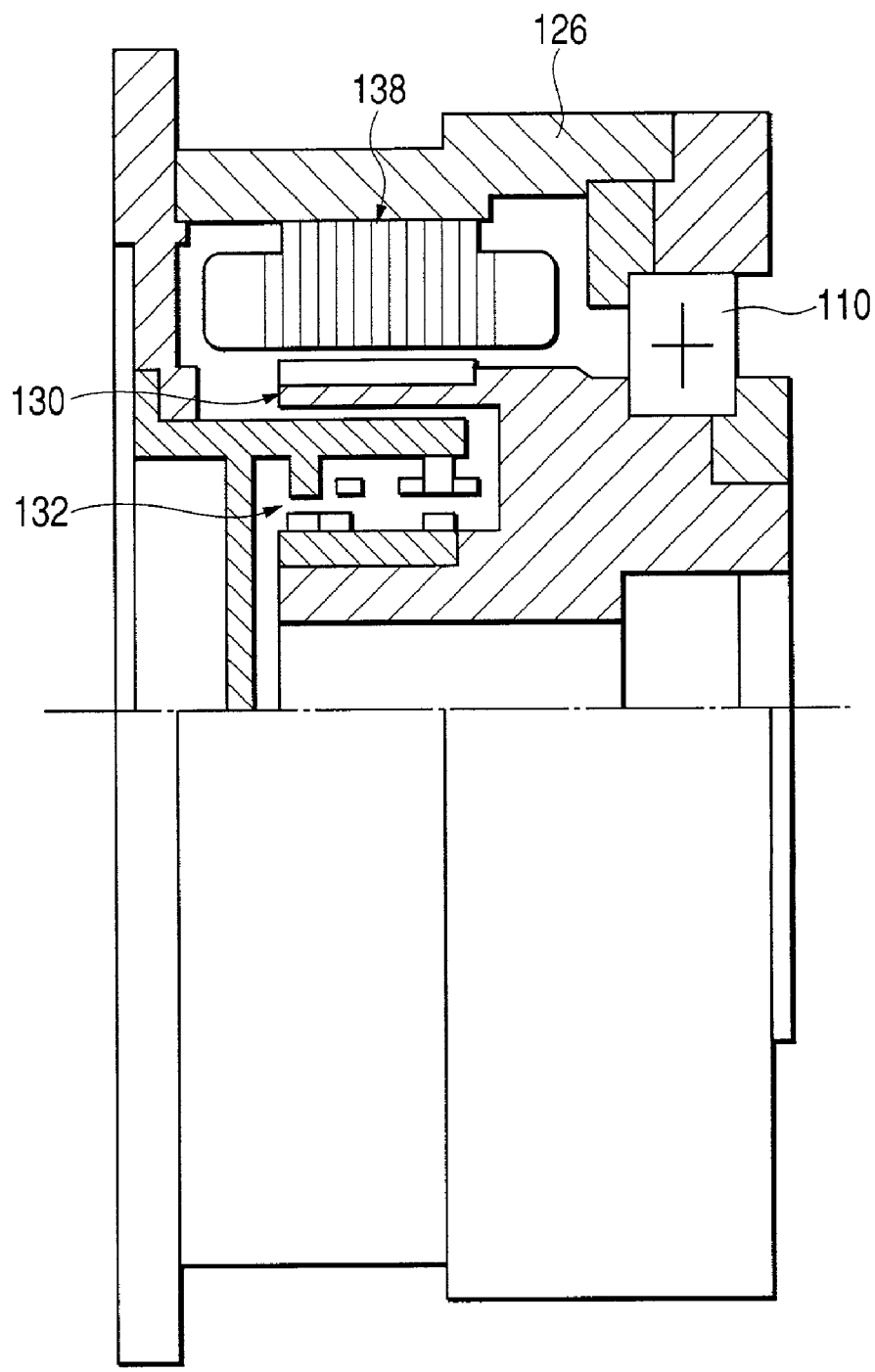
FIG. 47 is a view of another structure of a direct drive motor.
Figure 48:
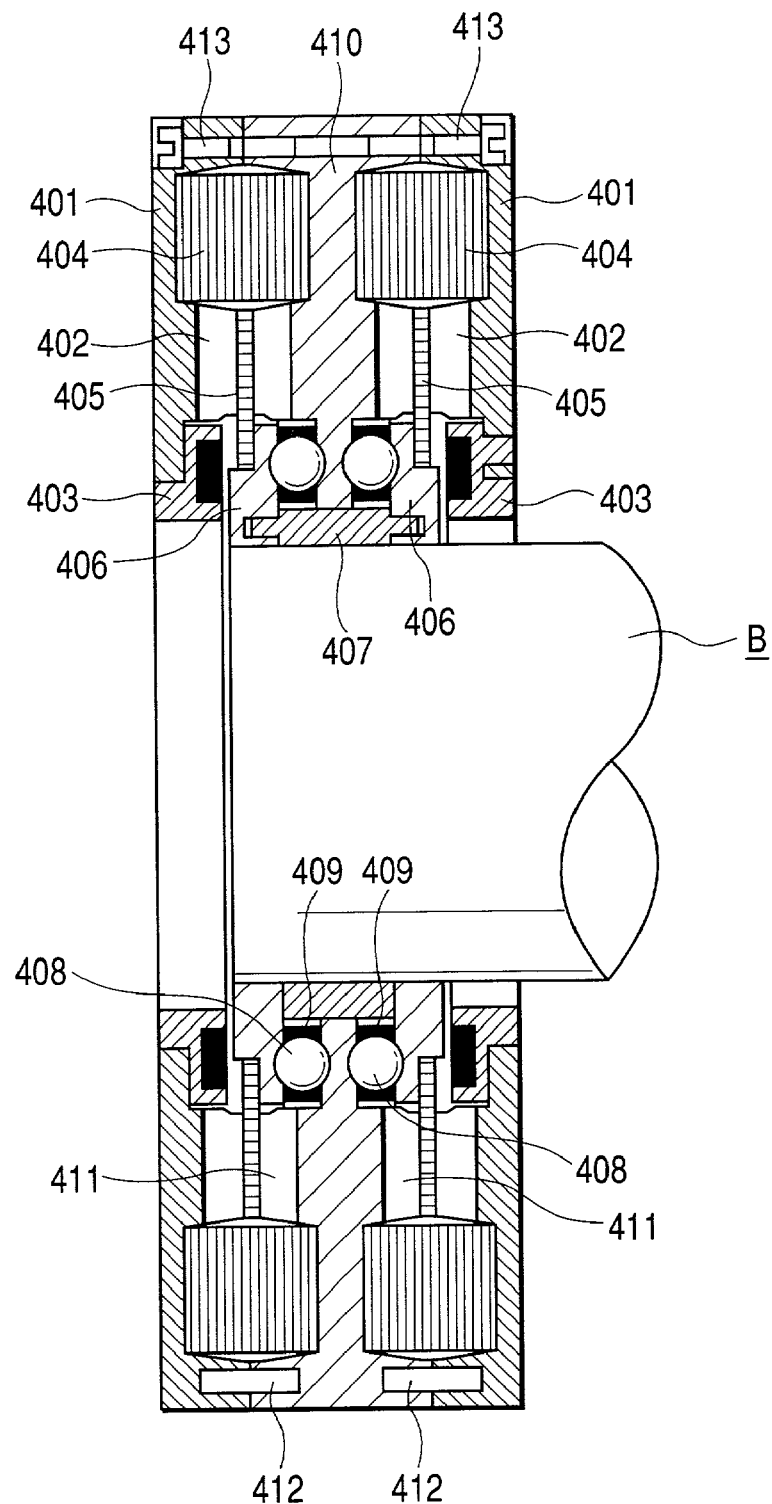
FIG. 48 is an axially sectional view of a conventional bearing motor.

Also, on the contrary to the above, while only the electromagnet 623 is magnetized so that, as shown in FIG. 41B, not only the first and second clutch plates 616 and 620 are attracted to each other but also the second clutch plate 620 is separated from the third clutch plate 624, in case where the ultrasonic motor 613 is driven, only the first clutch plate 616 and second clutch plate 620 are driven by the drive shaft 615. Then, the oscillation arm 618 and guide rod 621 are rotated in a horizontal surface together with the first and second clutch plates 616 and 620 and, with the rotational movements of the oscillation arm 618 and guide rod 621, the distributing element 611 is rotated in a horizontal surface as shown in FIG. 43.

As can be seen clearly from the foregoing description, in the twenty-sixth embodiment, between the first and second clutch plates 616 and 620 as well as between the second and third clutch plates 620 and 624, there are interposed the first and second electromagnets (electromagnets 23 and 27). Thanks to this, the distributing element 611 can be moved in the vertical direction, in the horizontal direction, or in the back-and-forth direction using a single drive motor, thereby eliminating the need for provision of motors corresponding in number to the driving directions of the distributing element 611. This can simplify the structure of the distributing actuator as well as can reduce the manufacturing cost thereof.

By the way, in the above-described embodiment, as the drive motor for driving the drive mechanism 612, there is used an ultrasonic motor but the invention is not limited to this. Also, in the above-described embodiment, the electromagnet 623 for forming the first electromagnetic clutch between the first and second clutch plates 616 and 620 is embedded in the second clutch plate 620; however, the electromagnet 623 for forming the first electromagnetic clutch may also be embedded in the first clutch plate 616. Further, in the above-described embodiment, the electromagnet 627 for forming the second electromagnetic clutch between the second and third clutch plates 620 and 624 is embedded in the third clutch plate 624; however, the electromagnet 627 for forming the second electromagnetic clutch may also be embedded in the second clutch plate 620.

As has been described heretofore, according to the distributing actuator of the twenty-sixth embodiment of the invention, the distributing element can be moved in the vertical direction, in the horizontal direction, or in the back-and-forth direction, using a single drive motor, thereby eliminating the need for provision of motors corresponding in number to the driving directions of the distributing element. This can simplify the structure of the distributing actuator as well as can reduce the manufacturing cost thereof.

What is claimed is:

1. A rolling bearing with a built-in motor, comprising:
a bearing part including a first bearing ring, a second bearing ring, and a plurality of rolling elements; and
a motor part including a stator and a rotor for rotationally driving the first bearing ring and the second bearing ring with respect to each other,
wherein the first bearing ring includes an inner ring and a cylindrical-shaped inner fixing portion as an extension portion of the inner ring which is monolithically formed with said inner ring so as to be coaxial therewith, and a second bearing ring having an outer ring and a cylindrical-shaped outer fixing portion as an extension portion of the outer ring which is monolithically formed with said outer ring so as to be coaxial therewith, and
further wherein said stator and said rotor of said motor part are arranged in a radial direction of said rolling bearing and are located between said inner fixing portion of said first bearing ring and said outer fixing portion of said second bearing ring, wherein the inner ring and outer ring are opposed to each other with the plurality of rolling elements interposed therebetween, wherein at least one of the stator and the rotor is attached to the outer ring only, wherein the inner fixing portion and the inner ring directly are integrated with each other, wherein at least one of the bearing part and the motor part is formed at an axial direction end portion of the bearing with the built-in motor, and wherein the rolling bearing with a built-in motor is configured and arranged as a direct drive motor.

2. The rolling bearing with a built-in motor as set forth in claim 1, wherein said stator of said motor part is fixed to an outer periphery of said inner fixing portion and said rotor of said motor part is fixed to an inner periphery of said outer fixing portion, and further wherein, while said first bearing ring is disposed on a stationary side of said rolling bearing and said second bearing ring is disposed on a rotary side thereof, said first and second bearing rings are driven and rotated with respect to each other.

3. The rolling bearing with a built-in motor as set forth in claim 1, wherein said rotor of said motor part is fixed to an outer periphery of said inner fixing portion and said stator of said motor part is fixed to an inner periphery of said outer fixing portion, and further wherein, while said first bearing ring is disposed on a rotary side of said rolling bearing and said second bearing ring is disposed on a stationary side thereof, said first and second bearing rings are driven and rotated with respect to each other.

4. The rolling bearing with a built-in motor as set forth in claim 1, further comprising:

a detecting part interposed between said inner fixing portion and said outer fixing portion, for detecting the rotation of said bearing part.

5. The rolling bearing with a built-in motor as set forth in claim 1, wherein at least one of said inner fixing portion and said outer fixing portion is formed of non-magnetic material.

6. The rolling bearing with a built-in motor as set forth in claim 1, wherein said bearing part is composed of a crossed roller bearing.

7. The rolling bearing with a built-in motor as set forth in claim 1, wherein said bearing part is composed of a crossed ball bearing.

8. The rolling bearing with a built-in motor as set forth in claim 1, wherein said rolling elements are respectively made of ceramics.

9. The rolling bearing with a built-in motor as set forth in claim 1, wherein the stator is provided at the extension portion of the inner ring to be fixed to the first bearing ring, and wherein the rotor is provided at the extension portion of the outer ring to be fixed to the second bearing ring.

10. The rolling bearing with the built-in motor according to claim 1, wherein the bearing with the built-in motor is configured and arranged as the direct drive motor for factory automation.

11. A rolling bearing with a built-in motor comprising:

a bearing part including an inner ring, an outer ring and a plurality of rolling elements, wherein the inner ring and outer ring are opposed to each other in the radial direction of the rolling bearing with the plurality of rolling elements interposed therebetween; and a motor part including a stator and a rotor, for rotationally driving the inner ring and the outer ring with respect to each other, wherein the stator is opposed to the rotor in an axial direction of the rolling bearing, and further wherein the bearing part and the motor part serially are arranged in the axial direction of the rolling bearing, wherein at least one of the stator and the rotor is attached to the outer ring only and wherein the rolling bearing with a built-in motor is configured and arranged as a direct drive motor.

12. The rolling bearing with a built-in motor as claimed in claim 11, further comprising:

an outer fixing portion that projects from an end of the outer ring in an axial direction of the rolling bearing; and an inner fixing portion that projects from an end of the inner ring in the axial direction of the rolling bearing, wherein an end portion of the inner fixing portion is projected further than is an end portion of the outer fixing portion, and wherein the stator and the rotor are interposed between the end portion of the outer fixing portion and the end portion of the inner fixing portion.

13. The rolling bearing with a built-in motor as set forth in claim 11, wherein at least one of said inner fixing portion and said outer fixing portion is formed of non-magnetic material.

14. The rolling bearing with a built-in motor as set forth in claim 11, wherein said bearing part is composed of a crossed roller bearing.

15. The rolling bearing with a built-in motor as set forth in claim 11, wherein said bearing part is composed of a crossed ball bearing.

16. The rolling bearing with a built-in motor as set forth in claim 11, wherein said rolling elements are respectively made of ceramics.

17. The rolling bearing with the built-in motor according to claim 11, wherein a first seal member is disposed between the bearing part and the motor part.

18. The rolling bearing with the built-in motor according to claim 17, wherein a second seal member is disposed in such a manner that the bearing part is disposed between the first seal member and the second seal member.

19. The rolling bearing with the built-in motor according to claim 11, wherein the bearing with the built-in motor is configured and arranged as a direct drive motor for factory automation.

20. A rolling bearing with a built-in motor comprising:

a bearing part including an inner ring, an outer ring, and a plurality of rolling elements; and a motor part including a stator and a rotor for rotationally driving said inner and outer rings of said bearing part with respect to each other, wherein said bearing part includes a first bearing ring having a cylindrical-shaped inner fixing portion formed in one end face of said inner ring so as to be coaxial therewith, and a second bearing ring having a cylindrical-shaped outer fixing portion formed in one end face of said outer ring so as to be coaxial therewith, wherein, when viewed in a radial direction of said rolling bearing, said stator and said rotor of said motor part are interposed between said inner fixing portion of said first bearing ring and said outer fixing portion of said second bearing ring, a detecting part interposed between said inner fixing portion and said outer fixing portion, for detecting the rotation of said bearing part, wherein said detecting part includes a slit disk mounted on a rotary side and a light radiation detect portion mounted on a stationary side, wherein said slit disk is disposed on an axial-direction end portion of said detecting part on the opposite side to said bearing part between said inner fixing portion and said outer fixing portion, and further wherein said light radiation detect portion is disposed on a bearing part side of said slit disk in an axial direction thereof so as to be opposed to said slit disk.

21. The rolling bearing with a built-in motor as set forth in claim 20, wherein at least one of said inner fixing portion and said outer fixing portion is formed of non-magnetic material.

22. The rolling bearing with a built-in motor as set forth in claim 20, wherein said bearing part is composed of a crossed roller bearing.

23. The rolling bearing with a built-in motor as set forth in claim 20, wherein said bearing part is composed of a crossed ball bearing.

24. The rolling bearing with a built-in motor as set forth in claim 20, wherein said rolling elements are respectively made of ceramics.

25. A rolling bearing with a built-in motor comprising:
a bearing part including an inner ring, an outer ring, and a plurality of rolling elements; and
a motor part including a stator and a rotor for rotationally driving said inner and outer rings of said bearing part with respect to each other,
wherein said bearing part includes a first bearing ring comprising the inner ring and a cylindrical-shaped inner fixing portion formed in one end face of said inner ring so as to be coaxial therewith, and a second bearing ring comprising the outer ring and a cylindrical-shaped outer fixing portion formed in one end face of said outer ring so as to be coaxial therewith, and the motor is adjacent to the one end face of the inner ring and the one end face of the outer ring,
wherein, when viewed from an axial direction of said rolling bearing, said stator and said rotor of said motor part are interposed between said inner fixing portion of said first bearing ring and said outer fixing portion of said second bearing ring, and
further wherein said inner fixing portion and said outer fixing portion are formed separately from said inner ring and said outer ring, respectively,
wherein the bearing part and the motor part directly are connected to each other;
wherein at least one of the bearing part and the motor part is formed at an axial direction end portion of the bearing with the built-in motor, and
wherein the rolling bearing with a built-in motor is configured and arranged as a direct drive motor.

26. The rolling bearing with a built-in motor as set forth in claim 25, wherein at least one of said inner fixing portion and said outer fixing portion is formed of non-magnetic material.

27. The rolling bearing with a built-in motor as set forth in claim 25, wherein said bearing part is composed of a crossed roller bearing.

28. The rolling bearing with a built-in motor as set forth in claim 25, wherein said bearing part is composed of a crossed ball bearing.

29. The rolling bearing with a built-in motor as set forth in claim 25, wherein said rolling elements are respectively made of ceramics.

30. The rolling bearing with the built-in motor according to claim 25, wherein the bearing with the built-in motor is configured and arranged as a direct drive motor for factory automation.

31. The rolling bearing with a built-in motor as set forth in claim 25, wherein the inner fixing portion has an outer diameter smaller than an inner diameter of the outer fixing portion.

32. The rolling bearing with a built-in motor as set forth in claim 31, wherein the elements are sequentially ordered along a direction extending radially outwardly in order of the inner fixing portion, one of the stator and the rotor, the other one of the stator and the rotor, and the outer fixing portion.

33. A rolling bearing with a built-in motor comprising:
a bearing part including an inner ring, an outer ring, and a plurality of rolling elements; and
a motor part including a stator and a rotor for rotationally driving said inner and outer rings of said bearing part with respect to each other,
wherein said bearing part includes a first bearing ring comprising the inner ring and a cylindrical-shaped inner fixing portion formed in one end face of said inner ring so as to be coaxial therewith, and a second bearing ring comprising the outer ring and a cylindrical-shaped outer fixing portion formed in one end face of said outer ring so as to be coaxial therewith, wherein said inner fixing portion and said outer fixing portion are made of non-magnetic material,
wherein, when viewed from an axial direction of said rolling bearing, said stator and said rotor of said motor part are interposed between said inner fixing portion of said first bearing ring and said outer fixing portion of said second bearing ring, and
further wherein said inner fixing portion and said outer fixing portion are formed separately from said inner ring and said outer ring, respectively,
wherein the bearing part and the motor part directly are connected to each other,
wherein at least one of the bearing part and the motor part is formed at an axial direction end portion of the bearing with the built-in motor, and
wherein the rolling bearing with a built-in motor is configured and arranged as a direct drive motor.

34. The rolling bearing with a built-in motor as set forth in claim 33, wherein said bearing part is composed of a crossed roller bearing.

35. The rolling bearing with a built-in motor as set forth in claim 33, wherein said bearing part is composed of a crossed ball bearing.

36. The rolling bearing with a built-in motor as set forth in claim 33, wherein said rolling elements are respectively made of ceramics.

37. The rolling bearing with the built-in motor according to claim 33, wherein the bearing with the built-in motor is configured and arranged as a direct drive motor for factory automation.

38. The rolling bearing with a built-in motor as set forth in claim 33, wherein the inner fixing portion has an outer diameter smaller than an inner diameter of the outer fixing portion.

39. The rolling bearing with a built-in motor as set forth in claim 38, wherein the elements are sequentially ordered along a direction extending radially outwardly in order of the inner fixing portion, one of the stator and the rotor, the other one of the stator and the rotor, and the outer fixing portion.

* * * * *